United States Patent [19]

Onishi et al.

[11] Patent Number: 5,893,538
[45] Date of Patent: Apr. 13, 1999

[54] CONDUIT CLAMP

[76] Inventors: Yoshio Onishi, No. 31-19, Ageo-cho 2-chome, Yao-shi, Osaka 581; Masakatsu Onishi, No. 1881-45, Kanaoka-cho, Sakai-shi, Osaka 591, both of Japan

[21] Appl. No.: 08/785,573

[22] Filed: Jan. 21, 1997

Related U.S. Application Data

[63] Continuation of application No. 08/342,639, Nov. 21, 1994, abandoned, which is a continuation of application No. 08/009,535, Jan. 26, 1993, abandoned, which is a continuation-in-part of application No. 07/943,877, Sep. 11, 1992, abandoned.

[30] Foreign Application Priority Data

| Sep. 13, 1991 | [JP] | Japan | 3-081912 |
| Jan. 27, 1992 | [JP] | Japan | 4-007778 |
| Aug. 27, 1992 | [JP] | Japan | 4-065888 |
| Dec. 22, 1992 | [JP] | Japan | 4-356567 |

[51] Int. Cl.⁶ .................................................. F16L 3/00
[52] U.S. Cl. .......................... 248/65; 248/68.1; 248/73; 248/222.52; 411/84
[58] Field of Search ........................ 248/68.1, 72, 73, 248/74.1, 74.3, 58, 222.52, 65; 411/84, 85

[56] References Cited

U.S. PATENT DOCUMENTS

| 2,345,650 | 4/1944 | Attwood | 248/72 X |
| 4,185,802 | 1/1980 | Myles et al. | 248/68.1 X |
| 4,429,440 | 2/1984 | Laughlin et al. | 248/73 X |
| 4,542,871 | 9/1985 | Fortsch | 248/68.1 X |
| 4,638,966 | 1/1987 | Ford | 248/74.3 X |
| 4,662,590 | 5/1987 | Hungerford, Jr. | 248/72 |
| 4,770,378 | 9/1988 | Onishi et al. | 248/68.1 |
| 4,799,641 | 1/1989 | Koneski | 248/68.1 |
| 4,960,253 | 10/1990 | Perrault et al. | 248/68.1 |
| 5,022,614 | 6/1991 | Rinderer | 248/68.1 X |
| 5,141,186 | 8/1992 | Cusic | 248/68.1 |

FOREIGN PATENT DOCUMENTS 63-48085  4/1988  Japan.

*Primary Examiner*—Clark F. Dexter
*Attorney, Agent, or Firm*—Nields, Lemack & Dingman

[57] ABSTRACT

A clamping device for clamping a conduit to a channel rail, comprising a main unit with a retainer section of which the shape fits the sectional form of the conduit, a screw member and a buckle. Just pushing the screw member axially causes abutments of the buckle to be engaged on the channel rail and thus the conduit is fixed to the channel rail at least provisionally. The abutments of the buckle are made to engage the channel rail just when the screw member is pushed axially by holding the buckle in a predetermined direction in the main body until the screw member is pushed axially, rotating the buckle when the buckle is released from the held state so that the abutments are positioned under the lower ends of a pair of inlet-opening walls defining together an inlet opening of the channel rail, and drawing the buckle in the direction of the head of the screw member while the abutments are kept positioned under the lower ends of the pair of walls.

18 Claims, 32 Drawing Sheets

CONDUIT CLAMP

This application is a continuation of application Ser. No. 08/342,639 filed Nov. 21, 1994 (abandoned), which is a continuation of Ser. No. 08/009,535 filed Jan. 26, 1993 (abandoned), which is a Continuation-In-Part of Ser. No. 07/943,877 filed Sep. 11, 1992 (abandoned).

FIELD OF THE INVENTION

The present invention relates to a conduit clamp suitable for use to fix conduits to channel rails.

BACKGROUND OF THE INVENTION

In such buildings such as factories, business offices, shops, condominiums, warehouses, stations, gymnasiums, theaters, etc. and such structures as tunnels, underpasses, elevated railways, high level roads, bridges, etc. conduits through which typically power and communication cables and wires are passed and those through which a fluid such as gas flows are laid on the ceiling, side wall, floor, etc. of such buildings and structures.

For laying such conduits, generally channel rails, called saddle, are disposed in parallel with and as regularly spaced from each other and the conduits are fixed to the channel rails with clamps as placed perpendicularly thereto. In may such cases, the conduits have to be fixed to each of the channel rails and a plurality of conduits is fixed in parallel with each other on one channel rail. Conduits each having a predetermined length are longitudinally joined to each other in succession and a plurality of such joined conduits has to be disposed in parallel with and as regularly spaced from each other. Therefore, the conduits are provisionally fastened at selected points to such an extent that they will not be disengaged from the channel rails but are movable longitudinally of the channel rails (at the primary step), and thereafter they are securely clamped after correctly being positioned (at the secondary step). This manner of conduit clamping needs much labor and time.

The conduits are not only clamped to, as placed on, channel rails suspended by suspension bolts from the ceiling with the channel directed upward but also they are clamped, as applied from below, to channel rails fixed to the ceiling with the channel directed downward.

In the former case, the conduits, there is only a small space between the ceiling and the channel rails in many cases. In the latter case, the working person is compelled to face up with the neck bent about 90° backward. This is a very painful posture.

Clamping of such conduit should desirably be simple, positive and safe. For reduction of costs and relief of pains, the clamping should be done efficiently with less labor and time. One of such conduit clamps is disclosed in the Japanese Unexamined Utility Model Publication No. 63-48085. This conduit clamp comprises a main body having a front T-shaped foot section and a retainer section contiguous from the foot section and which holds the semi-circumference of a conduit, a screw penetrated through a seat section provided on the opposite side of the foot section of the main body, and a flat vane fitted on the screw. For fixing a conduit, the vane is limited from rotating by applying the longitudinal end face thereof to the inner wall of the flange of a rail member and the vane is then lifted along the flange inner wall by tightening the screw, until the upper side of the vane touches the wall lower portion of the rail member.

For clamping a conduit to a channel rail with this conventional clamp, however, the vane must be inserted into the channel rail as postured for the longitudinal direction thereof to be parallel with the channel direction of the channel rail, and then it must be raised by tightening the screw many turns. Thus, this work cannot easily be done by one person. It needs at least two persons; one has to operate the conduit clamp while the other is holding the conduit as applied to the channel rail. Much labor and time are required for the provisional fixation of the conduit.

In the provisional fixing in the primary step, the screw has to be tightened. If the screw is turned counterclockwise, the vane will possibly leave the screw so that it will drop into the channel rail. Removing the vane from inside the rail will take some time, which will cause the work efficiency to be lower. In case the channel rail is installed with the channel directed downward, the vane disengaged from the screw by mistake (too much loosening of the screw or the like) or the conduit coming off the main body of the clamp will possibly drop to the person at the head or face, which will cause a fatal or critical bodily injury to him.

Also the U.S. Pat. No. 4,770,378 proposes that a vane is suspended with spring provided between a seat section and the head of a screw. When a conduit is provisionally fixed to a channel rail with this technique, the screw has to be pushed axially until the vane goes down to a free space under the drooping wall of the channel rail (primary step) and then the screw is tightened to turn the vane so as to be perpendicular to the channel rail (secondary step). Namely, this technique also needs two steps of operation, that is, much labor and time. The worker has to turn the wrist repeatedly many times, which causes him to be very fatigued. Since the screw must be turned in the provisional fixation of the conduit, if it is turned counterclockwise, the vane falls off the screw. Thus, the above-mentioned troubles are also unavoidable with this technique. The vane is held just in contact with the bottom side of the flat seat section; if a vibration is applied to the vane or the worker touches the screw carelessly by hand, the vane will be turned. Namely, it is difficult to hold the vane in parallel with the channel of the channel rail until the conduit is clamped.

In both these prior arts, the vane is limited from turning by applying both the longitudinal ends thereof to the inner walls of the channel-rail right and left flanges. This is also a problem. More particularly, the vane is actually nearly as long as the distance between the inner walls of the right and left flanges of the channel rail. The vane is likely to deflect if the tightening of the screw acts thereon; to avoid this, the vane should have an ample thickness. Thus, the clamp is massive and heavy as a whole, so it cannot be easily handled during transport or in clamping conduits to channel rails.

Because of its large length, the vane enters to a rather great depth in the curved retainer section of the main body when directed longitudinally in parallel with the channel in the channel rail. So the vane will be an interference in practice when the curved retainer section is applied to embrace a conduit. In this case, the vane must be turned 90° once for a perpendicularity to the channel in the channel rail. When the clamp is set to the channel rail, the vane has to be turned 90° again so as to be parallel to the channel in the channel rail. Otherwise, the vane cannot be introduced into the channel rail. For this adjustment, the screw must be turned (loosened or tightened), which will lead to a lower-work efficiency.

Also, the longitudinal end faces of the vane are caused to abut the flange inner walls so that the vane is blocked against rotating. Thus, depending upon the surface condition of the flange inner walls, the vane will be obliquely caught there and so the screw cannot be tightened or the vane will be raised as it is in the oblique position when the screw is tightened. Further, it cannot be visually checked from outside whether the vane is well directed or not. Therefore, the conduit will be secured to the channel rail with no sufficient contact of the vane with the drooping wall bottom faces of the channel-rail flanges. The conduit cannot be fixed stably and positively. Namely, the prior-art conduit clamps cannot satisfactorily secure the conduits to the channel rails.

SUMMARY OF THE INVENTION

The present invention has a primary object to overcome the above-mentioned drawbacks of the prior art by providing a conduit clamp for use in fixing conduits to channel rails, which can be used by any unskilled person very easily, safely, positively, very efficiently and effectively.

The present invention has another object to provide a conduit clamp, which, incorporating the features of the above-mentioned first conduit clamp, uses a small and lightweight buckle and of which the section for retaining the conduit is applicable onto the conduit simply without the necessity of correcting the direction of the buckle at each time.

The present invention has a still another object to provide a conduit clamp which needs only a small turning of the screw in the secondary step of fixation, with which the conduit can be securely fixed, and which can keep the conduit securely clamped without loosening for a long period after the fixation.

The "conduits" referred to herein do not include only the conduits through which power cables and wires or communication cables and wires passed are passed to protect them, conduits through which a fluid such as gas is supplied, but also rods or reinforcing bars and bundles of cables protected by resin or the like applied to the outer surface thereof.

The above first object is accomplished by providing a conduit clamp for use in fixing conduits to channel rails, comprising, according to the present invention, a main body with a retainer section of which the space corresponds to the sectional form of a conduit to be clamped, a screw member, and a buckle, wherein just pushing the screw member axially will cause abutments of the buckle to engage on the channel rail and thus fix the conduit at least provisionally to the channel rail.

More particularly, the above-mentioned mechanism by which just pushing the screw member axially will cause the abutments of the buckle to engage on the channel rail comprises a means of holding the buckle in a predetermined direction with respect to the main body until the screw member is pushed, a means of turning the buckle through a predetermined angle, when the screw member is pushed axially, so that the abutments are positioned under the lower faces of a pair of drooping walls defining together an inlet opening of the channel rail, and a means of pulling the buckle to the main body (toward the head of the screw member) with the abutments kept positioned under the lower faces of the pair of walls.

The preferable examples of this mechanism include the following:

(a) The main body has a seat section following the retainer section, and the seat section is coupled with the buckle by an elastic member which imparts a force of suspension and a rotation to the buckle. Namely, the elastic member serves to rotate the buckle.

(b) The buckle is suspended by the elastic member interposed between the seat section and the head of the screw member, and the buckle is rotated by the rotation of the screw member caused by the cooperation of a rotation lead section provided in the middle of the threaded body of the screw member with a guide hole in the seat section.

(c) The buckle is rotated about the horizontal axis while in the above features (a) and (b), the buckle is rotated about the axis of the screw member (about the vertical axis). More particularly, the buckle consists of two parts, right and left, which can be opened and closed about the horizontal shaft piece (one or more). Thus the buckle is rotated as the two right and left parts are forced by the walls of the inlet opening, while it is suspended by an elastic member interposed between the seat section of the main body and the head of the screw member.

The above second object is accomplished by providing a conduit clamp in which the buckle is blocked against rotation by utilizing the pair of drooping walls defining together the inlet opening of the channel rail (will be referred to as "inlet opening" hereafter), not by the flange inner-walls of the channel rails as in the prior art. More particularly, the buckle has a total length larger than the width of the inlet opening but smaller than the distance between the inner walls of the channel-rail flanges. The buckle has provided at either longitudinal end thereof abutments engageable on the bottom faces of the drooping walls defining together the inlet opening. The buckle also has provided near the abutments a pair of stoppers projecting higher than the abutments and which can be engaged on the walls of the inlet opening when the buckle is rotated.

For holding the buckle directed in a predetermined direction in the main body, downward-bent lateral walls are formed on either side of the seat section of the main body and the buckle is fitted in or on the lateral walls. The lateral walls include pawl-like one.

Generally a spring is used for the above-mentioned elastic member, but the present invention is not limited to such elastic member.

The preferable examples of the above mechanism include the following:

(a) The width of the buckle should be smaller than the distance between the walls of the inlet opening. The spring as the elastic member has one end thereof coupled at a portion of the seat section and the other end coupled at a portion of the buckle. In this condition, the buckle is forcibly rotated at least 90° and then fitted between the lateral bent walls of the seat section, whereby the buckle is held in a predetermined direction or in such a posture that the length thereof is parallel to the inlet opening of the channel rail. When the buckle is rotated forcibly through at least 90°, the spring is wound up. While the buckle is held by the seat section, the spring is kept as wound up. Since axial pushing of the screw member releases the rotation energy accumulated in the spring, the buckle is rotated upon passing by the lateral bent walls of the seat section. The stoppers are higher then the abutments, so that the stop end faces thereof abut the inlet-opening walls, whereby the buckle is automatically blocked against rotation and takes a position perpendicular to the inlet opening of the channel rail. Since the abutments are under the inlet-opening walls and the lifting force of the spring acts on the buckle, the abutments of the buckle are engaged on the bottom faces of the inlet-opening walls so that the buckle is provisionally fixed.

(b) Also in this example, the width of the buckle should be smaller than the distance between the walls of the inlet opening. The buckle is fitted on the seat section of the main body under the action of the spring member and at this time, the rotation lead section located in the middle of the threaded body of the screw member is fitted at the beginning end thereof in the guide hole in the seat section. When the screw member is pushed axially, the rotation lead section passes through the guide hole, whereby the screw member rotates while falling and the buckle on the screw member rotates while falling along with the screw member. Thus the stop face abuts the inlet-opening walls and thus blocked against rotation, as in (a) and the abutments are engaged to the lower ends of the inlet-opening walls under the action of the spring. This is the provisional fixation.

(c) In this example, the width of the buckle may not be smaller than the distance between the walls of the inlet walls. The right and left parts of the buckle are fitted to the seat section under the action of the spring, and held with the length of the fixture directed perpendicularly to the channel rail. Pushing the screw member will cause the right and left parts to touch the inlet-opening walls and thus closed about the horizontal shaft piece. When the buckle passes by the lower ends of the inlet-opening walls, the right and left parts will be opened about the horizontal shaft piece. The buckle is engaged to the lower ends of the inlet-opening walls under the action of the spring. This is the provisional fixation.

In any of the above-mentioned exemplar mechanisms, just pushing the screw member in the axial direction will cause the buckle to rotate through a predetermined angle while entering into the inlet opening of the channel rail and the buckle to elastically be engaged on the lower ends of the inlet-opening walls. Thus, the main body is pulled, and the conduit is held by the retainer section and provisionally fixed to the channel rail. Hence, the primary step of clamping is done very simply and efficiently. Since no operation is required to rotate the screw member in this step of clamping, no erroneous operation takes place. Namely, even a unskilled person can positively complete this provisional fixation. Therefore, even when the channel rail is laid with the inlet opening directed downward and a conduit is to be clamped to the channel rail as applied from below, the worker has to take a painful posture only for a very reduced time. Also this fixation of conduits with the conduit clamp according to the present invention does not need many persons, but can be simply effected by only a single worker.

Since it is not necessary to turn the screw member, the buckle will never be disengaged from the screw member due to any erroneous counterclockwise turning of the screw member. Therefore, the conduit clamp according to the present invention is very safe and free from any trouble that the buckle will not drop into the channel rail or the buckle and conduit will not drop down to the worker's head.

According to the present invention, the buckle is limited from rotation by the inlet opening much narrower than the distance between the flange inner-walls of the channel rail. Thus, the buckle can be designed extremely compact. Hence, even in the mechanisms (a) and (b), the buckle is prevented from entering to under the retainer section when the buckle is held longitudinally parallel to the length of the inlet opening of the channel rail. Therefore, when the retainer section of the main body is applied to the conduit in the initial step of fixation, no operation is required to change the direction of the buckle so that a conduit can be clamped with a reduced turning amount of the screw member, which considerably improves the work efficiency.

Further, the buckle may be shorter, so that the distance from the engagement with the screw member to the buckle is shorter. Thus the rigidity of the buckle can be made larger so that when a large force of tightening is applied to the engagement with the screw member, the buckle will never be deflected.

Basically, the conduit clamp according to the present invention comprises a main body having a retainer section with a seat section at one side thereof and a foot section on the other side, and the lower end portions of the foot section are engaged in the inlet opening of the channel rail. However, the present invention is not limited to this arrangement, but the retainer section may provided with seat sections at opposite sides thereof and each of the seat sections may be provided with a buckle specified in any of (a), (b) and (c). Thus, the retainer section of the main body can be applied to a conduit and two screw members can be pushed to provisionally clamp the conduit.

Also the conduit clamps according to the present invention include those of which the main body has a retainer section composed of substantially more than one part so that the plurality of retainer parts are applied to hold a conduit. With this arrangement, a single main body can be used to fix a plurality of conduits at predetermined spacings and in parallel to each other.

The main body, buckle and elastic member of the conduct clamp according to the present invention are basically made of a metal, typically a ferrous material, but they may be made a nonmetallic material such as plastic or the like.

The channel rails to which the present invention is applicable include a type of which the inlet-opening walls droop vertically, a type of which the inlet-opening walls droop obliquely, a type of which the inlet-opening walls are horizontal and similar types.

These and other objects and advantages of the present invention will be better understood from the ensuing description made, by way of example, of the embodiments with the present invention with reference to the drawings.

DETAILED DESCRIPTION OF THE PREFERRED EMBODIMENTS

The embodiments of the present invention will be discussed below with reference to the drawings.

First Mode (see FIGS. 1 to 40)

Figure 22:
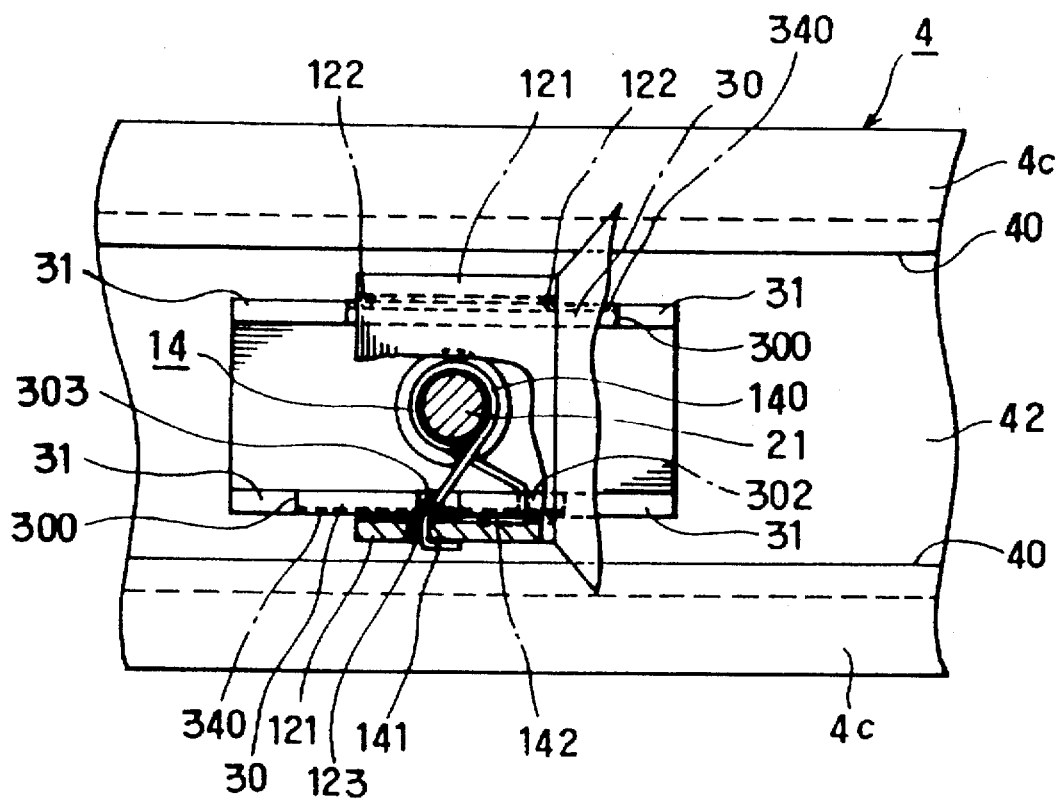
FIG. 22 is a partially-fragmentary plane view of the first embodiment in the first mode, set on a channel rail.
Figure 10:
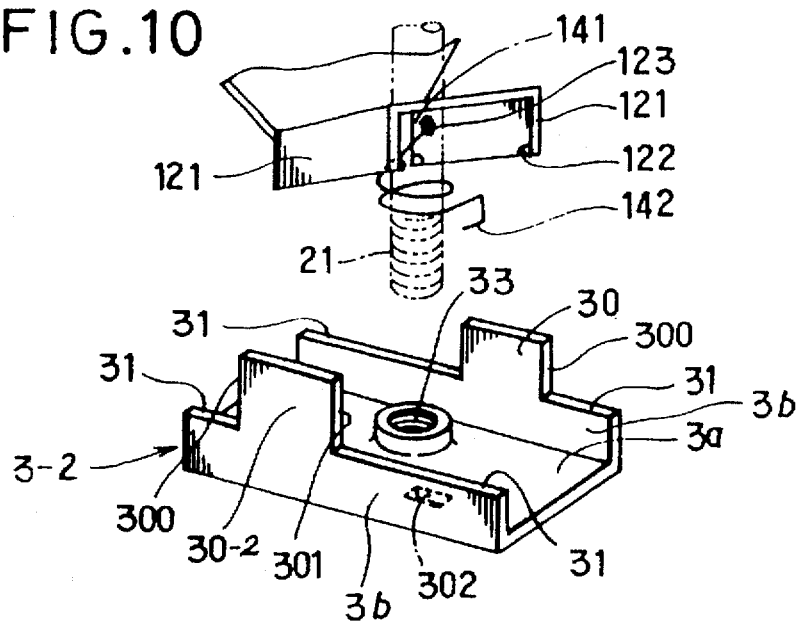
FIG. 10 is a perspective view of a variant of the buckle used in the conduit clamp according to the first mode, also with the relation thereof with the elastic member.
Figure 23:
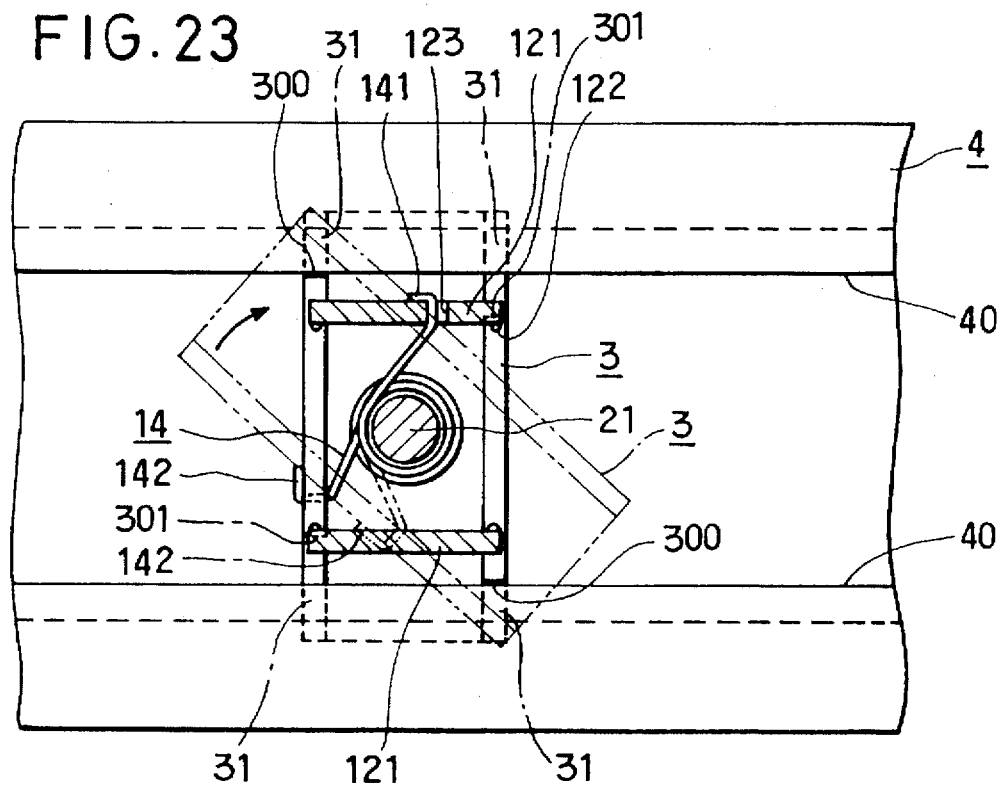
FIG. 23 is a cross-sectional view of the first embodiment in the first mode, in which the screw member is pushed axially for provisional fixation of the conduit.
Figure 24:
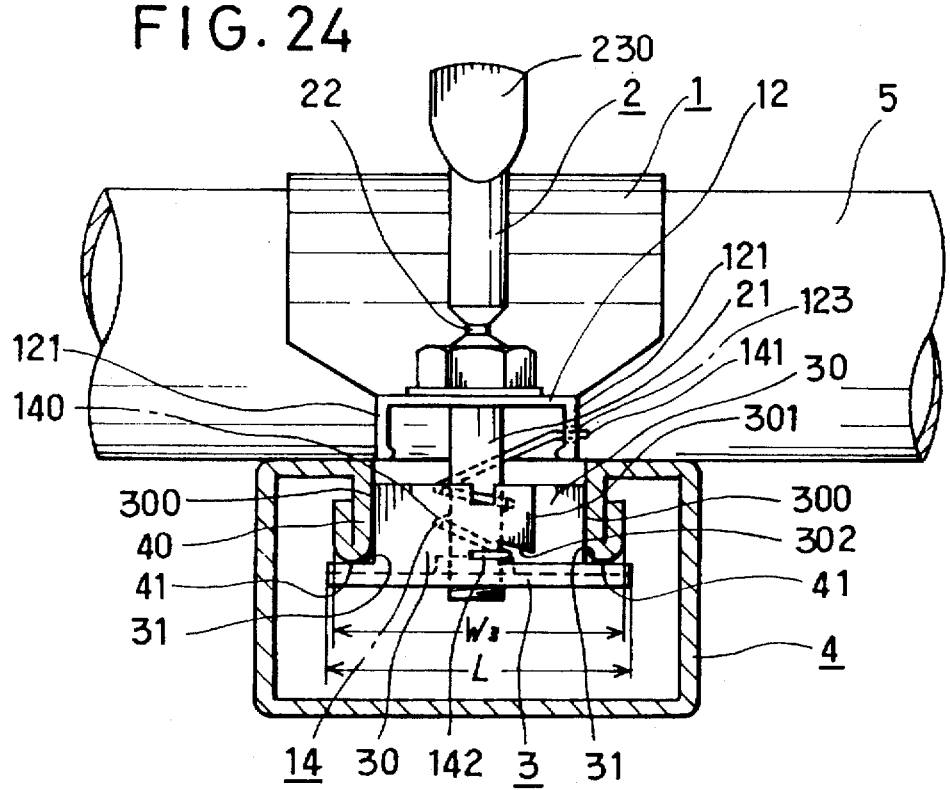
FIG. 24 is a front view of the first embodiment in FIG. 23.

FIGS. 1 to 8 shows the first embodiment in the first mode (type (a)) of the present invention, and FIGS. 22 to 24 show the use thereof.

Figure 1:
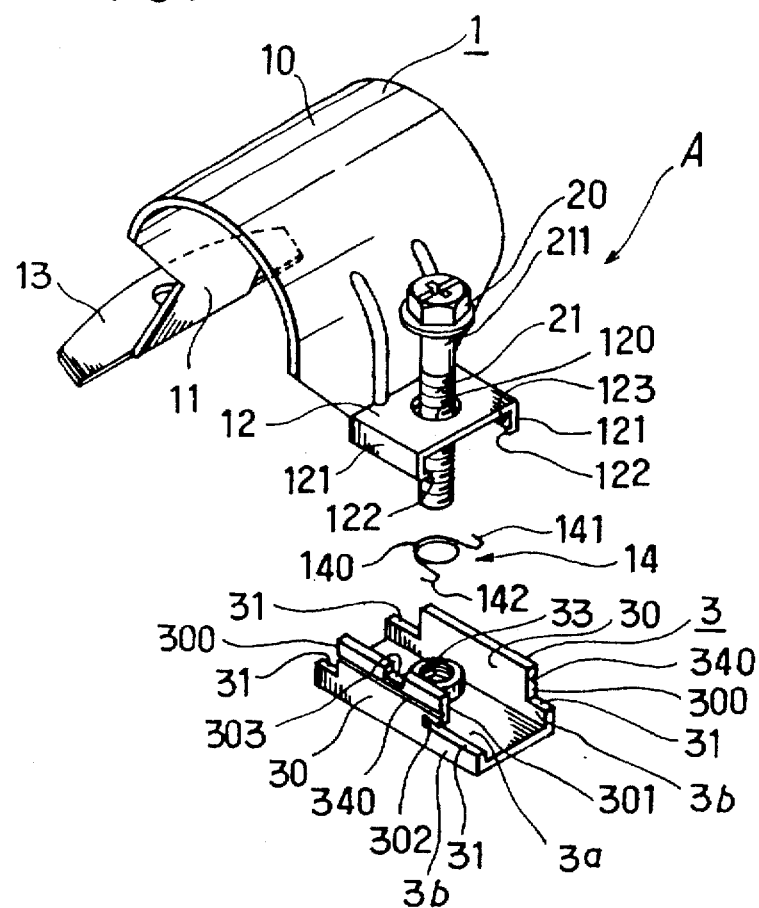
FIG. 1 is a perspective exploded view of a first embodiment in a first mode (type (a)) of the conduit clamp according to the present invention.
Figure 3:
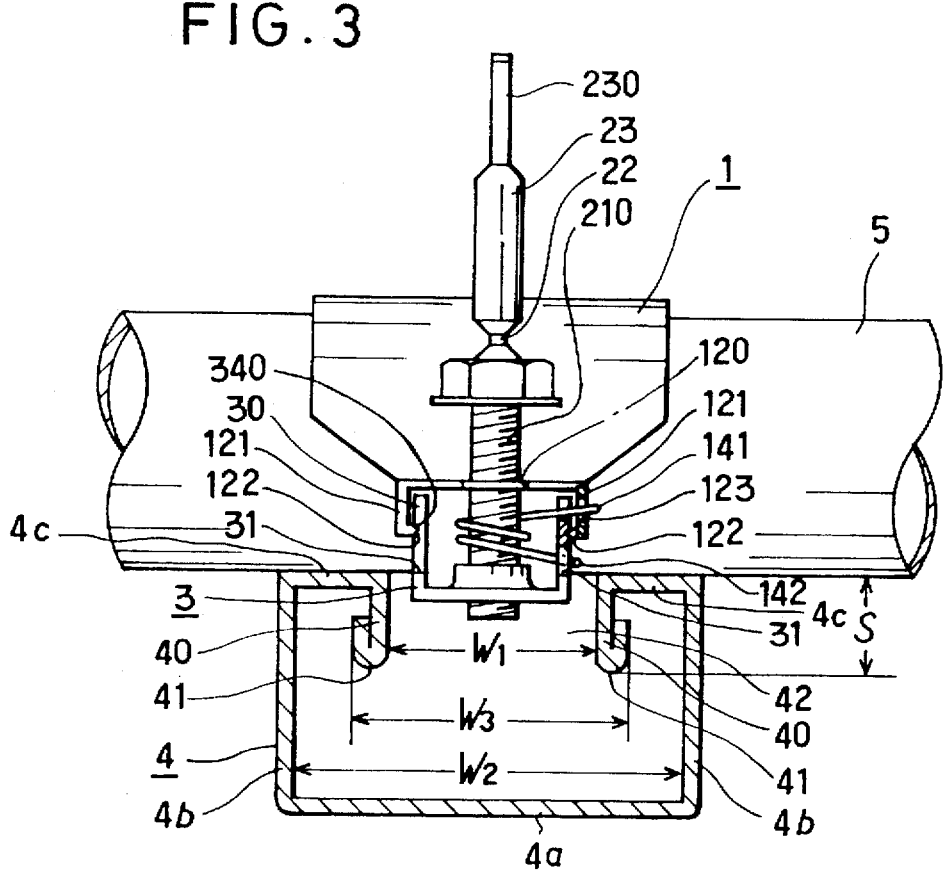
FIG. 3 is a partially-fragmentary front view of the first embodiment in the first mode, set on a channel rail.
Figure 4:
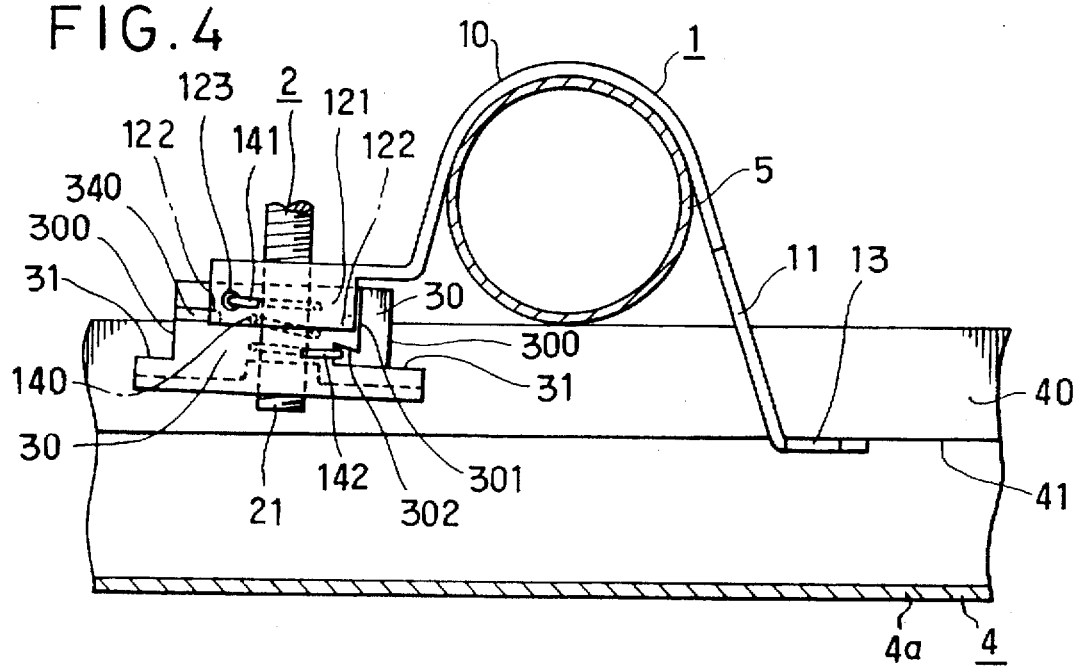
FIG. 4 is an axial-sectional side elevation of the first embodiment in the first mode, set on a channel rail.

In FIG. 1, the reference A indicates generally a conduit clamp according to the first mode of the present invention. The conduit clamp A consists of a main body 1, screw member 2, buckle 3 and an elastic member 14 which lifts and rotates the buckle 3. In FIGS. 3 and 4, reference numeral 4 denotes a channel rail as a saddle, and reference numeral 5 denotes a conduit.

In this embodiment, the channel rail 4 is composed, as shown in FIG. 3, of a web 4a, a pair of flanges 4b provided at either side of the web 4a, and top walls 4c extending inwardly from the upper ends of the flanges 4b and extended by drooping walls 40 formed by bending at a right angle. Thus, an inlet opening 42 is defined by the pair of inlet-opening walls 40. The inlet opening 42 has a width $W_1$ smaller than the distance $W_2$ between the inner walls of the flanges 4b. The inlet-opening walls 40 have extensions reversed outside thereof and which extend upward.

A plurality of channel rails 4 is laid and the channel rails are regularly spaced, and each channel rail is connected at either longitudinal end thereof to a suspension rod laid on the wall of a construction or building, with the inlet opening 42 directed upward, or the web 4a is fixed to the ceiling or the like with the inlet opening 42 directed downward. For simplicity of the description, however, the former manner of channel rail fixation with the inlet opening 42 directed upward is illustrated in the drawings. The conduit 5 is disposed perpendicularly to the plurality of channel rails 4.

The main body 1 is made of a ferrous metal, nonferrous metal such as aluminum, nonmetal such as plastic, or a composite material of a metal and nonmetal. This material of the main body 1 is also true for the second and third modes of the present invention which will be discussed later.

The main body 1 includes a retainer section 10 so curved as to fit the sectional form of the conduit. The retainer section 10 is so curved as to be in contact with an area of the conduit that is equivalent to at least ⅓ of the circumferential length thereof. The main body 1 further includes foot section 11 extending obliquely downward from the curved retainer section 10, and engagement portions 13 provided at the lower end of the foot section 11 and which are to abut the lower ends 41 of the inlet-opening walls 40 of the channel rail 4. The engagement portions 13 are bent in this embodiment, but they are not limited to this form.

The main body 1 further includes, as bent at the lower portion of the curved retainer section 10 opposite to the foot section 11, a seat section 12 being horizontal or having an appropriate angle of inclination. The seat section 12 has a width smaller than the distance $W_1$ between the inner faces of the inlet-opening walls 40 of the channel rail 4, and has formed nearly in the center thereof a through-hole 120 larger in diameter than the screw 2. The seat section 12 has a pair of bent walls 121 formed at either lateral edges thereof to hold the buckle 3. The angle of the bent lateral walls 121 with respect to the seat section 12 may not necessarily be a right angle. Also the bent lateral walls 121 may not necessarily be any continuous ones.

Figure 2:
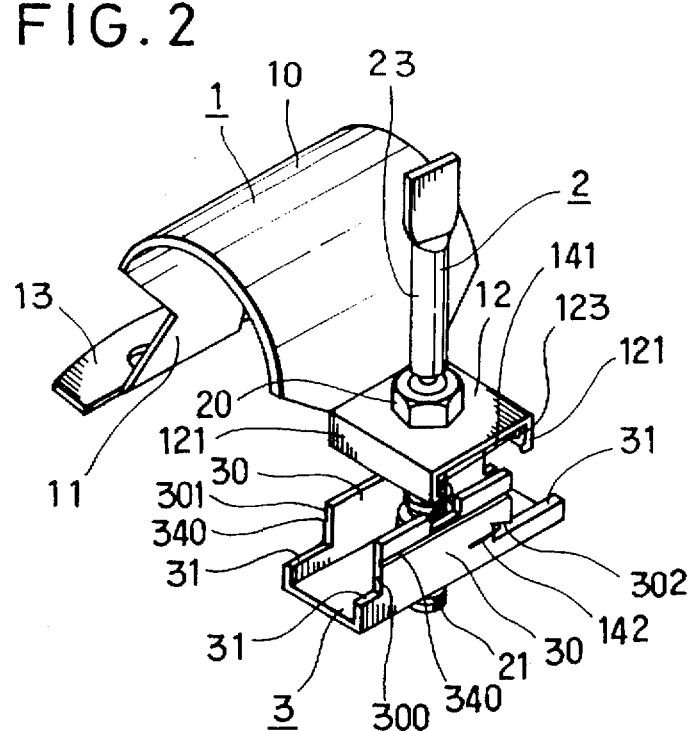
FIG. 2 is a perspective view of the first embodiment in the first mode at the completion of the secondary step of fixation, with the channel rail and conduit omitted from the illustration.

The screw 2 is inserted in the through-hole 120 in the seat section 12. The screw 2 is not limited to any specific type, but it may be an ordinary one having a head 20 at the upper end of a threaded body 21 thereof. As shown in FIGS. 2 and 3, the screw 2 has provided above the first head 20 thereof as a smaller-diameter portion 22 which is to be broken when a predetermined tightening torque is reached, and a second head 23 above the portion 22.

In this embodiment, the second head 23 is a long stem which will project above the curved retainer section 10 when the first head 20 abuts the seat section 12, and it has provided atop thereof a flat portion 230 which is turned by using a pliers to apply a torque to the screw 2. Because of this arrangement, the screw 2 can be easily turned even in case the channel rails 4 are laid with smaller intervals, and the screw 2 is not applied with any torque larger than specified. In this embodiment, the threaded body 21 has a threadless neck portion 211 below which the thread is formed.

Similar to the main body 1, the buckle 3 is made of a ferrous metal, nonferrous metal such as aluminum, nonmetal such as plastic or a composite material of a metal and nonmetal by a selected method such as pressing, casting or injection molding. Otherwise, the buckle 3 may be made of a square pipe by shearing. These material and method of manufacture are also true for the second and third modes of the present invention which will be discussed later.

Figure 5:
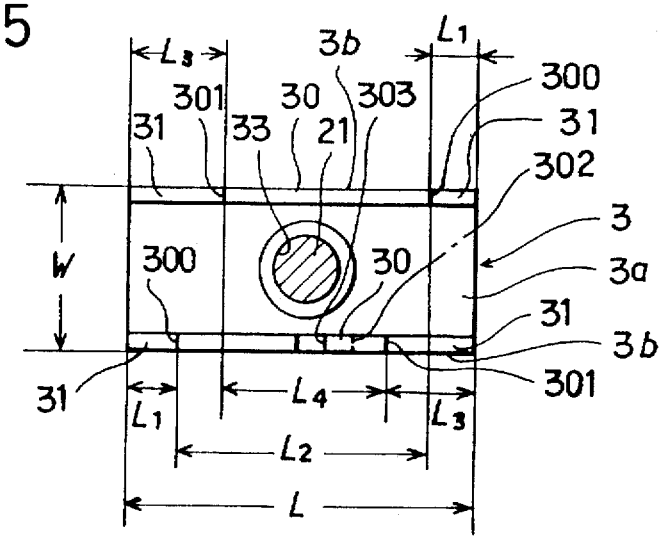
FIG. 5 is a plan view of a buckle used in the conduit clamp according to the first mode of the present invention.
Figure 6:
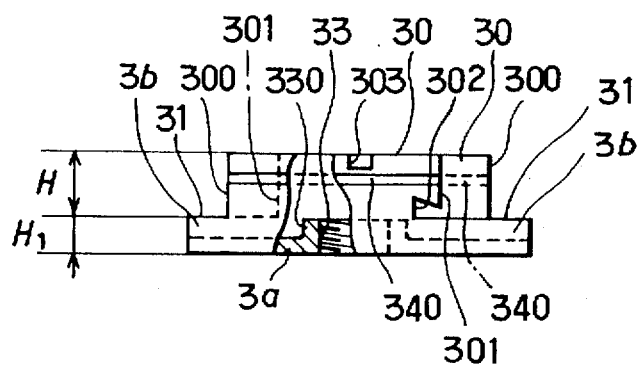
FIG. 6 is a partially-fragmentary side elevation of the buckle in FIG. 5.

The buckle 3 is shown in FIGS. 5 and 6. The buckle 3 has a total length L larger than the width W. As seen from FIG. 3, the width W is smaller than the distance $W_1$ between the inner faces of the inlet-opening walls 40. The length L is rather smaller than the distance $W_2$ between the inner faces of the flanges 4b of the channel rail 4 as will be discussed later with reference to FIG. 24. That is, the length L should preferably be equal to or somewhat (on the order of 1 to 3 mm) larger than the distance $W_3$ between the outer faces of the inlet-opening walls 40.

The buckle 3 has formed in the center thereof a screw hole 33 in which the threaded body 21 of the screw 2 is threaded. The buckle 3 has provided at either longitudinal end portion thereof abutments 31 which abut the lower ends 41 of the inlet-opening walls 40, and in addition it has provided at either lateral edges thereof a pair of projections 30 extending higher than the abutments 31.

The projections 30 are provided to block the buckle 3 against rotation within the channel rail 4, stop the rotation of the buckle 3 when positioned perpendicular to the length of the channel for the channel rail and guide the abutments 31 for vertical rise with the buckle being perpendicular to the channel for the channel rail. Further, when being walls, the projections 30 also cooperate with the bent lateral walls 121 of the seat section 12 to hold the buckle 3 directed as predetermined until the conduit clamp is used. This "holding" means keeping the buckle 3 secured to the seat section 12 with the buckle 3 oriented in a predetermined direction namely, with its length being parallel with the inlet opening 40 of the channel rail 4 (in the first mode of the present invention) as shown in FIGS. 3 and 4, until clamping of a conduit 5 is started. Especially, it is important in this first mode of the present invention that the buckle 3 is fixed while the rotational energy exerted from the elastic member 14 is being accumulated.

The two projections 30 have each a stop face 300 engageable on the inlet-opening wall 40, and these stop faces 300 are located in symmetry on the projections 30. In FIG. 5, the stop face 300 of the lower projection 30 lies at the left while the stop face 300 of the upper projection 30 is at the right.

The distance $L_2$ between the right and left stop faces 300 shown in FIG. 5 is set nearly equal to the distance $W_1$ between the inner faces of the inlet-opening walls 40. The distance $L_1$ from the stop face 300 to the free end is the effective length of the abutments 31.

The end faces 301 300 of the projections 30 (opposite stop faces) should not have any function of limiting the rotation. The distance $L_3$ from the end face 301 of each projection 30 to the free end must be longer than the distance $L_1$ from the stop face 300 to the free end, while the distance $L_4$ between the two end faces 301 must be shorter than the distance $L_1$ between the inner faces of the inlet-opening walls 40. This is required for rotating the buckle 3 through 90° from the position where it is parallel to the length of the channel rail 4. However, the end face 301 may not necessarily be at a right angle with respect to the abutment 31, but it may be inclined or curved.

In this first embodiment, the projections 30 are walls, and the buckle 3 has the sectional form of a channel perpendicular to the length thereof. The buckle 3 has formed by burring on a base or web or base 3a thereof a boss 330 in which a screw hole 33 is formed. The abutments 31 are formed as flanges 3b rising from either side of the web 3a to a relatively low height. The flange end faces are formed to cooperate with the lower ends 41 of the inlet-opening walls 40.

Because of this arrangement, an effect of angulation or bending can be obtained by increasing the strength of the abutments 31 so that the buckle 3 may be thin and a material may be selected from a wider range of materials. Since the abutments include narrow flange end faces, their bearing can be increased and they do not easily slip on the lower ends 41 of the inlet-opening walls 40. The projections 30 are formed by extending the flanges 3b further upward.

The projections 30 also serve as stoppers against the rotation of the buckle 3. The projections must have such a height H that even when the buckle 3 is forcibly rotated with the stop faces 300 resting on the inlet-opening walls 40, the engagement is securely maintained. Also the projections 30 function to hold the buckle 3 with the elastic member 14 wound up until a conduit is clamped. So the height of the projections 30 should be such that they are sufficiently engageable on the bent lateral walls 121 of the seat section 12. In these respects, the height H must be equal to or larger than the height $H_1$ from the bottom face of the buckle 3 to the top of the flange, and preferably it should be 1.4 to 1.8 times larger than the height $H_1$ as shown in FIG. 6.

When the dimension W spanning the projections 30 in FIG. 5 equals the distance between the inner faces of the bent lateral walls 121 of the seat section 12 in the case that the projections 30 are walls, the projections 30 may be held by the friction on the bent lateral walls 121. However, to ensure that the buckle 3 can be positively held and disengaged with a relatively small force when the screw member is pushed even if there is some dimensional difference between these components, the seat section 12 according to the present invention has at least a protrusion 122 at either inner face of the bent lateral walls 121 thereof and a concavity 340 in the outer face of each projection 30. The protrusion 122 may be provided on the projection side and the concavity 340 may be provided on the bent lateral wall side.

Figure 7:
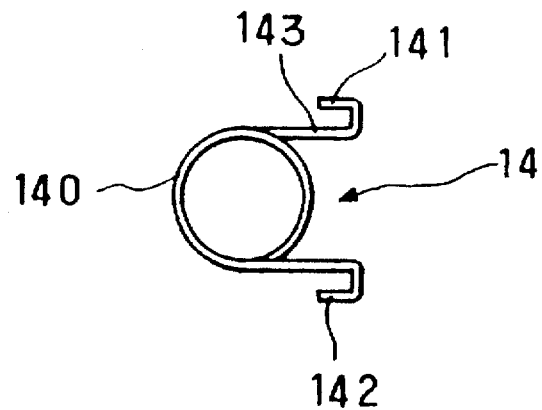
FIG. 7 is a plan view of an exemplar elastic member used in the conduit clamp according to the first mode.

According to the first mode of the present invention, the elastic member 14 does not only raise the buckle 3 but also imparts a rotational force to the buckle 3. A typical one of the mechanical elements having such functions is a spring. The spring is not limited in shape and kind to any specific one. Generally, however, a cylindrical coil spring or torsion coil spring with a coil portion 140 having more than one turn is used as the spring 14 as shown in FIGS. 1 and 7. For this elastic member, a tension spring may be used as will be described later. Thus the elastic member 14 will be referred to as "spring" hereafter.

The coil portion 140 has such a diameter that the threaded body 21 can be inserted through it, and one end 141 thereof contiguous from the coil portion 140 is hooked at a part of the seat section 12 while the other end 142 is at a part of the buckle 3.

The ends of coil portion 140 may be coupled by bonding, welding or the like. Otherwise, in case the buckle 3 is made of a plastic, the coil end may be formed integrally with the buckle 3. For a high efficiency of clamping in this embodiment, however, the one and other ends 141 and 142 made like a hook are hooked in a retention hole 123 formed in the seat section 12 and a retention cut 302 formed in the buckle 3, respectively. According to the present invention, the retention hole 123 in the seat section 12 is formed in one of the bent lateral walls 121 (right one as viewed from front). The hole should preferably be formed in a location near the end of the bent lateral wall 121 as shown in FIG. 4 in order to obtained an increased wind-up of the spring 14. Of course, the hole may be formed in the other bent lateral wall (left one as viewed from front). Furthermore, the hole may be formed in the main portion of the seat section 12 or at the boundary between the main portion and the bent lateral wall. The retention hole 123 may be a cut.

The retention cut 302 in the buckle 3 is provided in other place than the abutment 31. According to the present invention, a cut is formed in the lower portion of one of the projections 30, especially, in the opposite stop face 301 and it is used as the retention cut 302. Instead, the retention cut 302 may be a same one as in the seat section 12.

In this embodiment, one end 141 of the spring 14 is hooked at a position near the end of the bent lateral wall 121 as in the above. There is formed atop the projection 30 in which the retention cut 302 is provided a cut 303 through which a portion 143 extending from the end of the coil portion 140 is lead to the bent lateral wall 121. However, the cut 303 is not always required depending upon the position where the one end 141 of the spring 14 is hooked or on the insertion depth of the buckle 3 into the seat section 12.

Figure 8:
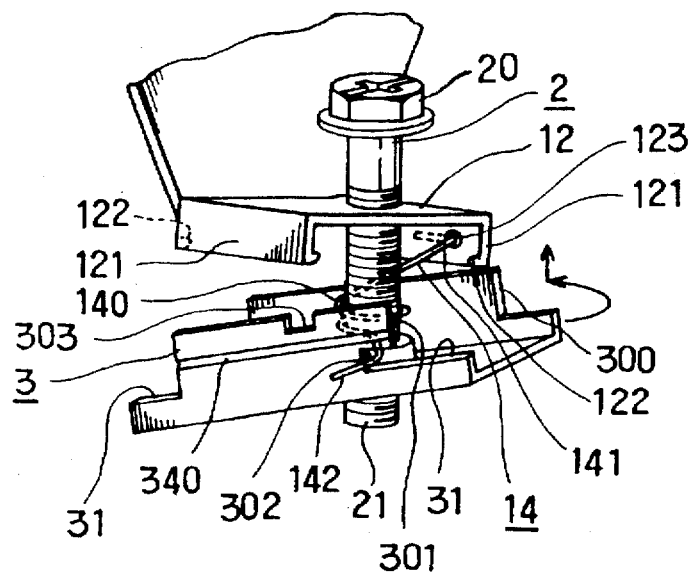
FIG. 8 is a partially perspective view showing the assembling process in the first embodiment in the first mode.

The one end 141 of the spring 14 in the position in FIG. 1 is hooked in the retention hole 123 in the seat section 12 while the other end 142 is in the retention cut 302 in the buckle 3. This is shown in FIG. 8. The buckle 3 is grasped by the hand of an assembling worker or a robot and forcibly rotated toward the smaller diameter portion (counterclockwise in this embodiment) of the coil portion 140 of the spring 14. The angle of rotation is more than 90°. In case the spring 14 is hooked when the buckle 3 is directed as shown in FIG. 1, the angle of the rotation of the buckle 3 is on the order of 180°. When the projection 30 in which the retention cut 302 is provided becomes parallel to the bent lateral wall 121 having the retention hole 123, the projections 30 are forced between the bent lateral walls 121 of the seat section 12. Thus, the buckle 3 is securely held at the seat section 12 as shown in FIGS. 3 and 4, and the spring 14 is kept wound up.

Figure 9:
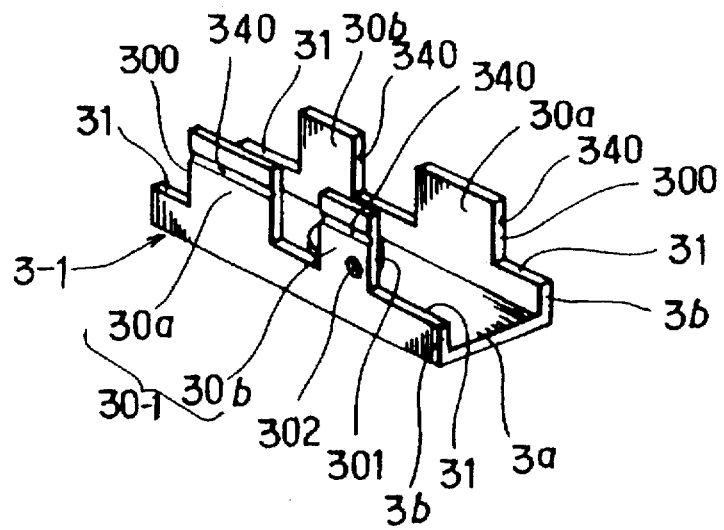
FIG. 9 is a perspective view of a variant of the buckle used in the conduit clamp according to the first mode.

FIG. 9 shows another embodiment of the buckle 3-1 used in the present invention. In this embodiment, the projections 30-1 at either lateral edge are not each any single wall but are split having an intermediate space between them.

More particularly, each of the projections 30-1 consists of a first and second projections 30a and 30b. The stop face 300 is provided on the first projection 30a, while the opposite stop face 301 is on the second projection 30b. In this embodiment, there is formed in the second projection 30b a hole taking the role of the retention cut 302 for the other end 142 of the spring 14. Of course, the cut in the aforementioned embodiment may be used in place of such hole. Other structure is the same as in the previous embodiment.

Figure 11:
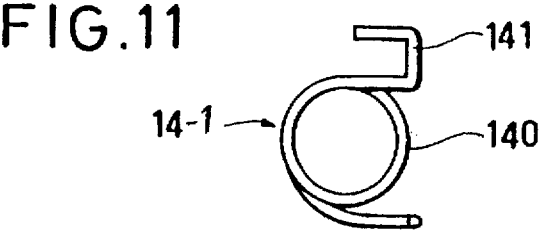
FIG. 11 is a plan view of an exemplar elastic member used in the variant of the buckle in FIG. 10.
Figure 12:
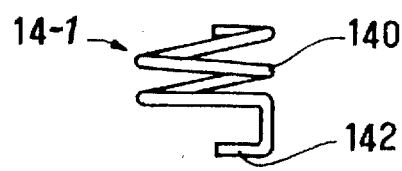
FIG. 12 is a side elevation of the elastic member in FIG. 10.
Figure 13:
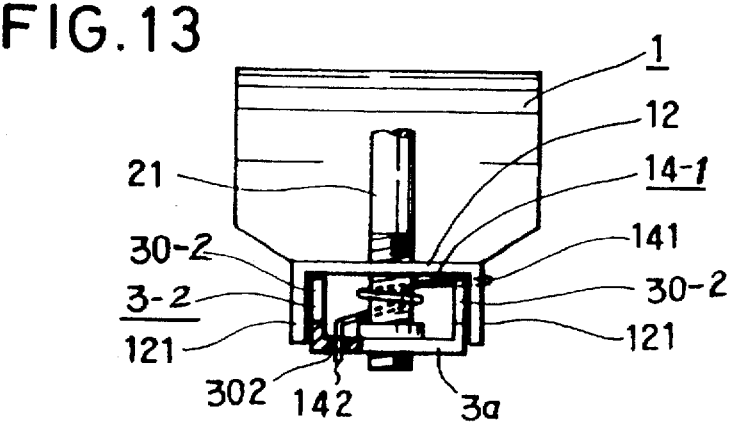
FIG. 13 is a partially-fragmentary front view showing the setting of the buckle shown in FIG. 10 in the main body.

FIGS. 10 to 13 show a yet another embodiment of the buckle 3-2. According to this embodiment, the projections 30-2 are walls and designed short. Therefore, the bent lateral walls 121 of the seat section 12 are designed higher than the projection 30-2 as shown in FIG. 13, and the buckle 3-2 is held with the flanges 3b set between the bent lateral walls 121. The bent lateral walls 121 may be appropriately bent inwardly to increase the grasping force of the bent lateral walls 121. Also, it is of course, there may be formed in the flanges 3b concavities as described in the previous embodiment and in which the protrusions 122 of the bent lateral walls 121 are fitted.

In this embodiment, the retention hole 302 is formed as a hole in the web 3a. The spring 14-1 has the second end 142 thereof bent longitudinally as shown in FIGS. 11 and 12 and which is hooked in the retention hole 302. The first end 141 of the spring 14-1 is bent laterally and engaged in the retention hole 123 in one of the bent lateral walls 121 of the seat section 12.

The angle of rotation for retaining the aforementioned buckle 3-2 on the seat section 12 has a relation with the number of turns of the coil portion 140 of the spring 14 as well. In case the coil portion 140 has a large number of turns, the coil portion 140 is held by means of the seat section 12 after winding up the spring by turning the buckle 3 to an angle of rotation of more than 180°, for example, to 270°.

Figure 14:
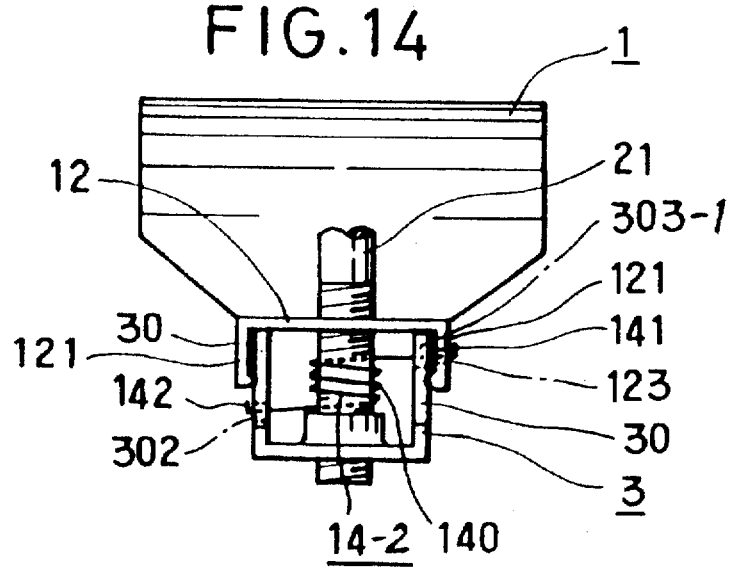
FIG. 14 is a front view showing the setting of a spring, as elastic member, having many turns, used in the first embodiment in the first mode.
Figure 15:
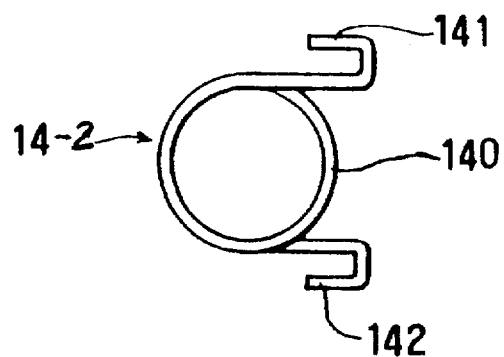
FIG. 15 is a plan view of an exemplar spring having many turns.
Figure 16:
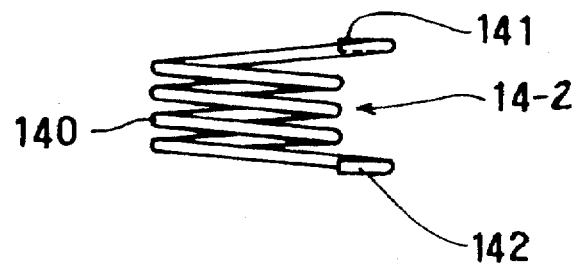
FIG. 16 is a side elevation of the spring shown in FIG. 15.

FIGS. 14 to 16 show a spring 14-2 having a large number of turns, as an example. In case this spring 14-2 is used as combined with the buckle 3 shown in FIGS. 5 and 6, the cut 303 is formed in the projection 30 opposite to the projection 30 having the retention hole 302 and the retention hole 123 in the seat section 12 is formed in the latter half of the bent lateral wall 121. The one end 141 of the spring 14-2 is hooked in the retention hole 123, while the other end 142 is in the retention hole 302 in the projection 30. In this condition, the buckle 3 is rotated about 270° and introduced into the seat section 12.

Figure 17:
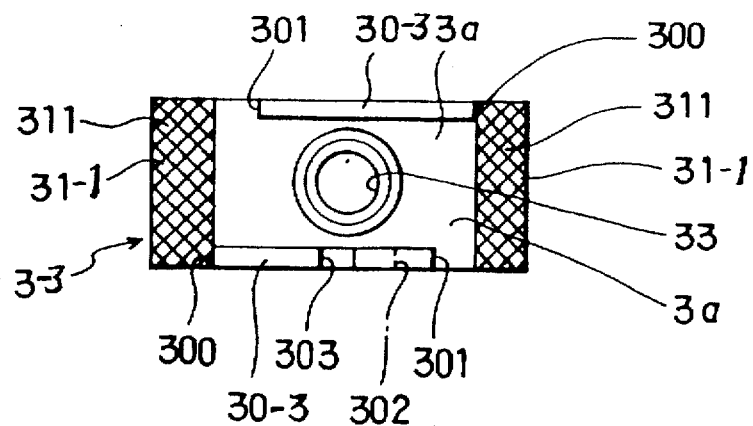
FIG. 17 is a plan view of a variant of the buckle used in the conduit clamp according to the first mode.
Figure 18:
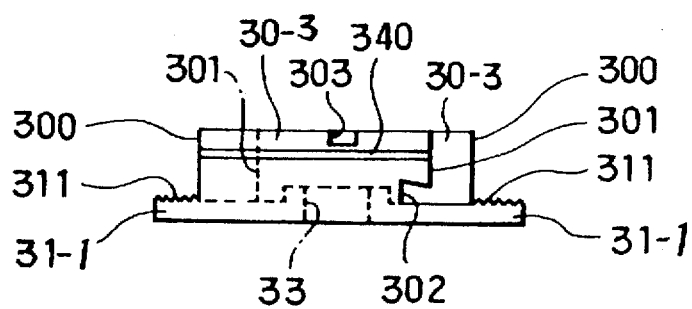
FIG. 18 is a side elevation of the buckle in FIG. 17.

FIGS. 17 and 18 show another variant of the buckle used in the conduit clamp according the first mode of the present invention. In this embodiment, the buckle 3-3 has the projections 30-3 formed as flanges on the web 3a. In the embodiment shown in FIGS. 17 and 18, the projections 30-3 may be divided and shortened. The abutments 31-1 are plate-shaped and have formed thereon frictional areas 311 by knurling or the like. Other constructions are similar to those in the embodiment shown in FIGS. 5 and 6, so the same elements as in the embodiment in FIGS. 5 and 6 are indicated with the same reference numerals and will be not discussed any more.

Figure 19:
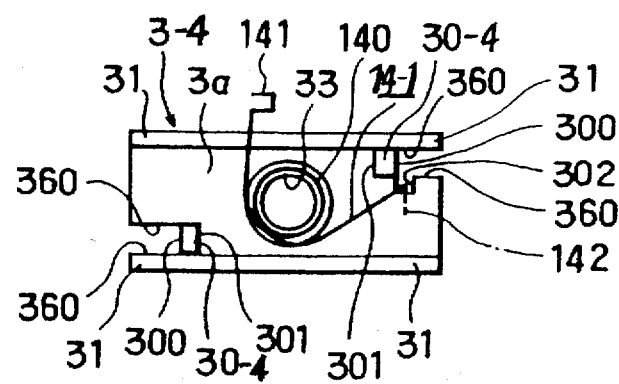
FIG. 19 is a plan view of a variant of the buckle and a spring used in the conduit clamp according to the first mode.

FIG. 19 shows a variant of the buckle 3-4 used in the conduit clamp according to the first mode of the present invention, in which the projections 30-4 are not any wall but a pawl-like projection. More particularly, there are formed in or near the lateral edge of the web 3a a set of two cuts 360 and a portion surrounded by these cuts 360 is bent upward. Also in this embodiment, the web 3a has formed therein a retention hole 302 in which the spring 14-1 is hooked at the other end thereof. The spring 14-1 may have the shape shown in FIGS. 11 and 12, and other constructions are similar to the aforementioned embodiment.

Figure 20:
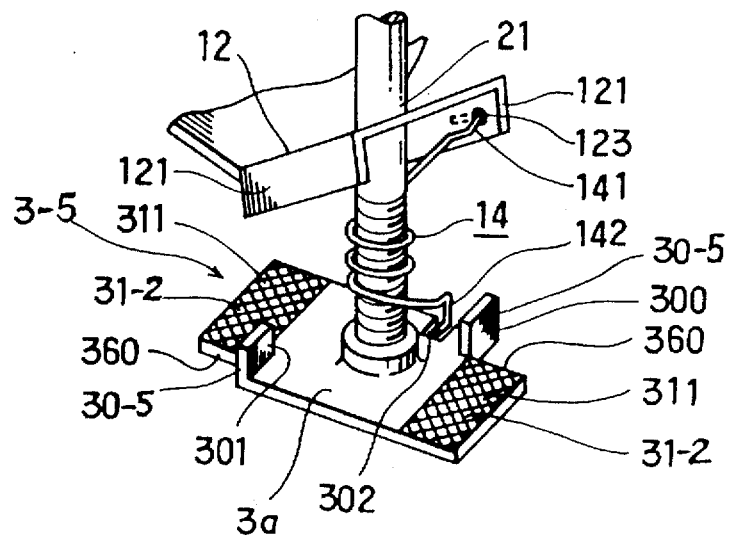
FIG. 20 is a perspective view of a variant of the buckle used in the conduit clamp according to the first mode, also with the relation thereof with the elastic member.

FIG. 20 shows a variant of the buckle 3-5 of which the projections 30-5 have the form of a pawl. The buckle 3-5 is like a plate, and have formed therein symmetrical cuts 360 parallel to the length of the web. A portion between the cuts 360 and the lateral edge of the web 3a is bent to form the projections 30-5. Further, a retention hole 302 is formed in a selected portion except for the abutments 31-2 (web edge near the projection in this embodiment) to fix the other end of the spring 14.

Figure 21:
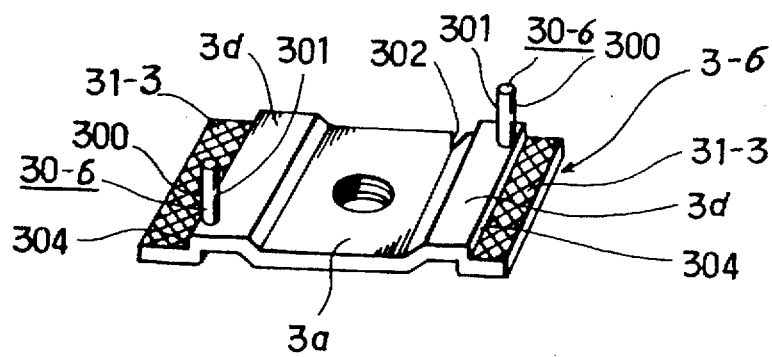
FIG. 21 is a perspective view of a variant of the buckle used in the conduit clamp according to the first mode.

FIG. 21 shows a variant of the buckle 3-6 of which the projections are like a column. In this embodiment, the buckle 3-6 is a plate, but the web 3a has formed thereon ribs 3d extending in the direction of the width thereof and pins are studded in the end portions of the ribs 3d to form the projections 30-6. The studding may be freely done by press-fitting, riveting, screwing, welding or the like. The construction with such ribs 3d may also be applied to the buckle 3-5 shown in FIG. 20. The retention hole 302 is formed in the edge of the web 3a in this embodiment.

For holding any of the buckles 3-2, 3-4, 3-5 and 3-6 shown FIGS. 10, 19, 20 and 21 to the seat section 12, the lateral bent walls 121 of the seat section 12 are desired higher or the lateral bent walls 12 are appropriately bent inward in addition to the increased height of the walls 121 to catch the web 3a at both sides extending in the direction thereof. In the embodiment shown in FIG. 10, the flanges 3b may have formed therein concavities in which the projections 122 are fitted.

FIGS. 25 to 31 show a second embodiment of the conduit clamp in the first mode of the present invention. The clamp A consists of a main body 1-1, a screw 2, a buckle 3-7 and a spring 14 as in the first embodiment.

The difference from the first embodiment is the structure of the main body 1-1. In the second embodiment, the beginning end portion of the retainer section extending to the right and left from the base of the foot section 11 is depressed inwardly of the retainer section to form the curved portions 100 having a curvature which fits that of the conduit 5.

Figure 25:
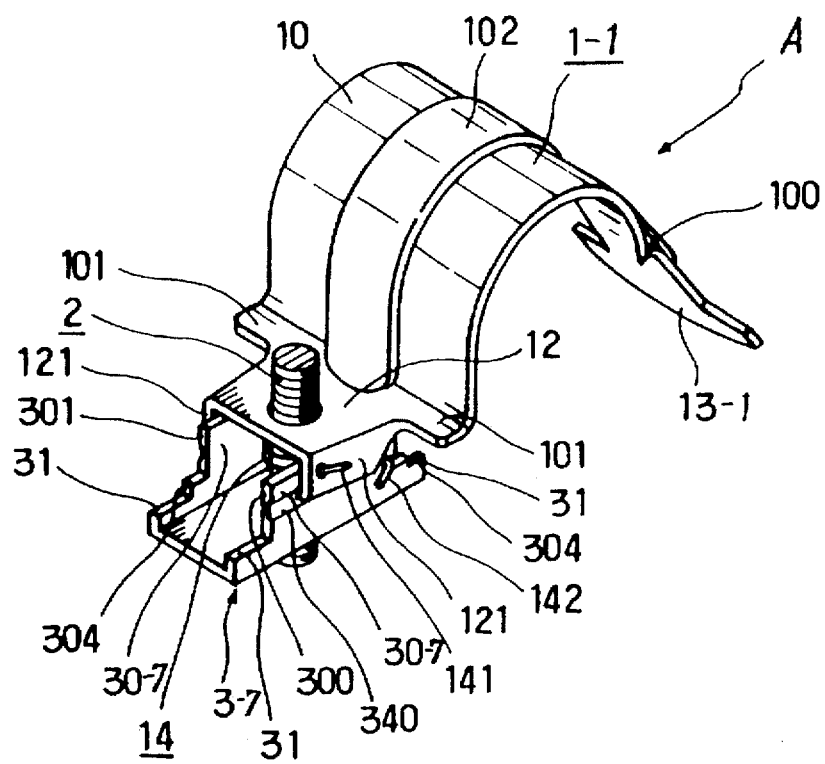
FIG. 25 is a perspective view of a second embodiment in the first mode of the conduit clamp.
Figure 27:
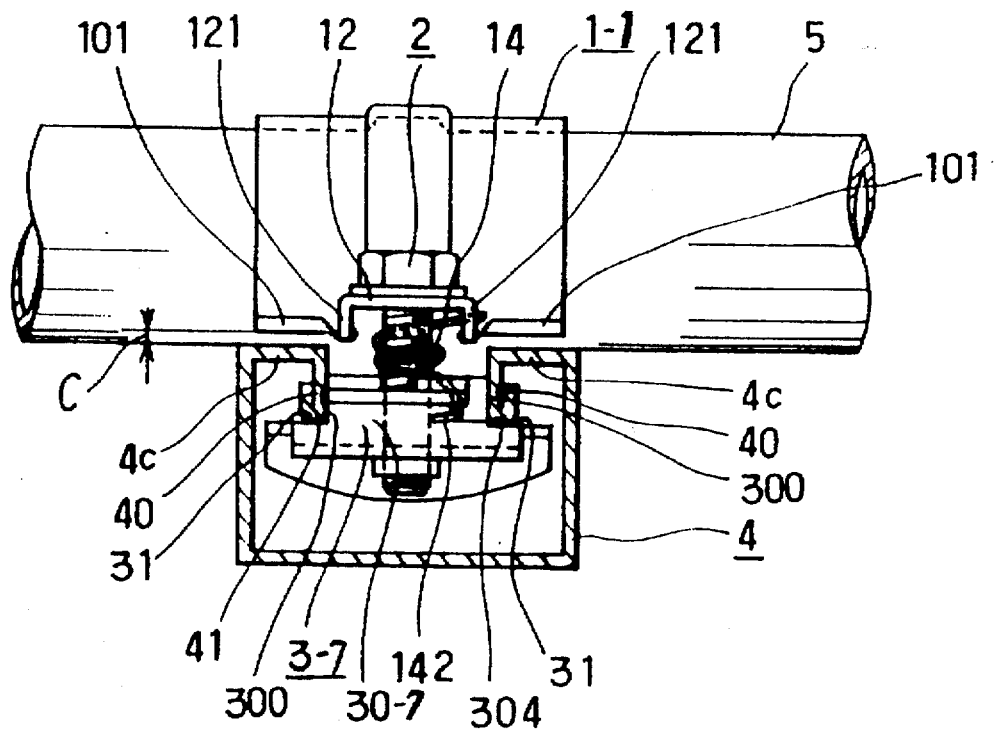
FIG. 27 is an axial-sectional view of the second embodiment, in which the screw member is pushed to provisionally fix the conduit.

The portion connecting the retainer section 10 and a seat section 12 to each other has no obliquely-cut edges as shown in FIGS. 1 and 2. More particularly the retainer section 10 is extended downward keeping the width as it is to form flanges 101 which hang over forward nearly horizontally to the right and left from the base of the seat section 12 as shown in FIGS. 25 and 27. The flanges 101 serve as stopper against fastening. The reference numeral 102 denotes a reinforcing rib formed extending from the base of the seat section 12 to the foot section 11.

The buckle 3-7 adopted in any of the aforementioned embodiments can be used for this embodiment. In this second embodiment, the buckle 3-7 has a similar structure to that shown in FIGS. 5 and 6. However, the buckle 3-7 in this embodiment has a boss 330 formed, by burring, downward of the web 3a and in which a screw hole 33 is formed.

Figure 29:
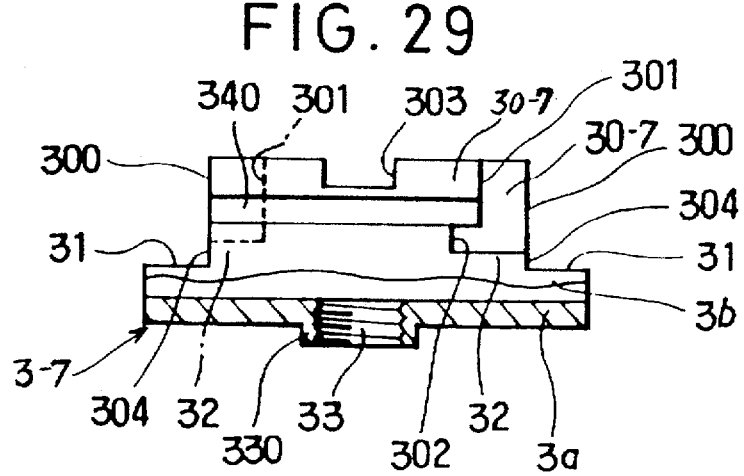
FIG. 29 is a partially-fragmentary side elevation of a variant of the buckle used in the conduit clamp according to the first mode.
Figure 30:
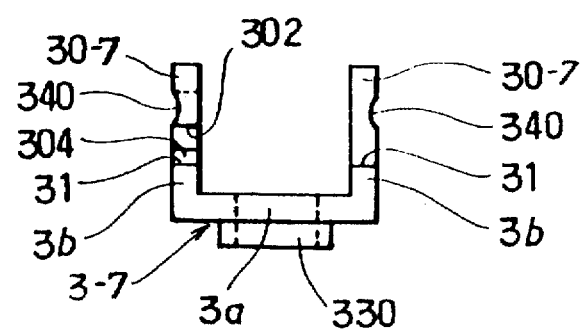
FIG. 30 is a front view of the buckle in FIG. 29.
Figure 31:
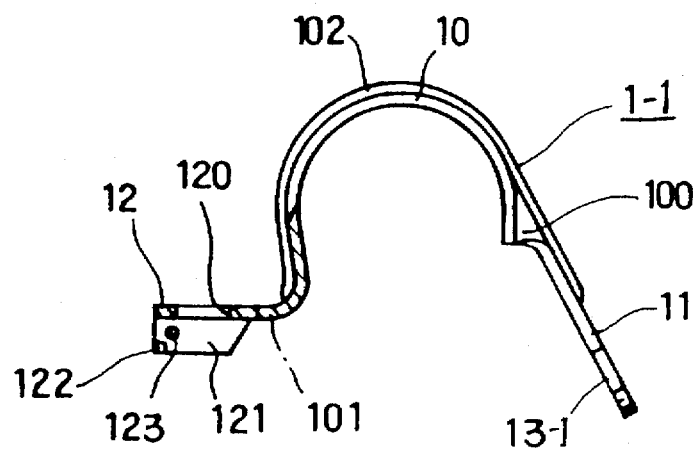
FIG. 31 is a partially-fragmentary side elevation of the main body in the second embodiment.

In the embodiment shown in FIGS. 5 and 6, the abutment 31 to the stop face 300 extends, keeping a constant height, to the lower end of the opposite stop face 301. In this second embodiment, however, as shown in FIG. 29, the height of each flange 3b is appropriately increased at a position adjacent to the opposite stop face 301, in other words, at a position where the effective abutment area of the abutment 31 begins (a position coincident with the stop face 300 at the opposite side, extending in the direction of width), thus forming a sub stop face 304. The two sub stop faces 304 are located in symmetry and extended by steps 32 which join the projections 30.

This structure is advantageous because the strength of the buckle is increased and the sub end face 304 rises at the abutment 31 opposite to the stop face 300 so the buckle 3 can be set precisely perpendicular to the channel of the channel rail 4.

Since the other elements are the same as those in the aforementioned embodiments, the same elements are denoted with the same reference numerals and will not be described any more.

The opposite stop faces 301 of the projections 30 in each of the aforementioned embodiments may be curved in the direction of thickness.

In each of the embodiments, the abutments 31 need not always be horizontal but their free ends may be designed substantially higher, which will be effective because it prevents the abutments from slipping on the lower ends 41 of the inlet-opening walls 40 of the channel rail 4 and positively defines the clamping position.

In the above embodiment, the buckle 3 is fitted in the bent lateral walls 121 of the seat section 12, but the present invention is not limited to this arrangement. The buckle 3 may be fitted on the bent lateral walls 121, which is also included in the first mode of the present invention.

Figure 32:
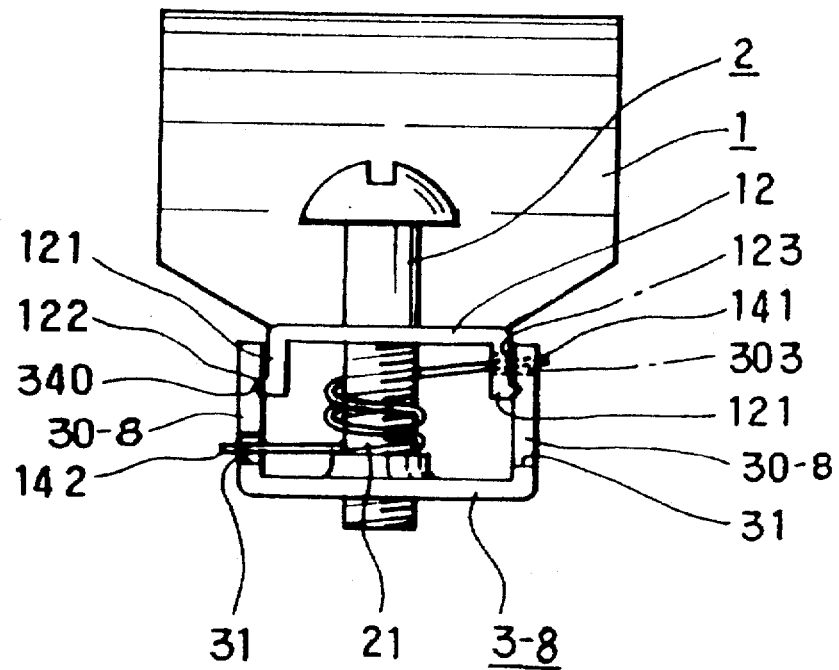
FIG. 32 is a front view of a variant of the retention by the retainer section in the present invention.

FIG. 32 shows the fitting of the buckle 3-8 on the bent lateral walls 121. In this embodiment, the web of the buckle 3-8 is widened and the projections 30-8 are fitted on the bent lateral walls 121 of the seat section 12. In this case, a protrusion or concavity 122 is provided on the inner face of the projections 30-8 and concavities or protrusions 340 are provided on the outer face of the bent lateral walls 121. In case one end 141 of the spring 14 is hooked on the lateral wall 121, a cut 303 should preferably be provided on the projection 30-8.

Figure 33:
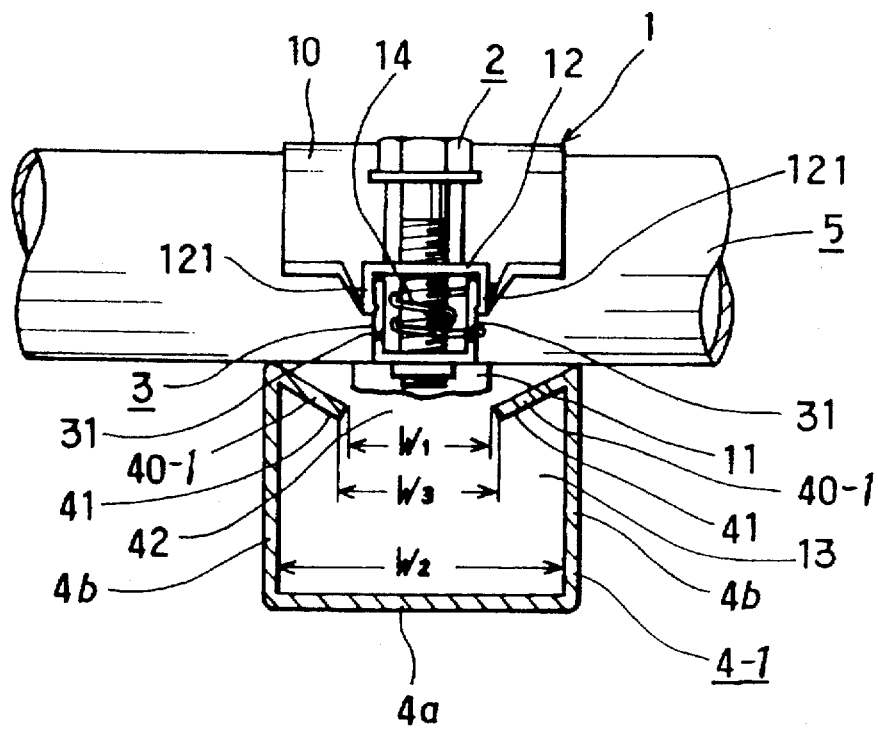
FIG. 33 is a front view of the conduit clamp according to the first mode, set on a channel rail of which the inlet-opening walls droop obliquely.
Figure 34:
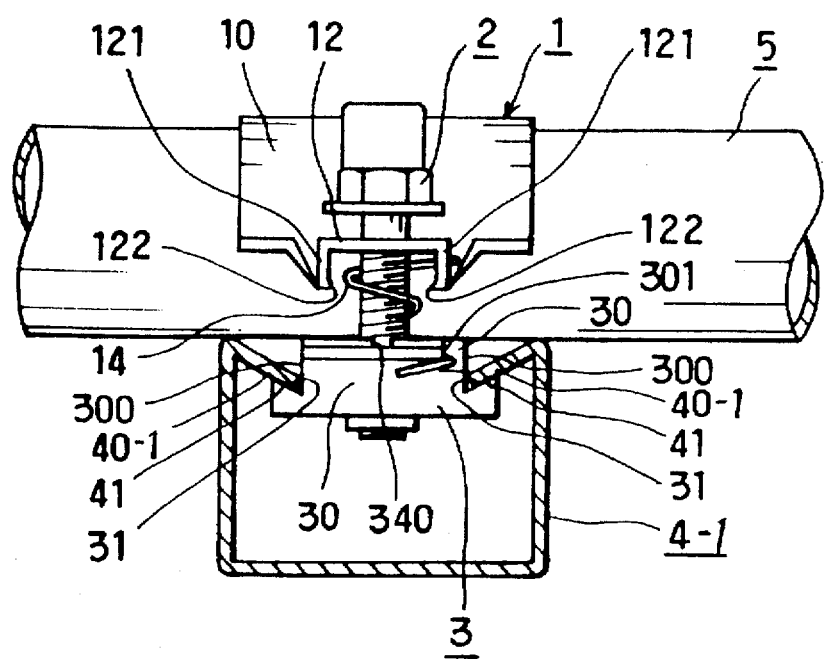
FIG. 34 is a front view showing the provisional fixation in the example shown in FIG. 33.
Figure 35:
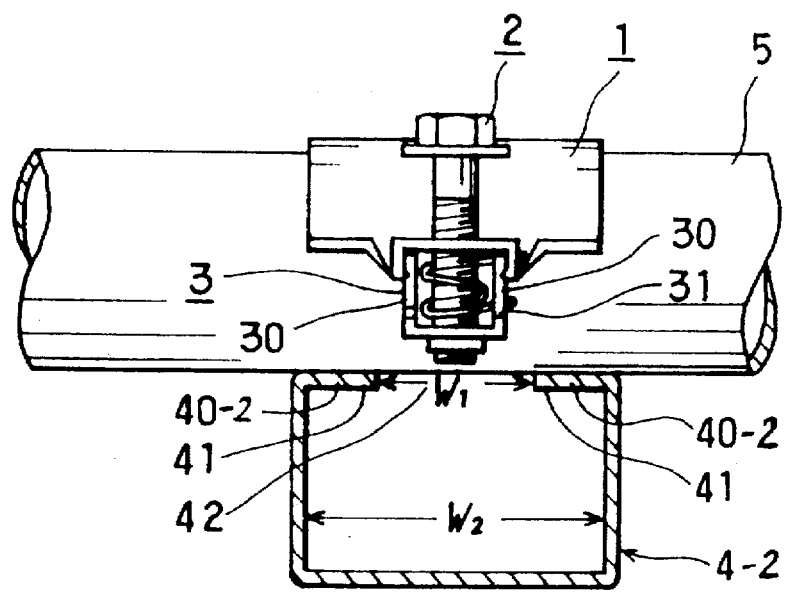
FIG. 35 is a front view showing the conduit clamp according to the first mode, set on a channel rail of which the inlet-opening walls are horizontal.
Figure 36:
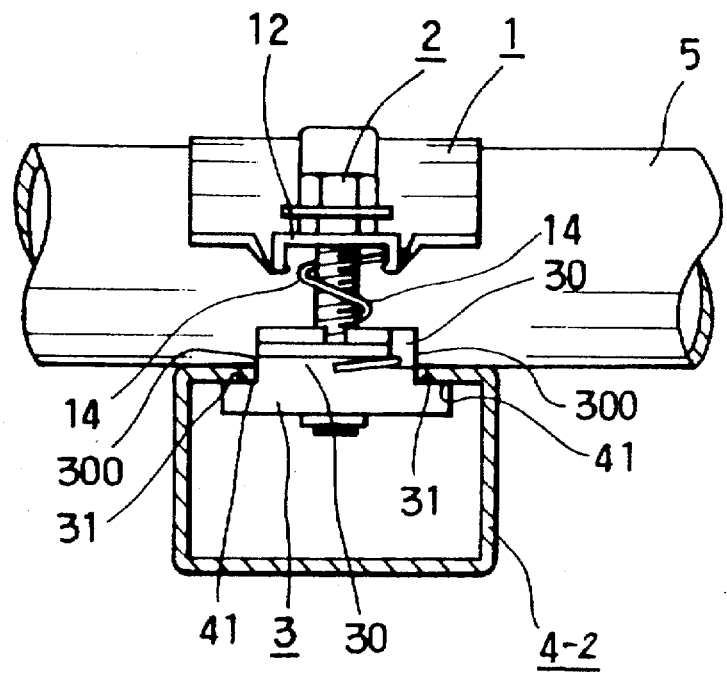
FIG. 36 is a front view showing the provisional fixation in the example shown in FIG. 35.

The conduit clamp according to the first mode of the present invention is not applicable only to a type of channel rail 4 of which the inlet-opening walls 40 droop vertically, but also to any other types. FIGS. 33 and 34 show a channel rail 4-1 of which the inlet-opening walls 40-1 droop obliquely from the upper ends of the flanges 4b. Further FIGS. 35 and 36 show a channel rail 4-2 of which the inlet-opening walls 40-2 extend horizontally from the upper ends of the flanges 4b. For the former type of the channel rail 4, a buckle 3 of which the abutments 31 are upwardly oblique as shown in FIG. 34 is optimally usable. However, the buckle 3 may have the horizontal abutments 31 as in each embodiment having been described above.

Figure 37:
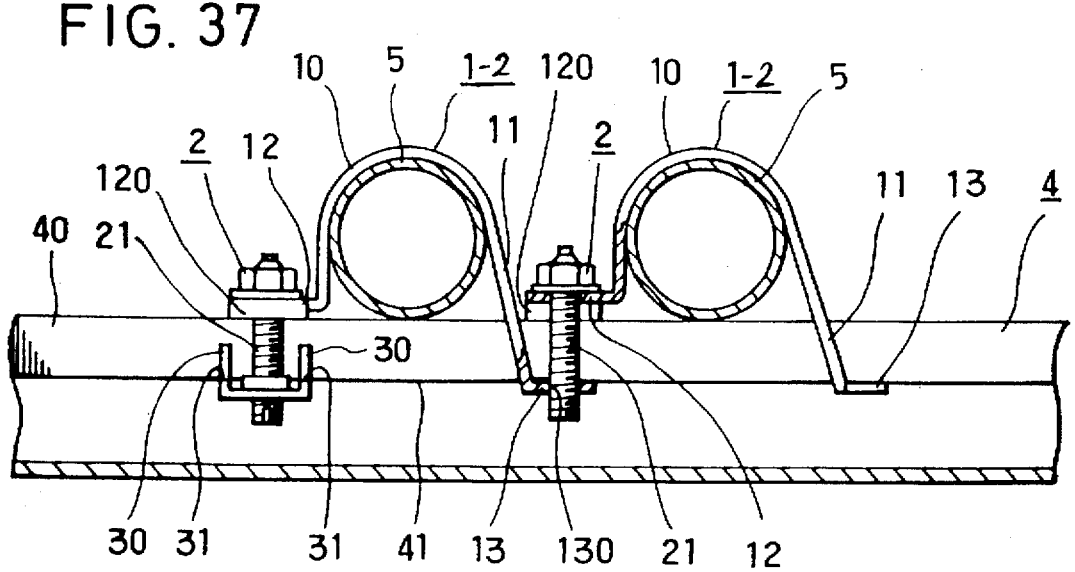
FIG. 37 is an axial-sectional view showing an example fixation of more than one conduit according to the first mode.
Figure 38:
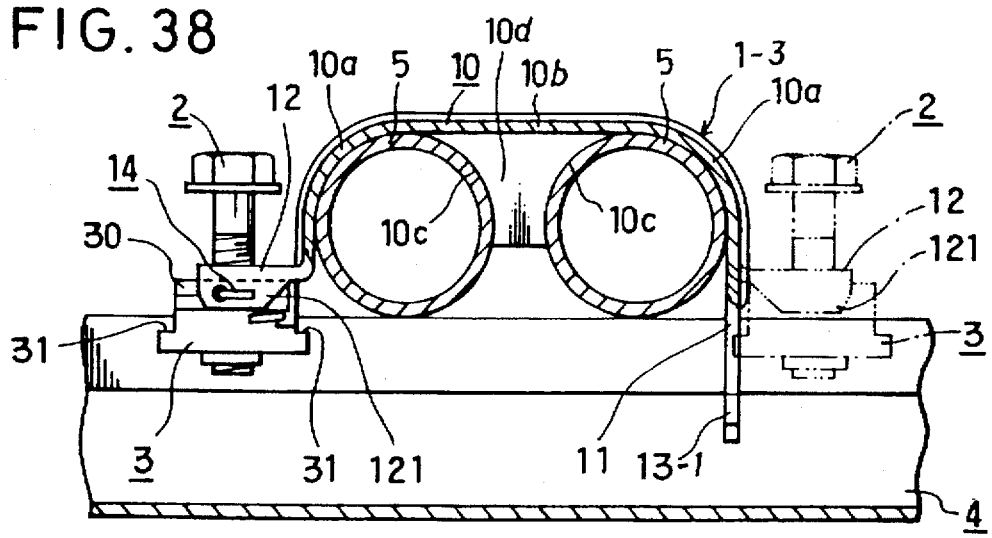
FIG. 38 is a partially-fragmentary axial-sectional view showing an example fixation of more than one conduit with one main body in the conduit clamp according to the first mode.
Figure 39:
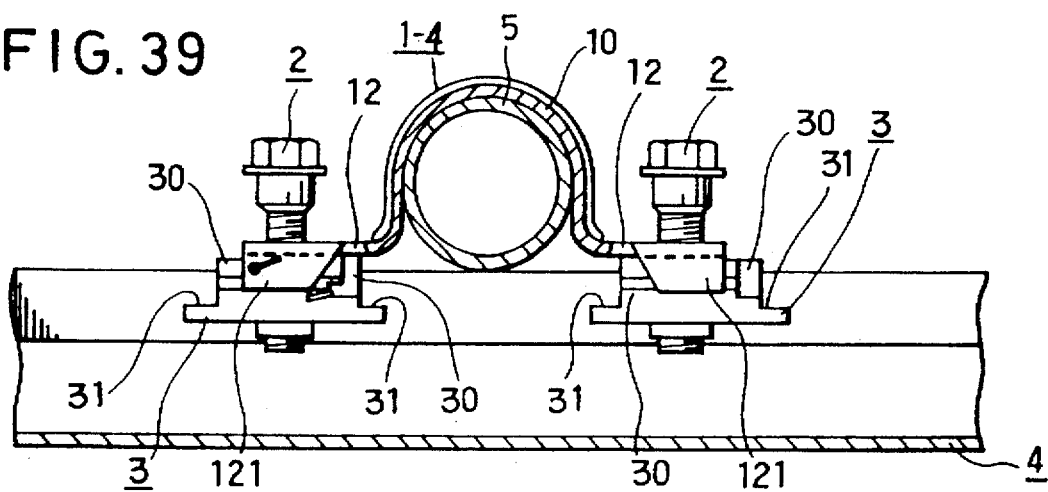
FIG. 39 is a partially-fragmentary side elevation of a variant of the main body in use in the conduit clamp according to the first mode of the present invention.

FIGS. 37 to 39 show variants of the main body of the conduit clamp according to the first mode of the present invention, and the use thereof. FIG. 37 shows an embodiment of the main body 1-2 in which the engagement portion 12 at the lower end of the foot section 11 is bent at a right angle with respect to the foot section 11 as shown in FIG. 1. In this example, a screw hole 130 is formed in the engagement portion 13. Thus, with the seat section 12 of the next main body 1 placed just above the engagement portion 13 and the screw member 3 driven in to the screw hole via the through hole in the seat section as shown in FIG. 37, a following conduit 5 can be fixed with a reduced space with respect to a preceding conduit 5 without using the buckle 3.

FIG. 38 shows a variant of the main body according to the present invention, in which a single main body can be used to fix two conduits 5 with a single main body 1-3. More particularly, the retainer section 10 is formed by curved portions 10a on either side thereof and straight portions 10b connecting the curved portions 10a, and there are provided on either side of the main body, extending in the direction of width thereof, including in the straight portions 10b, projections 10d having concave circular faces 10c contiguous from the sides of the main body. The two projections 10d on either side of the main body, extending in the direction of width thereof, are bent downward at a right angle with respect to the main body to form a pair of spacers. Thus, the circular faces 10c of each projection on either side, extending the direction of width, form together with the curved portion 10a to form a retainer section which fits the sectional form of the conduit 5. It should be noted that the number of the projections 10d is not limited to any special one. Two projections, formed longitudinally of the straight portion 10b, permit to fix three conduits, and three permit to fix four conduits.

FIG. 39 shows a variant of the main body 1-4 in which the foot section 11 is omitted, seat sections 12 are formed under both sides of the retainer section 10 and a screw member 2, buckle 3 and elastic member 14 specified above in connection with the aforementioned embodiments are disposed on the seat sections 12. This construction of the main body shown in FIG. 39 can be applied to the main body shown in FIG. 38, as will be understood from the indication with imaginary lines in FIG. 38.

Figure 40:
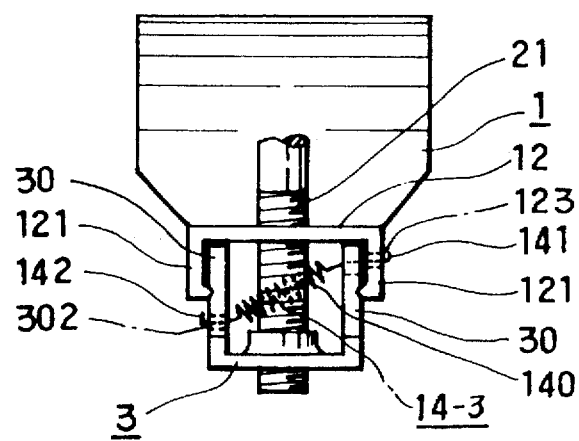
FIG. 40 is a front view showing the use of a variant of the elastic member in the conduit clamp according to the first mode.

In any of the above embodiments, the position and configuration of the retention holes 123 and 302 as well as the shape of the spring 14 may be freely selected. FIG. 40 shows a variant of the elastic member 14-3 usable in the conduit clamp according to the first mode of the present invention. The elastic member shown in FIG. 40 is a tension spring of which the coil portion 140 is wound up along the threaded body 21. For use of the tension spring as the elastic member, the position and configuration of the retention holes 123 and 303 having been explained in connection with the aforementioned embodiments are selected.

If the contact of the spring 14 with the threaded body is possible in each of the embodiments, a tube made of a plastic or the like is applied on the outer circumference of the coil portion of the spring 14, a tube is put or a film of a resin is applied to an area except for the effective length of tightening of the threaded body 21, or the headless portion is lengthened.

Second Mode (see FIGS. 41 to 62)

Figure 41:
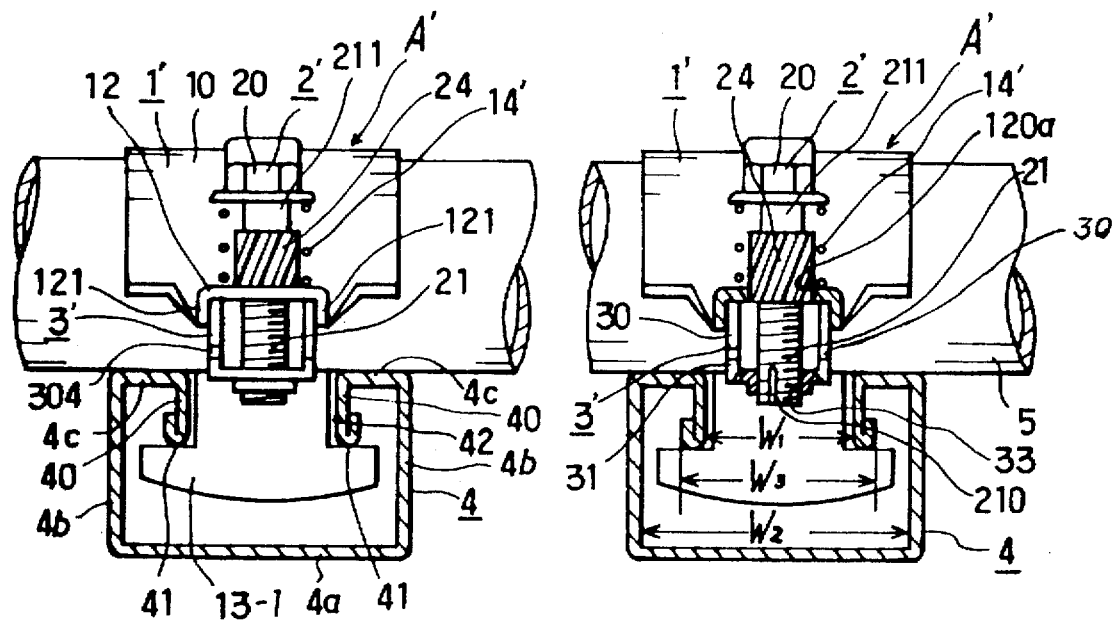
FIG. 41 is a front view of a conduit clamp according to the second mode (type (b)), set on a channel rail.

FIGS. 41 to 47 show the first embodiment in the second mode of the conduit clamp according to the present invention. In FIG. 41, the reference A' indicates generally a conduit clamp according to the second mode of the present invention. The conduit clamp A' consists of a main body 1', screw member 2', buckle 3' and an elastic member 14' which lifts the buckle 3'. The reference numerals 4 and 5 denote a channel rail and a conduit, respectively. As in the conduit clamp according to the first mode of the present invention, the channel rails 4 are disposed as spaced at a predetermined interval from each other and in parallel with each other, and suspended by suspension bolts (not shown) from the ceiling, or directly fixed to the ceiling as inverted from the position shown in FIG. 41. The conduits 5 are placed on the channel rails 4 perpendicularly to the latter.

Figure 42:
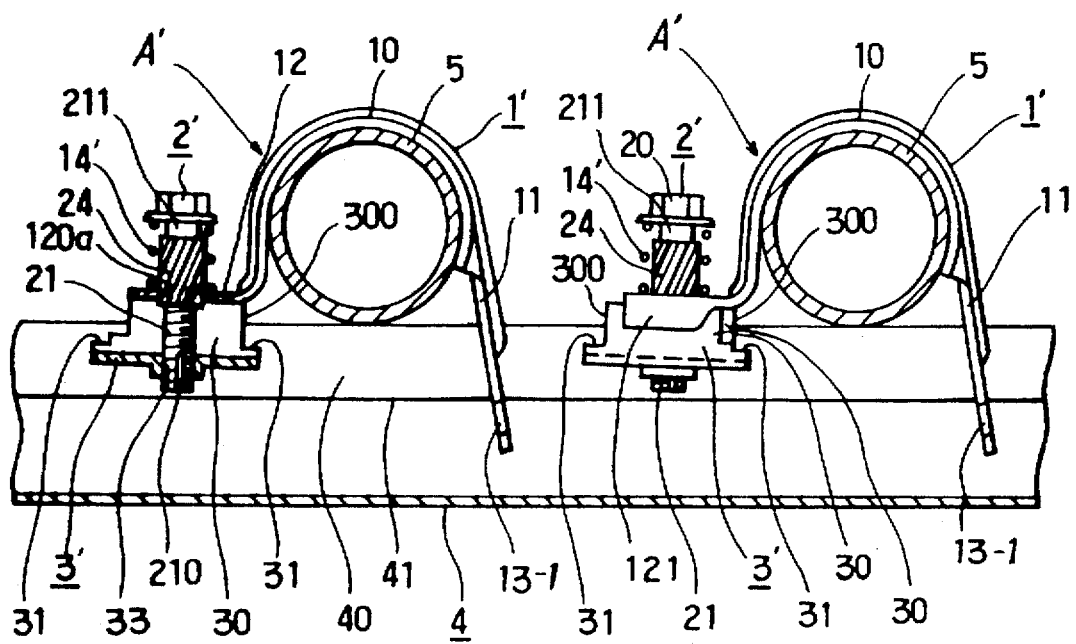
FIG. 42 is a side elevation of the conduit clamp in FIG. 41.
Figure 46:
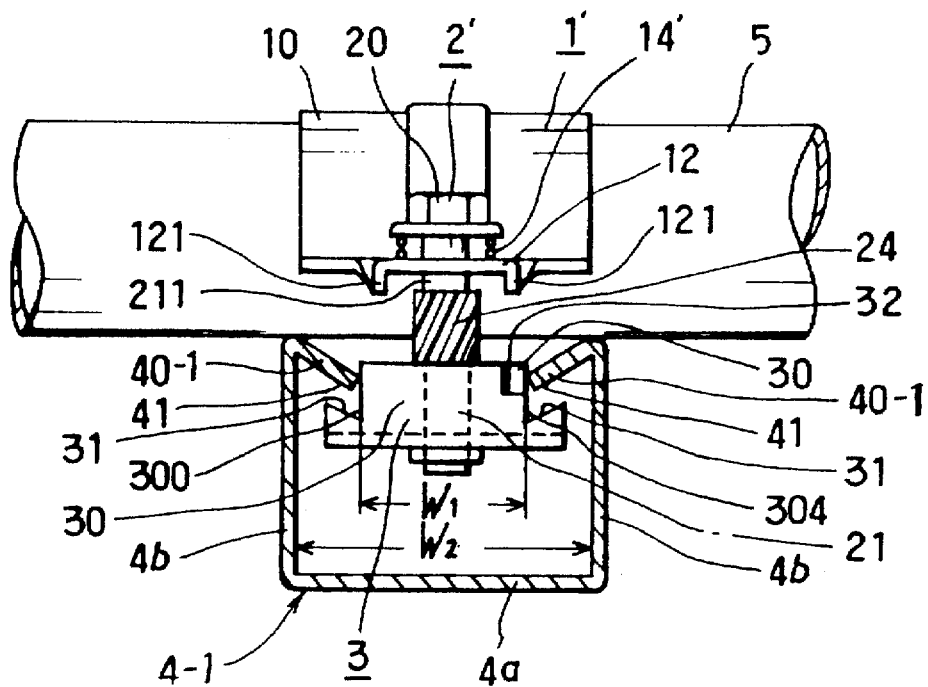
FIG. 46 is a front view showing the application of the conduit clamp according to the second mode to another type of channel rail.
Figure 47:
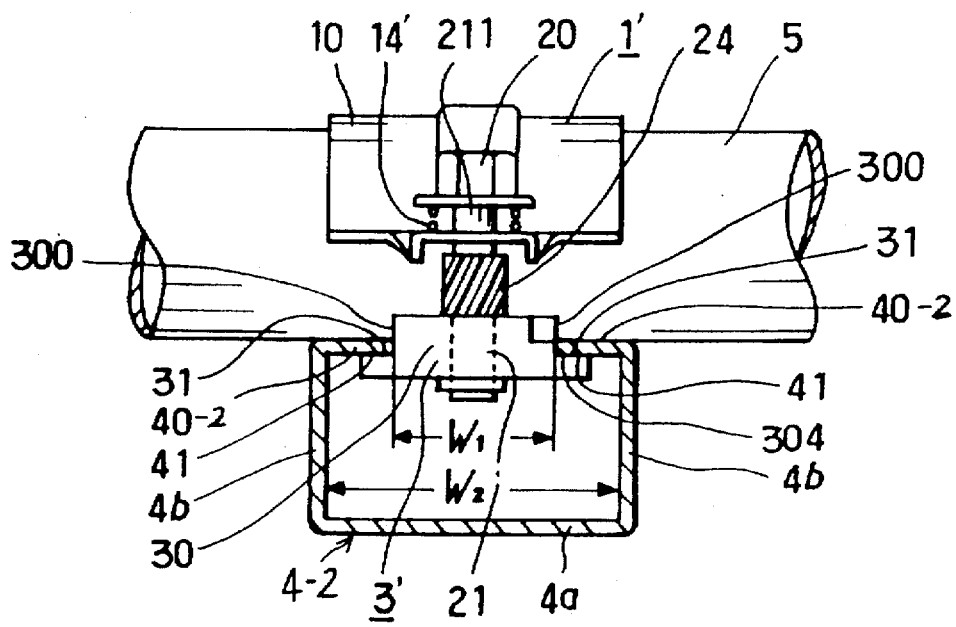
FIG. 47 is a front view showing the application of the conduit clamp according to the second mode to still another type of channel rail.

As seen from FIGS. 41 and 42, the inlet-opening walls 40 of the channel rail 4 droop vertically and define an inlet opening 42 of which the width $W_1$ is smaller than the distance $W_2$ between the inner walls of the flanges. The channel rails 4 to which the conduit clamp according to the second mode of the present invention can be applied are not limited to this example, but include all those of which the inlet-opening walls 40-1 droop obliquely from the tops of the flanges 4b as shown in FIG. 46 and those of which the inlet-opening walls 40-2 extend horizontally from the tops of the flanges 4b as shown in FIG. 47.

The main body 1' has a retainer section 10 of which the profile corresponds to the sectional form of the conduit 5. In this embodiment, since the conduit 5 has a circular sectional form, the retainer section 10 is so curved as to be in contact with more than at least ⅓ of the circumferential length of the conduit 5. The main body 1' has a foot section 11 extending downward from the retainer section 10 and there is provided as extending from the lower portion of the foot section 11 a portion 13 which engages the lower ends of the inlet-opening walls 40 of the rail member 4. The engagement portion 12 is extended straight from the foot section 11 in this embodiment.

The retainer section 10 has formed as bent at the lower portion thereof a seat section 12 being horizontal or having an appropriate gradient. The seat section 12 may be a flat plate, but for an increased strength thereof and for positive holding by the buckle 3', it has lateral bent walls 121 on either side extending in the direction of width. The lateral walls may not necessarily droop vertically from the seat section.

In the conduit clamp according to the second mode of the present invention, the screw member 2' has a threadless neck portion 211 formed under the head 20 thereof, and there is formed between the threadless neck portion 211 and the threaded body 21 rotation lead section 24 which cooperates with the seat section 12 to provide a clockwise rotation through about 90° when the screw member 2' is pushed in the axial direction thereof. In this embodiment, the rotation lead section 24 is a cylindrical wheel or the like having a plurality of teeth of a large lead disposed on the circumferential surface of a cylinder of which the diameter is larger than that of the threaded body 21. More particularly, the rotation lead section 24 may be a large-lead screw, multi-thread worm or the like.

The seat section 12 has formed in the middle thereof a guide hole 120a which fits the sectional form of the rotation lead section 24. In this embodiment, the guide hole 120a has an internal gear-like profile.

It is desirable that when the screw member 2' is pushed axially and rotated by the rotation lead section 24 and guide hole 120a, the buckle 3' will not be rotated independently. For this purpose, the engagement of the screw is enhanced, a recess 210 parallel to the axis is formed in the lower surface of the threaded body 21 or the buckle 3' is lightly secured provisionally with an adhesive agent.

Figure 43:
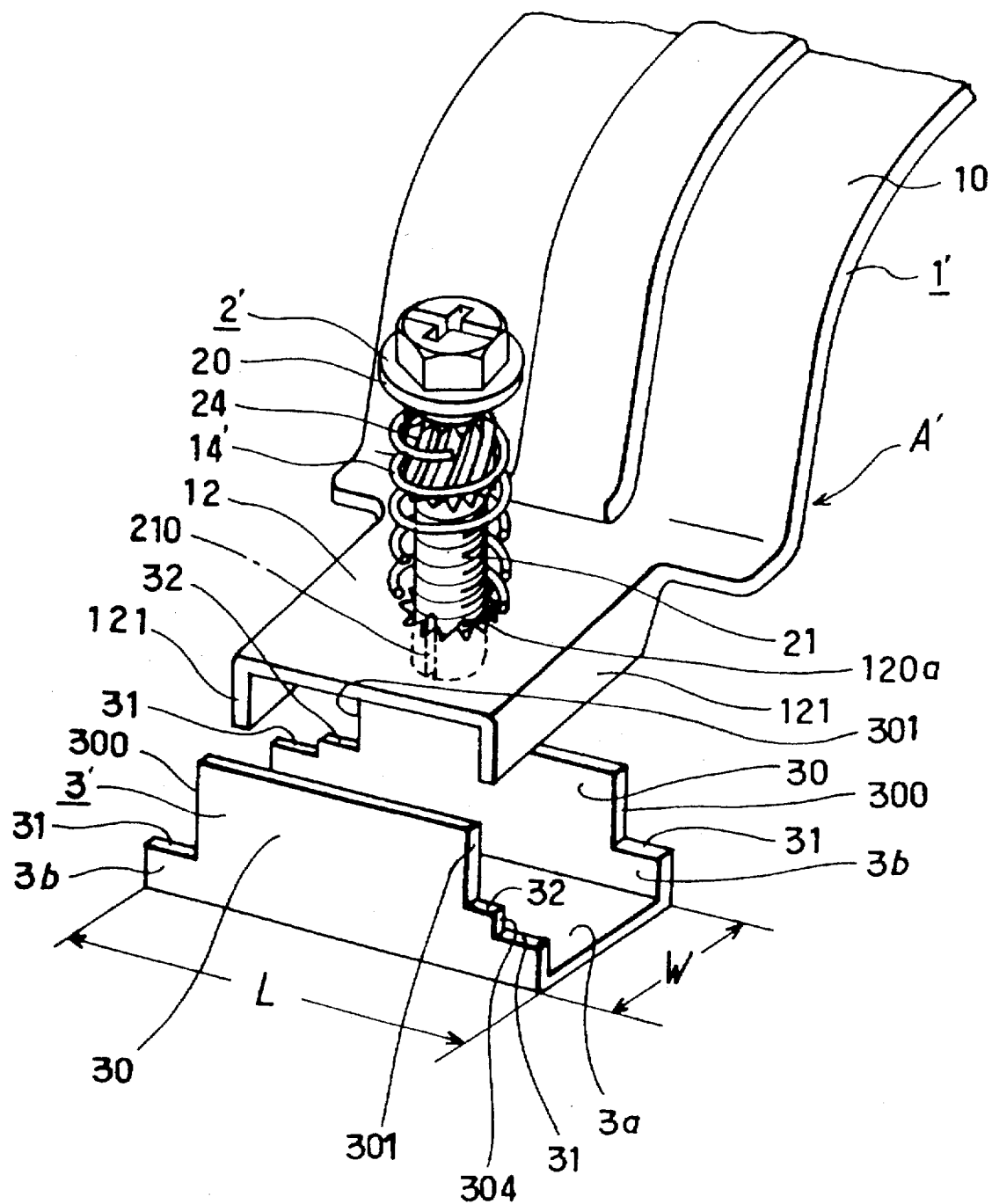
FIG. 43 is a perspective exploded view of the major part of the conduit clamp according to the second mode.

The buckle 3' has a similar configuration to that in the conduit clamp according to the first mode of the invention. Namely, its length L is larger than the width W as shown in FIG. 43. More particularly, the width W is smaller than the distance $W_1$ between the inner faces of the inlet-opening walls 40 shown in FIG. 43, and the length L is smaller than the distance $W_2$ between the inner walls of the rail member 4 equal to or a little larger than the distance $W_3$ between the out walls of the inlet-opening walls 40 even in case the conduit clamp is used with a channel rail of which the inlet-opening walls 40 droop vertically.

The buckle 3' has formed in the middle thereof a screw hole 33 in which the threaded body 21 of the screw member 2' is driven and on either longitudinal side abutments 31 which engage the lower ends 41 of the inlet-opening walls 40. Also there are provided on either side extending in the direction of width a pair of projections 30 which rise high above the abutments 31. The abutments 31 should preferably be inclined correspondingly to the gradient of the inlet-opening walls 40 when the conduit clamp is used with a channel rail 4 shown in FIG. 46.

When the buckle 3' becomes perpendicular to the inlet opening 42, the projections 30 abut the inlet-opening walls 40 and stop he buckle 3 from rotating. For this purpose, the projections 30 have provided on the diagonal lines thereof stop faces 300 which will aut the inlet-opening walls 40.

The elastic member 14' may be a cylinder made of urethane or the like, but generally it should be a compression spring and more preferably, it should be a conical spring. The elastic member 14' is fitted on the screw member 2' and supported at the lower end thereof by the seat section 12. The threaded body 21 is passed through the guide hole 120a in the seat section 12, and the screw member 2' and buckle 3' are assembled to each other by driving the threaded body 21 into the screw hole 33 in the buckle 3'.

This assembling may be done by pressing the screw member 3' axially against the action of the elastic member 14', driving the threaded body 21 into the screw hole 33 with the rotation lead section 24 fitted to a predetermined depth into the guide hole 120a and then releasing the screw member 2' from the pressed state. Since the screw member 2' is rotated 90° counterclockwise due to the cooperation of the rotation lead section 24 with the guide hole 120a, the buckle 3' is longitudinally parallel to the side wall of the seat section 12 and the projections 30 are raised under the action of the elastic member 14' up to a position where they abut the bottom of the seat section 12. In this state, the rotation lead section 24 must be fitted at least at the end thereof in the guide hole 120a. This fitting can be easily provided through selection of a resilience of the elastic member 14', setting a length of the rotation lead section 24 or setting a height of the projections 30.

In the conduit clamp according to the second mode of the invention, the projections 30 may not necessarily fit closely the lateral bent walls 121 of the seat section 12, but a play may exist between them. Also the projections 30 may be fitted on the lateral bent walls 121 as shown in FIG. 49.

Figure 48:
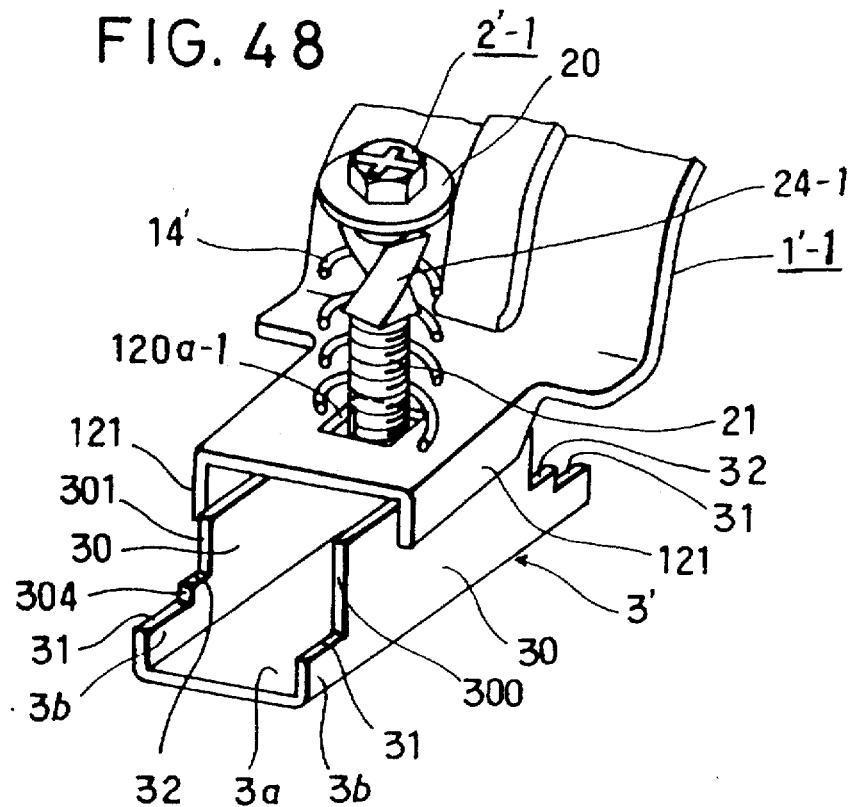
FIG. 48 is a perspective view of a variant of the rotation lead section in the conduit clamp according to the second mode.

FIG. 48 shows a second embodiment in the second mode of the present invention. In this embodiment, the rotation lead section 24-1 is a torsion bar having a square section of which the area is larger than that of the threaded body 21, and the guide hole 120a-1 has a square profile.

Figure 49:
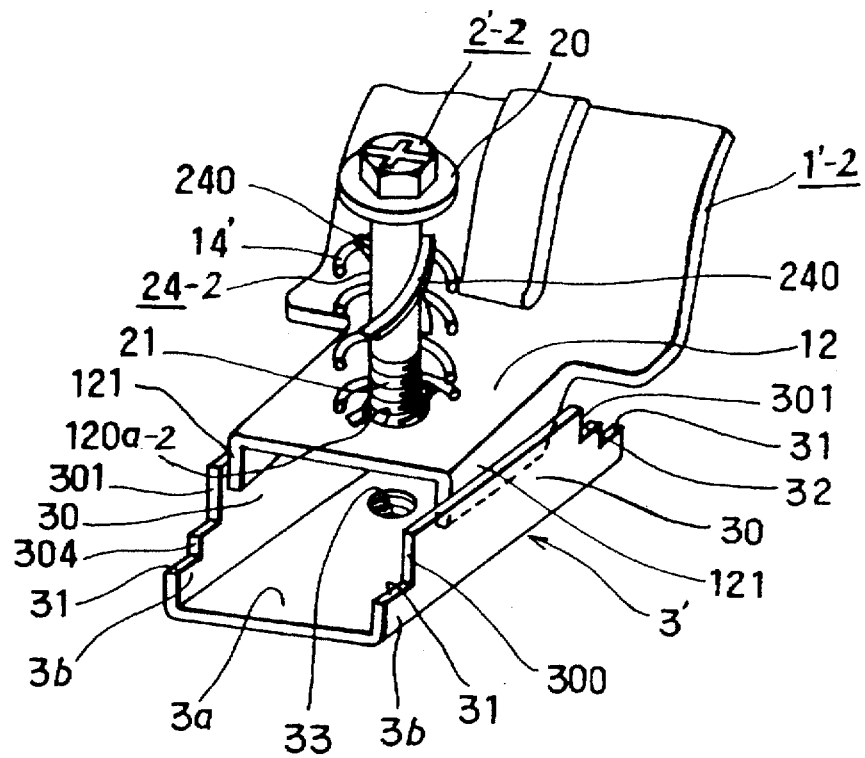
FIG. 49 is a perspective view of a variant of the rotation lead section in the conduit clamp according to the second mode.

FIG. 49 shows a third embodiment in the second mode of the invention. In this embodiment, the rotation lead section 24-2 is a cylinder of which the sectional area is equal to or larger than that of the threaded body 21 and on which two spiral teeth 240 of a large lead are formed. The guide hole 120a-2 is a circular hole having provided outside thereof two recesses 180° symmetrical with respect thereto.

Of course, the conduit clamps according to the second and third embodiments can be used with the channel rails shown in FIGS. 41, 46 and 47.

The buckle 3' may be any one so long as it has the aforementioned basic configuration. The material of the buckle 3' is selected from among ferrous materials, aluminum, synthetic resin and the like according to an intended application.

Figure 50:
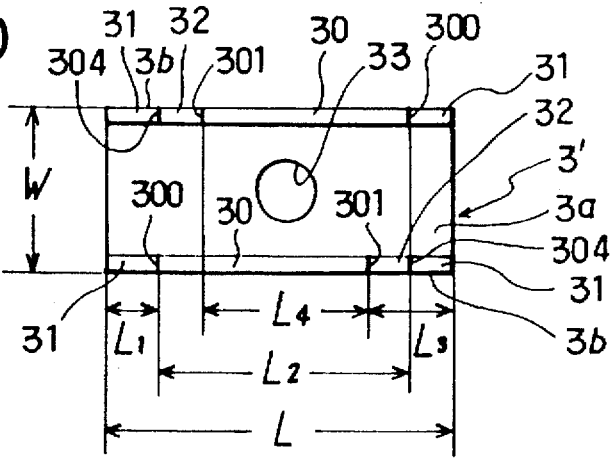
FIG. 50 is a plan view of an exemplary buckle used in the conduit clamp according to the second mode.
Figure 51:
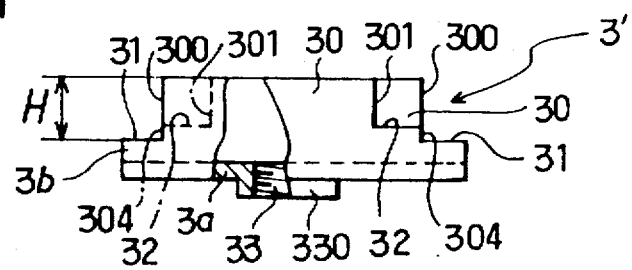
FIG. 51 is a partially-fragmentary side elevation of the buckle in FIG. 50.

FIGS. 50 and 51 shows the buckle 3' used in the conduit clamps shown in FIGS. 41 to 47. The buckle 3' in this embodiment is similar to that used in the conduit clamp according to the first mode shown in FIG. 29. The section taken perpendicularly to the length of the buckle 3' has the form of a recess, and the buckle 3' has formed, by burring, in the web 3a thereof a boss 330 in which a screw hole is formed. The abutments 31 of the buckle 3' comprises flanges 3b rising to a relatively small height from the web 3a and of which the end faces are strongly pressed by the lower ends 41 of the inlet-opening walls 40. The buckle 3' shown in FIG. 29 can of course be used in the conduit clamp according to the second mode of the invention.

Figure 52:
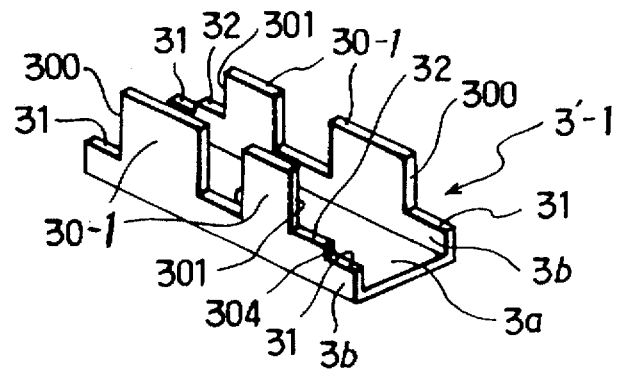
FIG. 52 is a perspective view of a variant of the buckle in the conduit clamp according to the second mode.
Figure 53:
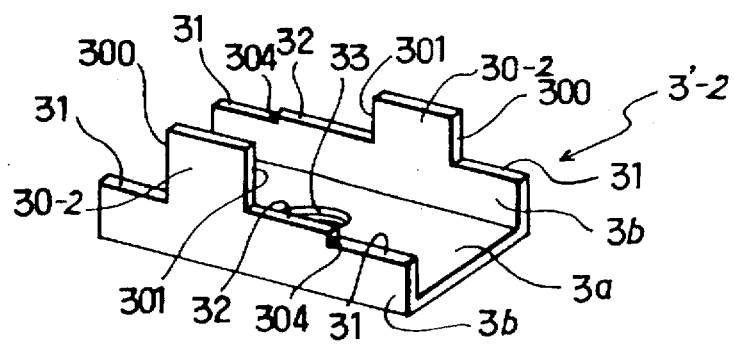
FIG. 53 is a perspective view of a variant of the buckle in the conduit clamp according to the second mode.

FIG. 52 and 53 show a variant of the buckle 3'-1, 3'-2. In the embodiment shown in FIG. 52, the projections 30-1 are not a continuous wall but each is split into two pieces. In the embodiment shown in FIG. 53, the projections 30-2 are a short wall. These arrangements correspond to those shown in FIGS. 9 and 10, and the arrangements in FIGS. 9 and 10 may also be adopted in this variant of the buckle 3.

Figure 54:
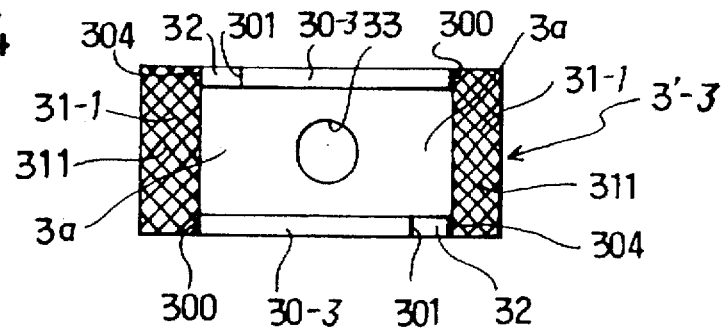
FIG. 54 is a plan of a variant of the buckle in the conduit clamp according to the second mode.
Figure 55:
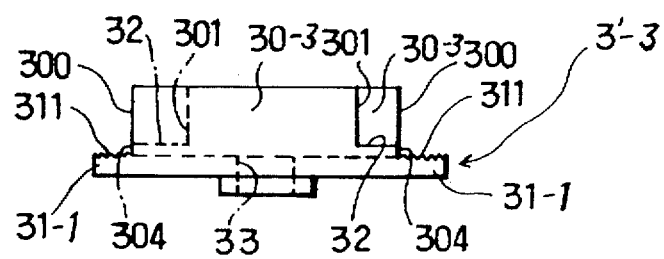
FIG. 55 is a side elevation of the buckle in FIG. 54.

FIG. 54 and 55 show a variant of the buckle 3'-3. In this embodiment, the abutments 31-1 is like a plate having formed thereon frictional areas 311 by knurling or the like. The buckle 3'-3 has projections 30-3 formed, as flanges, on either side extending in the direction of width. This arrangement corresponds to that in FIGS. 17 and 18 showing the conduit clamp according to the first mode of the invention. Other arrangements are the same as in the aforementioned first embodiment, and so the same elements as in the first embodiment are indicated with same reference numerals. They will not be discussed any more.

Figure 56:
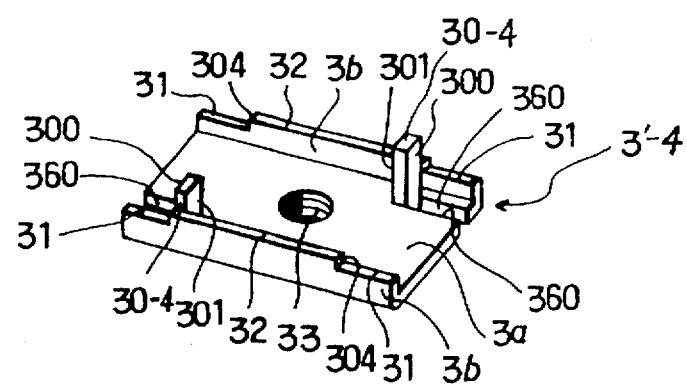
FIG. 56 is a perspective view of a variant of the buckle in the conduit clamp according to the second mode.
Figure 57:
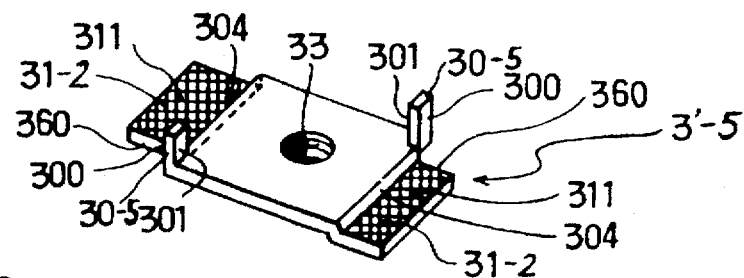
FIG. 57 is a perspective view of a variant of the buckle in the conduit clamp according to the second mode.
Figure 58:
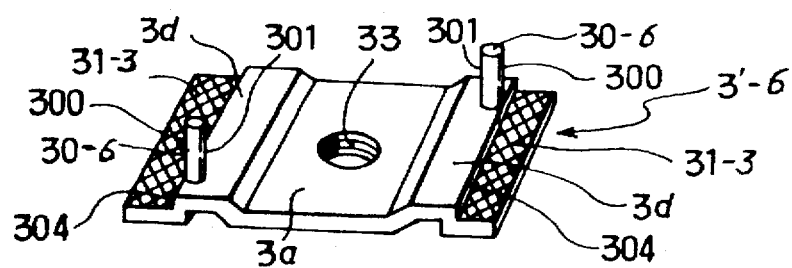
FIG. 58 is a perspective view of a variant of the buckle in the conduit clamp according to the second mode.

FIGS. 56 to 58 show variants of the buckle. The buckle 3'-4 shown in FIG. 56 has the general sectional form of a recess. Cuts 360 are formed in the lateral edge, or in a near area, of the web 3a and the portions inside the cuts 360 are bent upward to form pawl-like projections 30-4. This embodiment corresponds to that shown in FIG. 19. The buckle 3'-5 shown in FIG. 57 has a general form of a trapezoid. Cuts 360 parallel to the length of the web 3a are formed in the lateral edge of the web 3a and the portions outside the cuts 360 are bent upward to form the pawl-like projections 30-5. This embodiment corresponds to that shown in FIG. 20. The embodiment shown in FIG. 20 may be designed to have the construction as shown in FIG. 57.

FIG. 58 shows a buckle 3'-6 which is like a plate having ribs 3d formed as extending in the direction of width on the web 3a to increase the strength thereof. Pins are studded in the end area of the ribs 3d to form projections 30-6. This embodiment corresponds to that shown in FIG. 21.

Figure 59:
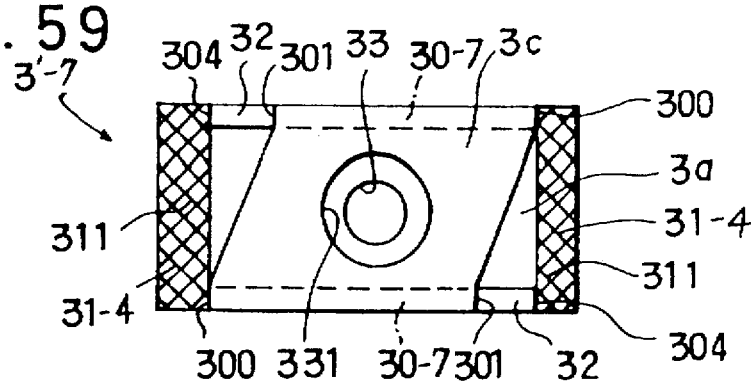
FIG. 59 is a plan view of a variant of the buckle in the conduit clamp according to the second mode.
Figure 60:
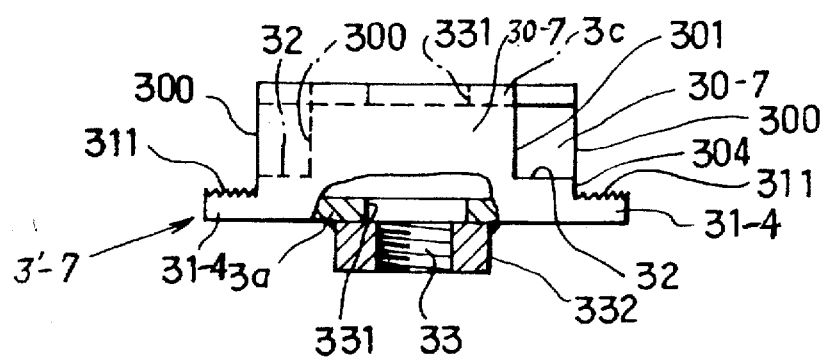
FIG. 60 is a partially-fragmentary side elevation of the buckle in FIG. 59.

FIGS. 59 and 60 show a variant of the buckle 3'-7. The buckle 3'-7 according to this embodiment has a sectional form of an rectangular tube and is laterally open. The abutments 31-4 are formed on the extensions of the web (bottom wall) 3a. The projections 30-7 are formed by the lateral walls of the rectangular tube. The top wall 3c and web 3a have concentrically formed therein holes 331, respectively. A nut 332 having a screw hole 33 is fixed to the web 3a. The hole 331 in top wall 3c should preferably have a diameter large enough to permit a free insertion and removal of the rotation lead section 24 of the screw member 2'. However, the nut 332 may not be used for the screw hole 33 but the screw hole 33 may be formed directly in the web 3a.

This embodiment is advantageous in that the buckle 3'-7 can be made by cutting a rectangular tube and has a larger rigidity. In particular, the abutments 31-4 can be made in the form of flanges as shown in FIGS. 50 and 51 and thus their strength can be generally improved by setting the cut line of the lateral walls to a higher position than illustrated. In case the buckle 3'-7 is made by pressing, it suffices to lengthen the portions for the flange of a blank by the length of the top wall, form a half-hole in the flange portions and bend the portions.

In each of the embodiments of the buckle 3', 3'-1, 3'-2, 3'-3, 3'-4, 3'-5, 3'-6 and 3'-7, two stop faces 300 are symmetrically formed in the projections 30, 30-1, 30-2, 30-3, 30-4, 30-5, 30-6 and 30-7. As shown in FIG. 50 the distance $L_2$ between the stop faces 300 is set nearly equal to the distance $W_1$ between the inner faces of the inlet-opening walls 40. The distance $L_1$ from each stop face 300 to the free end is the effective length of the abutment 31. The distance $L_4$ between the two opposite stop faces 301 should be smaller than the distance $W_1$ between the inner faces of the inlet-opening walls 40 in order to rotate the buckle 3 about 90° from a position where it is parallel to the length of the channel rail 4.

The height H of the projections 30 from the abutments 31 must be large enough for the stop faces 300 to abut the inlet-opening walls 40 and not to be off the latter.

In the buckles 3', 3'-1, 3'-2, 3'-3, 3'-4 and 3'-7 shown in FIGS. 50 to 56, 59 and 60, steps 32 are formed at the position where the effective clamping area of the abutments 31, 31-1, 31-4 begins from the opposite stop faces 301 (flush with the stop face 304 at the opposite side in the direction of width) and thus sub stoppers 304 are formed which are a little higher than the abutments 31. As shown in FIGS. 50 to 55, the stops 32 are directly contiguous from the projections 30, 30-1, 30-2, 30-3. In the buckle 3-5 shown in FIG. 57, the sub stop faces 304 a little higher than the abutments 31-2 are made by giving a trapezoidal form to the web itself. In the buckle 3'-6 shown in FIG. 58, the stop faces 304 are formed by the ribs 3b.

In case the sub stop faces 304 are provided, the buckle 3', 3'-1, 3'-2, 3'-3, 3'-4 and 3'-7 has an increased rigidity and the abutments 31, 31-1, 31-4 on either side extending in the direction of width have the same effective length. Thus the buckle 3', 3'-1, 3'-2, 3'-3, 3'-4 and 3'-7 can be positively set perpendicular to the channel rail 4, 4-1, 4-2. Also, the buckle 3', 3'-1, 3'-2, 3'-3, 3'-4 and 3'-7 can be prevented from inadertently being turned counterclockwise and can be moved with the abutments 31, 31-1 kep perpendicular to the channel rail 4, 4-1, 4-2 when the conduit clamp A' is slid for adjusting the position of the conduit 5 with the buckle 3', 3'-1, 3'-2, 3'-3, 3'-4 and 3'-7 provisionally fixed to the channel rail 3.

Figure 61:
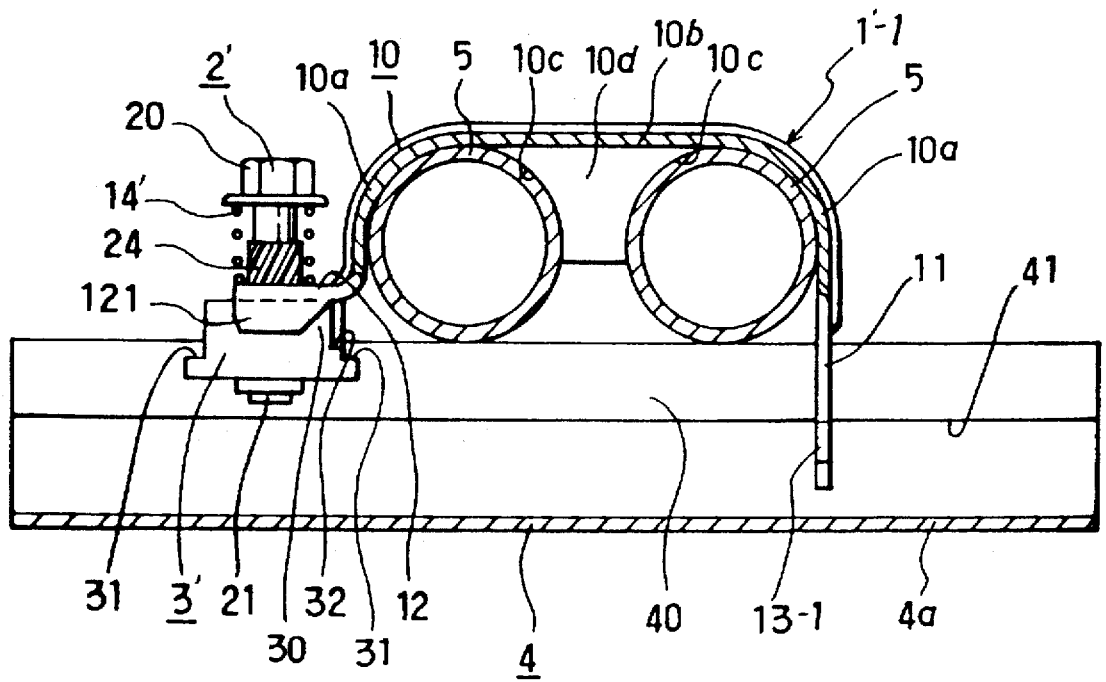
FIG. 61 is a partially-fragmentary side elevation showing the use of a variant of the main body in the conduit clamp according to the second mode.

FIG. 61 shows a variant of the conduit clamp according to the second mode of the invention, which is adopted to fix two conduits 5 with a single main body 1'-1. This conduit clamp has a same construction as the conduit clamp according to the first mode shown in FIG. 38. Same elements as in FIG. 38 are indicated with same reference numerals, and so will not be discussed any more.

Figure 62:
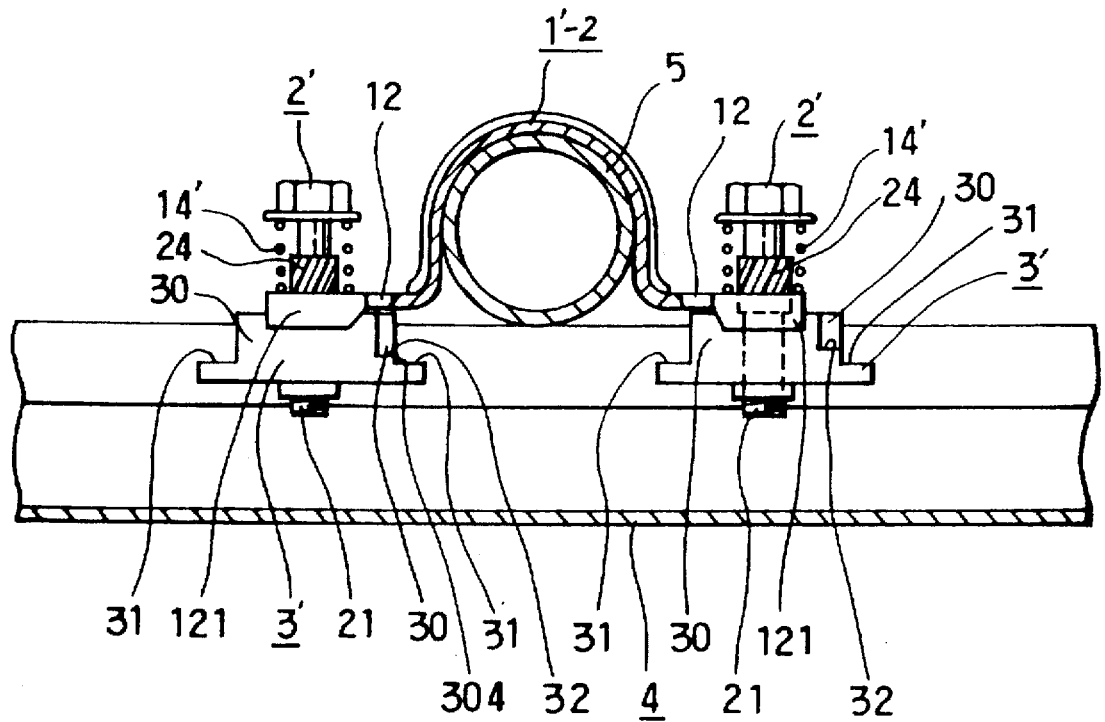
FIG. 62 is a partially-fragmentary side elevation showing the use of a variant of the main body in the conduit clamp according to the second mode.

FIG. 62 a variant of the conduit clamp according to the second mode of the invention, in which seat sections 12 are formed under either side of the retainer section 10 and provided with a screw member 2', buckle 3' and elastic member 14' having the same respective constructions as previously mentioned.

Third Mode (see FIGS. 63–79)

Figure 63:
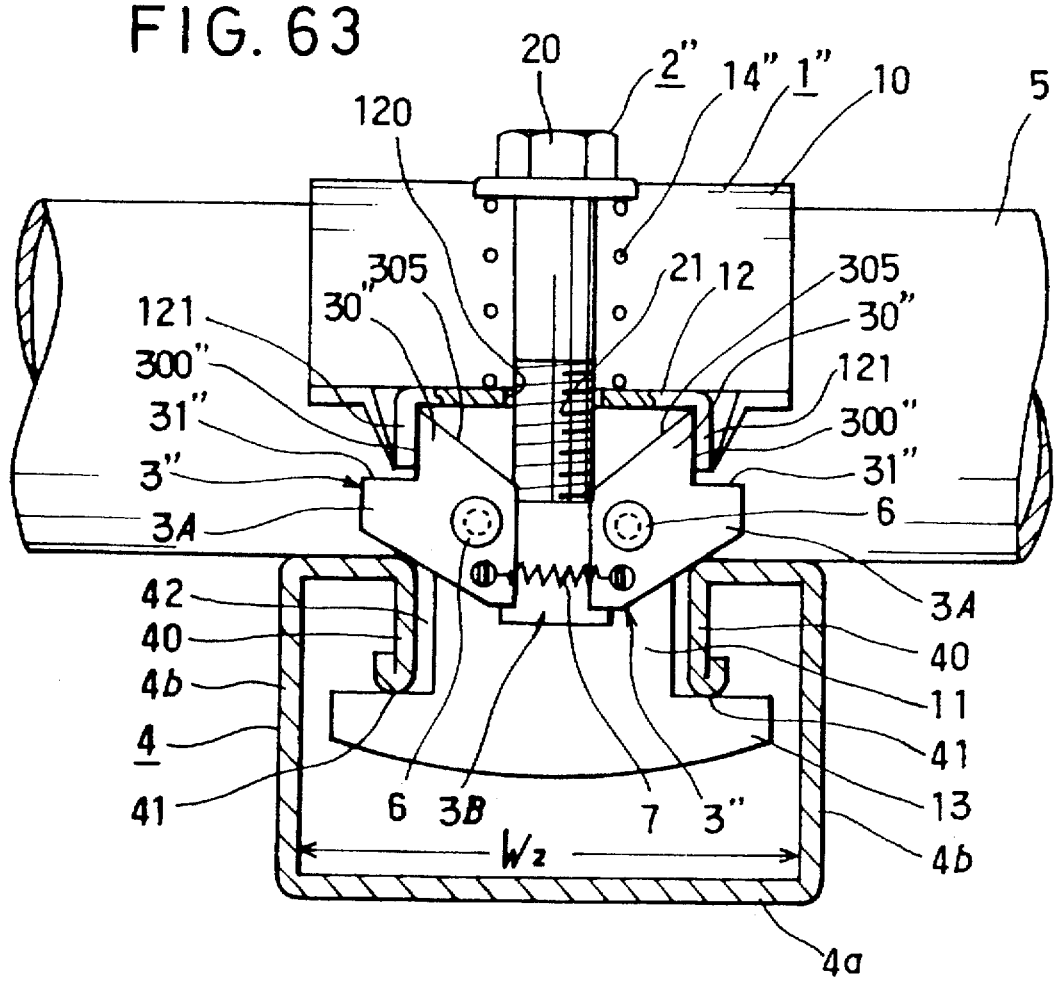
FIG. 63 is a front view showing the setting of the conduit clamp according to the third mode of the present invention.
Figure 64:
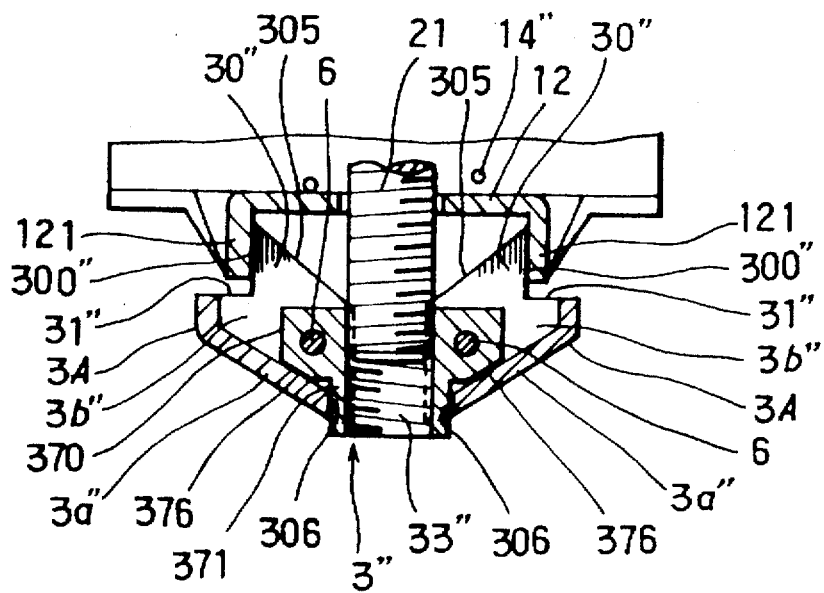
FIG. 64 is a partial sectional view of the conduit clamp shown in FIG. 63.
Figure 65:
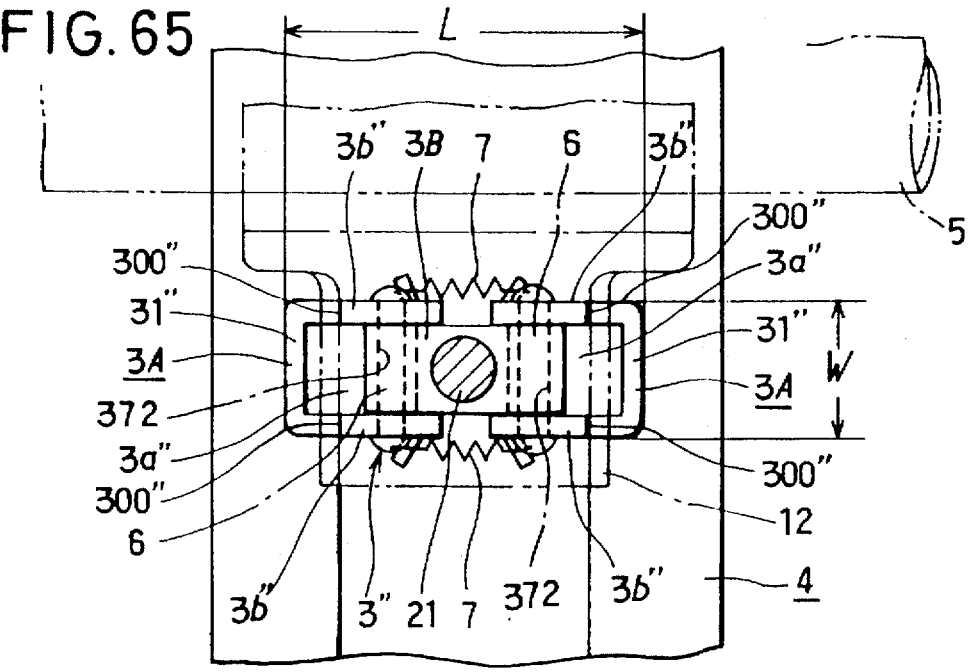
FIG. 65 is a plan view of the conduit clamp in FIG. 63.

FIGS. 63 to 79 show a conduit clamp according to a third mode of the invention. FIGS. 63 to 65 show an embodiment, and FIGS. 70 to 73 show the motions of the parts in the embodiment in operation.

The reference numeral denotes a main body 1", 2" a screw member, and 14" an elastic member. The main body 1" has a retainer section 10 of which the shape fits the sectional form of a conduit 5 as in the previously- described conduit clamps according to the first and second modes of the invention. The retainer section 10 has formed at the lower portion thereof a seat section 12 projecting frontward and at the side opposite a foot section 11 having an engagement portion 13.

The seat section 12 has a through-hole 120 formed nearly in the middle thereof and lateral bent walls 121 on either side extending in the direction of width. The lateral bent walls 121 are provided to increase the rigidity and hold the buckle 3".

The screw member 2" has a head 20 and a threaded body 21 which is inserted in the through-hole 120 in the seat section 12 and screwed in a nut member of the buckle 3", which will be described later. The elastic member 14" should preferably be a compression cylindrical spring or conical spring, and it is interposed between the head 20 and seat section 12. The buckle 3" is so held on the seat section 12 as lifted under the action of the elastic member 14" as to be longitudinally perpendicular to the inlet opening 42 of the channel rail 4.

In the conduit clamp according to this third mode of the invention, the buckle 3" is adapted to rotate about the horizontal axis and open and close. More particularly, the buckle 3" has two fasteners 3A and a nut member 3B as shown in FIGS. 63 to 65. In this embodiment, the two fasteners 3A are so supported on the nut member 3B by means of shafts 6 as to be oscillated about 90° about a vertical axis (axis of the screw member 2") and an axis perpendicular to the vertical axis.

The fasteners 3A are made of a material as in the conduit clamps according to the first and second modes of the invention. Each of the fasteners 3A have a web 3a" and flanges 3b" rising from either side of the web 3a". Each of the fasteners 3A has the sectional form of a groove open at least at the top and rear thereof as shown in FIGS. 63 and 64.

Figure 70:
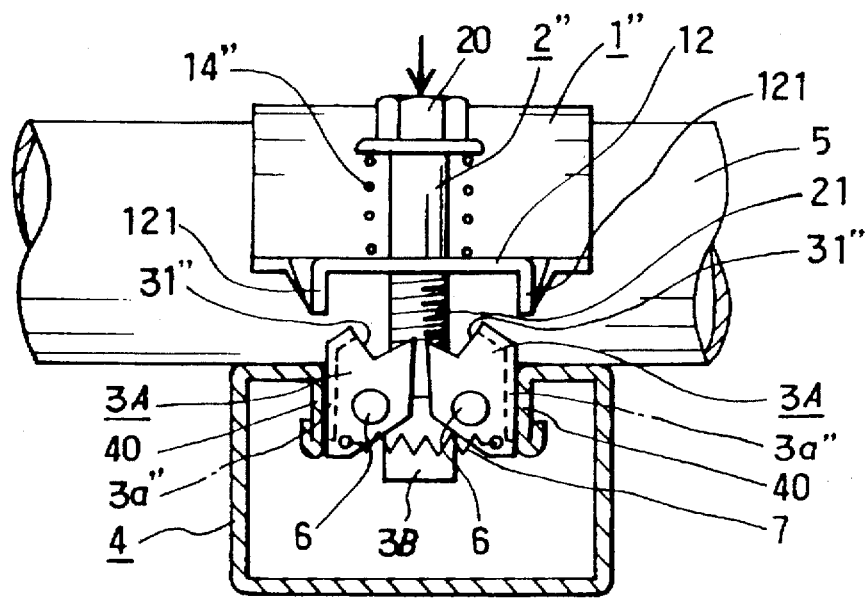
FIG. 70 is a front view showing the state of the conduit clamp according to the third mode, in which pushing of the screw member is started.

The flanges 3b" has formed thereon portions 31" which abut the lower ends 41 of the inlet-opening walls 40 of the channel rail 4, and there are formed near the abutments 31" projections 40 having stop faces 300" which can abut the inlet-opening walls 40 of the channel rail 4. The projections 30" should be high enough for the abutments 31" to be able to abut the inlet-opening walls 40 when passing by the lower ends 41 of the inlet-opening walls 40 as shown in FIG. 70, and portions at the back of the top of the stop faces 300" are down-slopes 305. This is intended to permit the flanges of the fasteners 3A to close without collision when pushed from the state shown in FIG. 63.

For smooth closing of the fastener flanges from the setting in the inlet-opening 42 of the channel rail 4, the web 3a" is inclined at an angle with which it is nearly parallel to the down-slope 305 and the upper end thereof is a wall reaching the abutment 31". This wall effectively reinforces the abutment. The lower end 306 of the web 3a" is terminated short of the rear end of the flange 3b".

The nut member 3B has a head portion 370 having a sectional form of a laterally long rectangle, and a foot portion 371 having a same width as the head portion 370 and of which the sectional area decreases only laterally. Namely, it has nearly a T-form as viewed from front. The head portion 370 has provided on the bottom thereof slopes 376 of which the angle fits the webs 3a".

The nut member 3B has formed in the center thereof a screw hole 33" in which the threaded body 21 of the screw member 2" is screwed, and lateral holes 372 are formed in the head portions 370 on the opposite sides of the screw hole 33". As shown in FIG. 65, the fasteners 3A are symmetrically fitted in the nut member 3B through a rear opening. The fasteners 3A are assembled to the nut member 3A by setting holes previously formed in predetermined positions in the flanges 3b" to the lateral holes 372 and passing shafts 6 through the holes and lateral holes 373.

In this embodiment, the shafts 6 are prevented from coming out by calking or riveting. However, this come-out prevention is not limited to such calking, but can be accomplished by any other various ways such as use of an E-ring or the like proved effective for prevention of rotary shaft come-out.

In this assembled condition, the web 3a" of the fastener 3A is engaged at the lower end 306 thereof to the side face of the foot portion 371. Thus, the maximum opening angle of the fasteners 3A is restricted so that the distance between the ends of the fasteners 3A when opened to the maximum extent is the length L of the fastener 3A. The length L is larger than the distance $W_1$ between the inner faces of the inlet-opening walls 40 (width of the inlet opening 42) and smaller than the distance $W_2$ between the inner faces of the flanges of the channel rail 4. The width W of the fasteners 3A should preferably be equal to or smaller than the length of the seat section 12.

It should be noted that the nut member 33 may have the form of a rectangular block extended to a length of the head portion 370 with the foot portion 371 omitted. In this case, the web 3a should be shorter to retreat the lower end.

The fasteners 3A should preferably by always slightly open so that they can be positively opened from the closed state. For this purpose, the mass of the abutments 31" of the fasteners 3A should be increased. This can be attained by adding a weight or increasing the wall thickness of the upper end of the inclining portion of the web 3a".

In this embodiment, the lower portions of the fasteners 3A are pulled by two elastic members 7. The elastic members 7 may be for example a tension spring, of which both the ends are fixed to the flange face below the installed position of the shafts 6. The tension spring may be fixed in any way, for example, by welding. In this embodiment, however, a portion of the flange 3b" is lanced and bent upward, to which the tension spring is hooked at the end thereof. Instead, a small hole may be formed in the flange, and the tension spring may be hooked at the end thereof to that hole.

Figure 66:
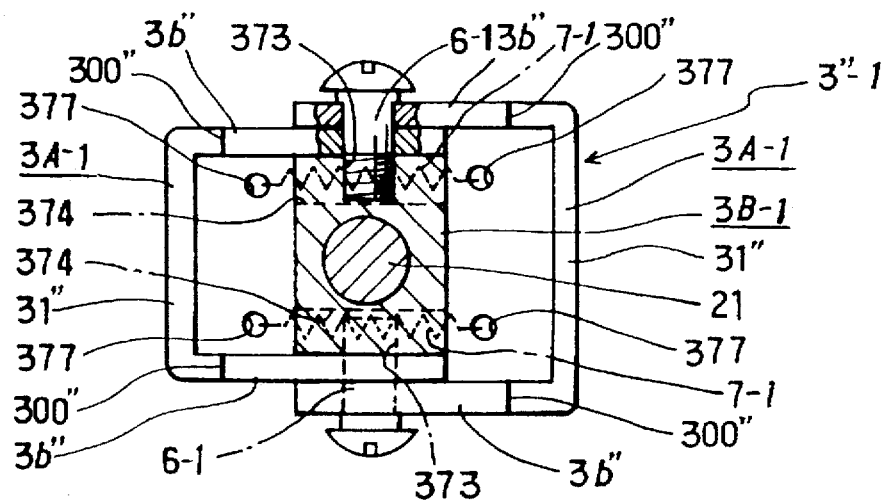
FIG. 66 is a partially-fragmentary plan view of a variant of the buckle used in the conduit clamp according to the third mode.
Figure 67:
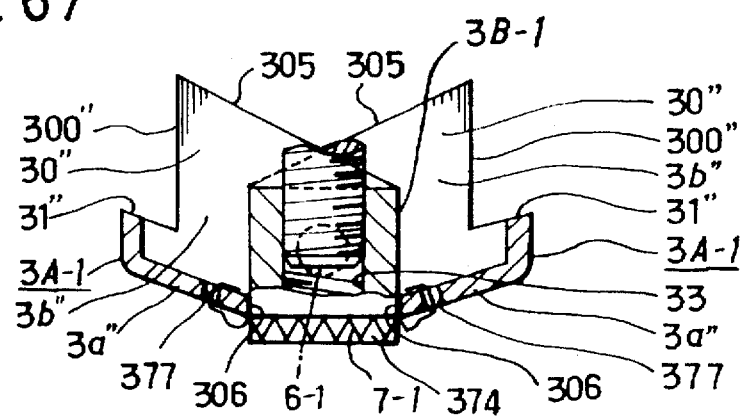
FIG. 67 is an axial-sectional front view of the buckle in FIG. 66.

FIGS. 66 and 67 show a variant of the buckle 3"-1. In this embodiment, the right and left fasteners 3A-1 are different in width from each other, and commonly use one point for fulcrum.

The fasteners 3A-1 are combined with each other so that the flanges 3b" overlap each other, and the narrow flanges 3b" face the nut member 3B-1. The nut member 3B-1 has formed therein lateral screw holes 373 so as to be perpendicular to an internal thread 33". The shafts 6-1 through the fasteners 3A-1 are screwed in these lateral screw holes 373.

Further in this embodiment, the elastic member 7-1 is a tension spring and connects the webs 3b" to each other. More particularly, the nut member 3B-1 has formed on the bottom thereof cuts 374 extending perpendicularly to the threaded body, and the elastic members 7-1 are disposed in the cuts 374 and fixed at both ends thereof to the webs 3a" in a selected manner. In this embodiment, there are formed small holes 377 in the webs 3a" for fixing the elastic members 7-1, in which the elastic members 7-1 are hooked at both ends thereof.

For limiting the opening angle, the lower ends 306 of the web 3a" are caused to abut the side face of the nut member 3B-1 as in the aforementioned embodiments.

Figure 68:
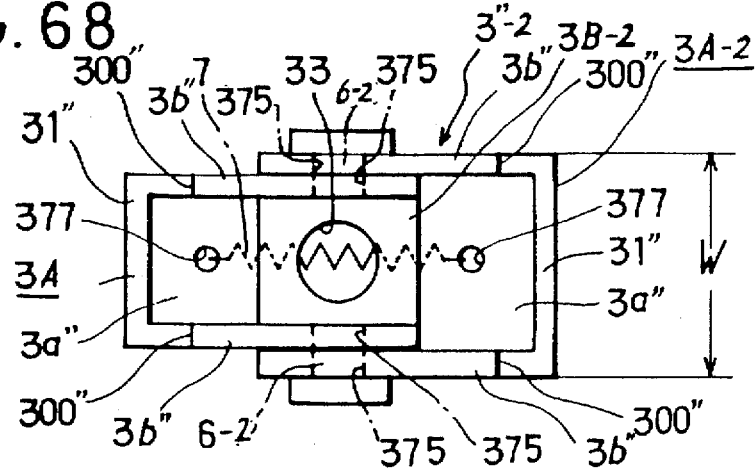
FIG. 68 is a plan view of a variant of the buckle used in the conduit clamp according to the third mode.
Figure 69:
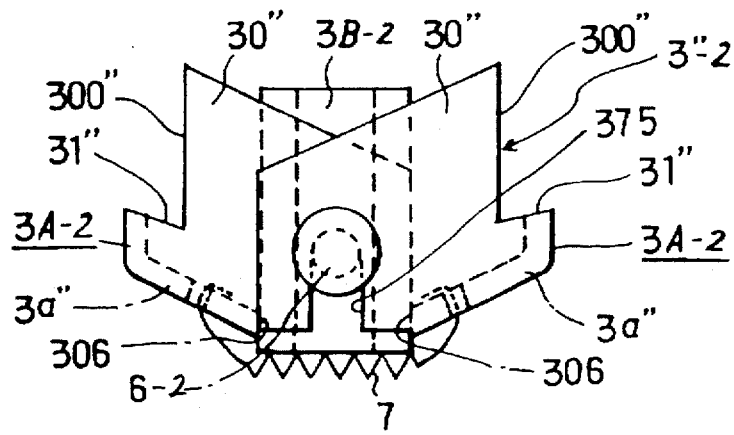
FIG. 69 is a plan view of the buckle in FIG. 68.

FIGS. 68 and 69 show a variant of the buckle 3"-2. Also in this embodiment, the right and left fasteners 3A-2 are different in width from each other and commonly use one point for fulcrum. The differences from other aforementioned variants are: The nut member 3B-2 has shafts 6-2 with come-out preventive projections, the flanges 3b" of the fasteners 3A-2 have formed therein recesses 375 having a width nearly equal to the diameter of the shafts 6, and the fasteners 3A-2 are assembled to the nut member 3B-2 by fitting the shafts 6-2 into the recesses 375, respectively.

This embodiment uses a single elastic member 7, which is extended between the webs 3a" so as to traverse beneath the screw hole 33". In this case, the nut member 3B-2 has an increased height so that the threaded body 21, when tightened, will not touch the elastic member 7.

The combination between the shaft with come-out preventive projection and the recess shown in FIGS. 68 and 69 is also applicable to the embodiments shown in FIGS. 63 to 65.

Figure 74:
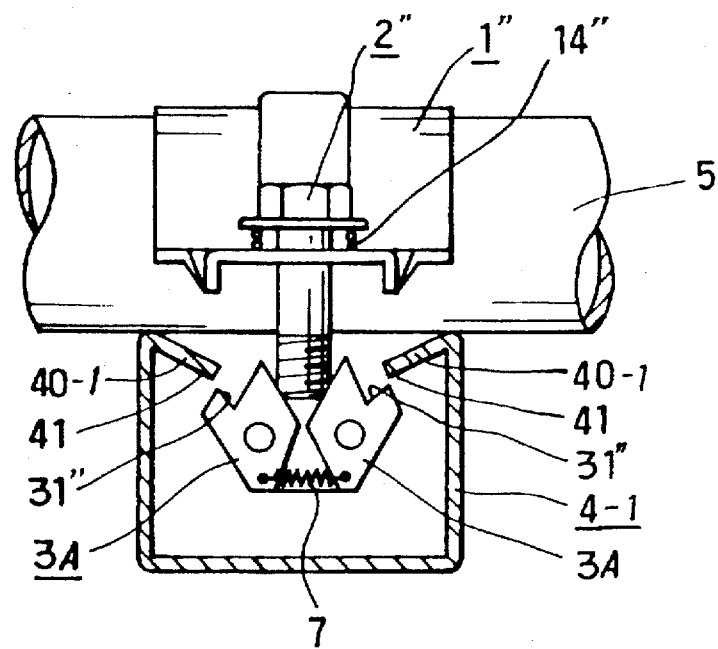
FIG. 74 is a front view showing the application of the conduit clamp according to the third mode to another type of channel clamp, with the screw member pushed to full extent.
Figure 75:
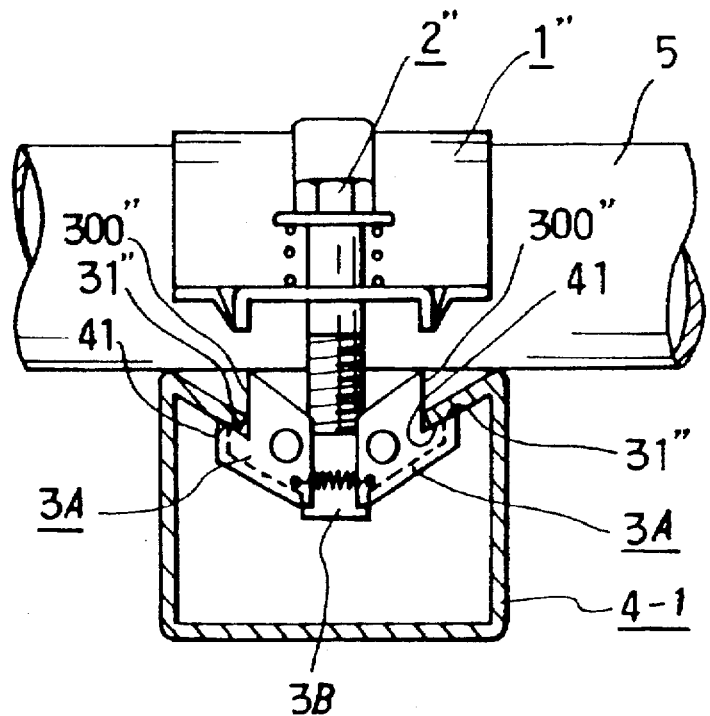
FIG. 75 is a front view showing the state of the conduit clamp, in which the screw member is released from the pushed state.
Figure 76:
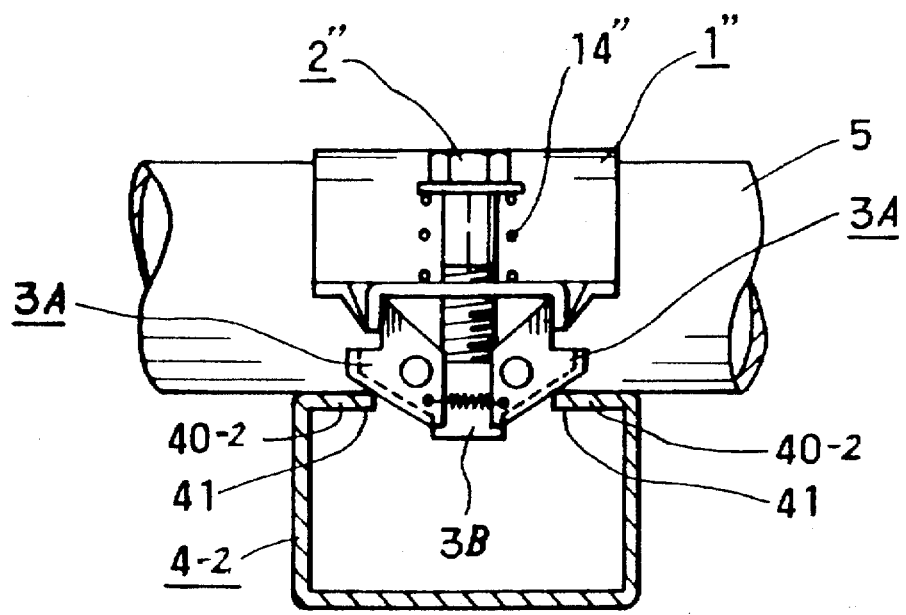
FIG. 76 is a front view of the application of the conduit clamp according to the third mode to another type of channel rail, with the conduit clamp being set in place.

FIGS. 74 and 75 show an application of the third mode of the invention to a channel rail 4-1 of which the inlet-opening walls 40-1 droop obliquely. FIG. 76 shows an embodiment applied to a channel rail 4-2 of which the inlet-opening walls 40-2 are horizontal. In case of the application shown in FIGS. 74 and 75, the abutments 31" should preferably have an angulation which corresponds to the inclination of the inlet-opening walls 40-1.

Figure 77:
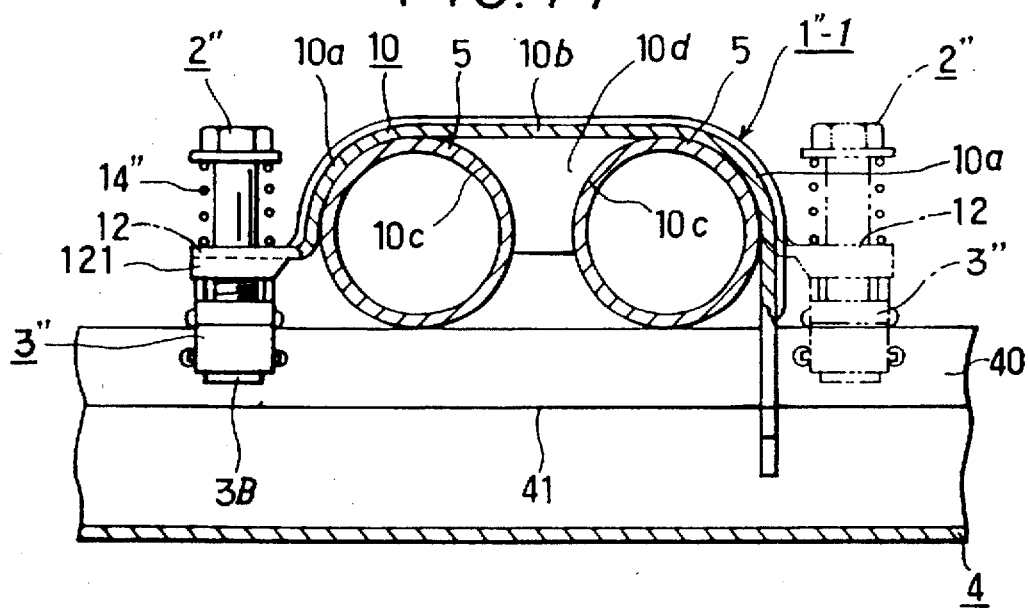
FIG. 77 is a side elevation showing the use of a variant of the main unit in the conduit clamp according to the third mode.

FIG. 77 shows the clamping of a plurality of conduits 5 with the buckle 3" according to the second mode of the invention. The main body 1"-1 is the same as that in FIG. 61 provided that the seat section 12 has a through-hole, not the guide hole, formed therein. Therefore, same elements as in FIG. 61 are indicated with same reference numerals, and will not discussed any more.

Figure 79:
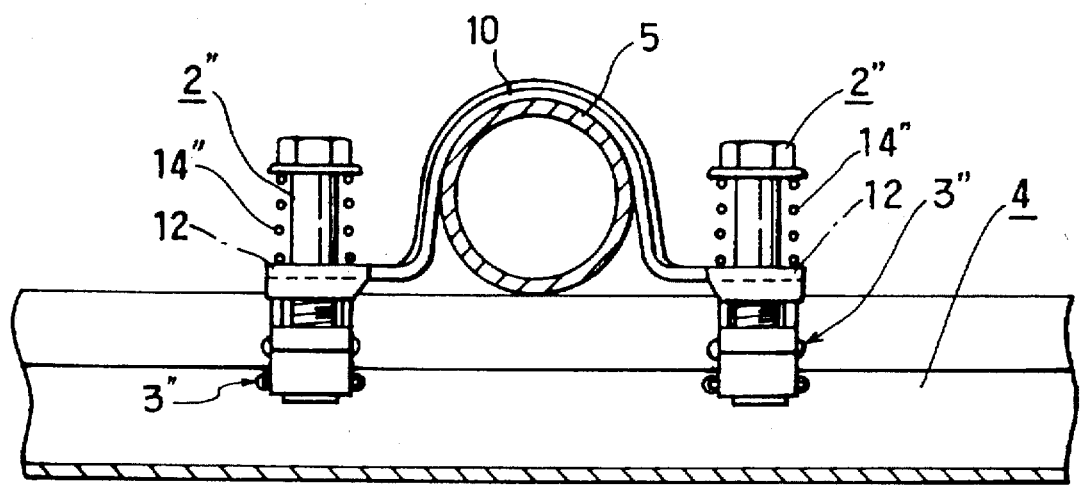
FIG. 79 is a side elevation showing the use of a variant of the main unit in the conduit clamp according to the third mode.
Figure 78:
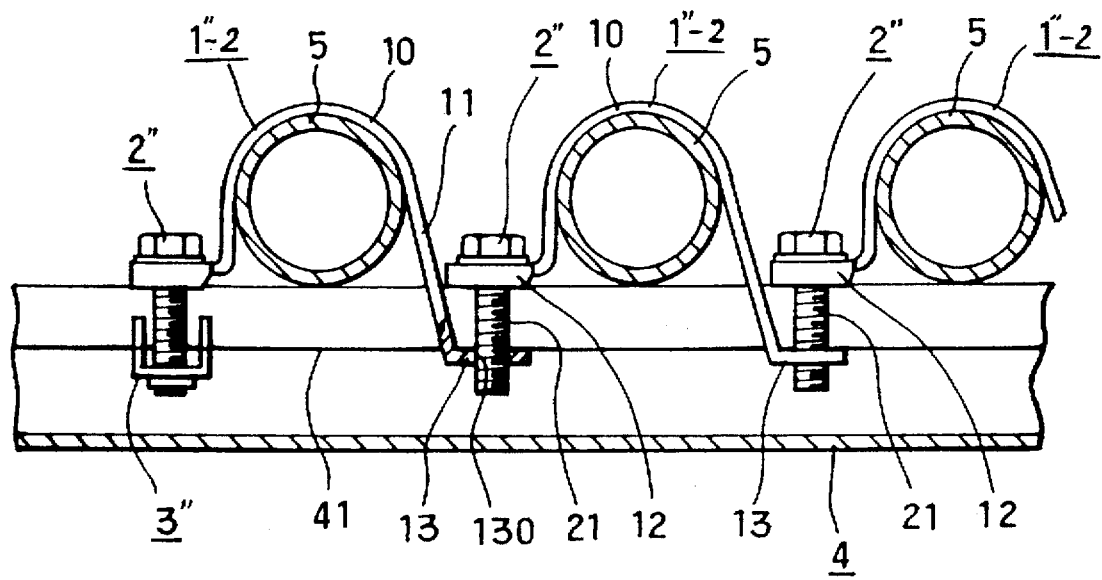
FIG. 78 is a side elevation showing the use of a variant of the main unit in the conduit clamp according to the third mode.

FIG. 78 shows the clamping of a plurality of conduits with a single conduit clamp according to the second or third mode of the invention. The main unit 1"-2 according to the first mode shown in FIG. 37 is used in the manner of clamping. No further description will be made here. FIG. 79 shows an embodiment in which there are before and after the retainer section 12 seat sections 12 to which the buckle 3", screw member 2" and elastic member 14" are assembled. This arrangement can be also applicable to the embodiment shown in FIG. 39.

OPERATION

How to use the conduit clamp according to the present invention and how it functions will be described herebelow:

First Mode

First, the assembling of the conduit clamp A will be explained taking the first embodiment as example. The explanation begins with the exploded condition shown in FIG. 1. One end 141 of the spring 14 is hooked into the retention hole 123 in the bent lateral wall 121 of the seat section 12 of the main body 1, the threaded body 21 of the screw 2 is inserted into the through-hole 120 in the seat section 12 and through the coil portion 140 of the spring 14, and further the threaded body 21 is screwed into the screw hole 33 in the buckle 3.

The extent of screwing is set so that when the screw 2 is pushed until the screw head 20 abuts the seat section 12, the abutments 31 come to a position a little below the lower ends 41 of the inlet-opening walls 40 of the channel rail 4.

Next, the other end 142 of the spring 14 is hooked in the cut 302 formed in the projection 30 of the buckle 3. This condition is shown in FIG. 8. The buckle 3 has the length directed nearly parallel to the bent lateral walls 121 of the seat section 12. Form the condition in FIG. 8, the buckle 3 is pushed up toward the seat section 12 while being rotated about 180° counterclockwise. The projections 30 of the buckle 3 enter between the bent lateral walls 121 and the protrusions 122 are fitted into the concavities 340. Thus the buckle 3 is securely held there. At the same time, the spring 14 is kept wound up. The buckle 3 is assembled to the main body 1 and the screw 2 projects largely above from the seat section 12.

For clamping the conduit 5, the foot section 11 is put into the channel rail 4 through the inlet-opening 42 and the engagement portion 13 is engaged on the inlet-opening walls 40.

The retainer section 10 of the main body 1 is put on the conduit 5 previously disposed on the channel rail 4. This condition is shown in FIGS. 3, 4 and 21. The buckle 3 takes a position in the inlet opening 42 as held on the seat section 12 of the main body 1. In the above procedure, the buckle 3 is short that it does not reach the inside of the retainer section 10. Therefore, the conduit 5 can be easily and efficiently set in the main body 1 while the length of the buckle 3 is being kept parallel to the inlet opening 42.

Next, the screw member 2 is pushed downward. The buckle 3 is disengaged from the bent lateral walls 121 of the seat section 12, and is lowered in the inlet opening 42 while being suspended from the threaded body 21 of the screw 2, until the head 20 of the screw 2 abuts the seat section 12.

The projections 30 of the buckle 3 are lowered as guided on the bent lateral walls 121. The moment the upper end of the projections 30 leaves the bent lateral walls 121, the spring 14 having so far been wound up returns from its twisted state and thus restores its initial condition. The other end 142 of the spring 14 is hooked in the retention hole 302 in the buckle 3. Thus, the buckle 3 falls while being connected with the spring 14, and during this fall, the rotational energy accumulated in the spring 14 causes the buckle 3 to rotate clockwise about the threaded body 21 of the screw 2 from the condition shown in FIG. 22. This rotation is shown with the imaginary line in FIG. 23.

The distance $L_4$ between the opposite stop faces 301 of the projections 30 is shorter than the distance $W_1$ between the inner faces of the inlet-opening walls 40, while the distance $L_2$ between the top faces 300 of the projections 30 is nearly equal to the distance $W_1$ between the inner faces of the inlet-opening walls 40.

Therefore, when the buckle 3 has been rotated about 90° from the state in FIG. 22, the two first end faces 300 in symmetry abut the inlet-opening walls 40, respectively, as indicated with solid line in FIG. 23. Thus, the buckle 3 is securely stopped at 90° from rotating, and the abutments 31 are set parallel to the lower ends 41 of the inlet-opening walls 40. The stop faces 300 click when they abut the inlet-opening walls 40. With this clicking, it is possible to instantaneously know when the buckle 3 is set in place.

Since the one end 141 of the spring 14 is hooked in the retention hole 123 in the seat section 12, the buckle 3 having rotated 90° as in the above is pulled upward. Thus, the abutments 31 resiliently abut the lower ends 41 of the inlet-opening walls 40 as shown in FIG. 24, resulting in a provisional clamping of the conduit 5, and the primary step of clamping is complete. In this condition, the stop faces 300 work well to limit the buckle 3 against rotation so that the abutments 31 will neither rotate clockwise nor counterclockwise even when the screw member 2 is touched by hand. Thus the abutments 31 can move only longitudinally of the inlet-opening walls 40. Therefore, by moving the conduit 5 longitudinally of the channel rail 4, the position of the conduit 5 can be adjusted easily.

Here the conduit 5 is correctly positioned and the secondary step of clamping starts. At this time, the screw 2 is tightened with a predetermined torque by using a selected tool. The buckle 3 is raised and the stop faces 300 of the projections 30 guide the inlet-opening walls 40. Therefore, the buckle 3 will not be rotated any longer. As the screw 2 is tightened, the buckle 3 will be raised vertically and the abutments 31 have a strong contact with the lower ends 41 of the inlet-opening walls 40. Thus, the main body 1 is pulled, and the conduit 5 is closely attached on the retainer section 10 and securely fixed to the channel rail 4. Since the spring 14 still keeps a little remainder of the rotation energy and so always applies the buckle 3 with a force which will rotate the buckle 3 counterclockwise and a force which will raise the buckle 3, the buckle 3 will not be loosened even if a vibration or the like is applied after the clamping. Thus, the conduit 5 can be kept stably clamped to the channel rail 4.

The above-mentioned operations and the behavior and action of the buckle 3 due to the operations are also true when the conduit clamp is used with the channel rails 4-1, 4-2 shown in FIGS. 33 to 36.

The features of the conduit clamp according to the first mode of the invention can be resumed as follows:

(1) A single pushing of the screw member 2 makes it possible to simultaneously lower the buckle 3, rotate it 90° and provisionally fix it. Therefore, with the conduit clamp according to the present invention, even a person not so skilled can easily clamp a conduit to a channel rail with no mistake. Thus, also in case conduits are to be clamped to channel rails 4 fixed with the inlet opening 42 directed downward, the worker can do this clamping work very easily without much fatigue which will result from an unnatural posture he takes.

(2) It is not necessary to turn the screw for shifting the buckle 3 from a position where it is parallel to the inlet opening 42 of the channel rail 4 to a position where it is perpendicular to the channel. The screw has to be tightened for fully clamping the conduit to the channel rail. Thus the necessary turning of the screw is extremely small, which is much contributed to a rapid and efficient work of clamping. This is a special feature found in this first mode of the invention. Assume, for example, that the previously-mentioned level adjustment of the buckle 3 has been done so that the abutments 31 are flush with the lower ends 41 of the inlet-opening walls 40 when the buckle is lowered. In this case, when the screw 2 is pushed, the buckle 3 is rotated 90° clockwise about the threaded body 21 of the screw 2 under the action of the spring member 14. Thus, the buckle 3 lowers over an extra distance for the angle of 90° along the threaded body 21. So there develops a gap due to which the abutments 31 can go under the lower ends 41 of the inlet-opening walls 40. Therefore, full clamping needs a minimum stroke. For example, when the thread pitch of the threaded body 21 is 1.0 mm, the full clamping can be completed only by tightening the screw 2 one full turn.

(3) The length of the buckle 3 is very short, namely, nearly equal to the distance $W_3$ between the outer faces of the inlet-opening walls 40, and the abutments 31 and the screw hole 33 are in proximity of each other in a same plane (web 3a), which ensures a high rigidity of the buckle 3. Also, when the buckle 3 has the sectional form of a groove or the webs 3a are provided with ribs 3d, the buckle 3 can have such a strength and rigidity that it sufficiently withstands the torque exerted by the screw member 2. The stop faces 300 of the projections 30 are in contact over the total height with the inlet-opening walls 40. Therefore, a strong torque applied will not cause the entire buckle 3 including the screw hole 33 to be deformed or distorted. So the buckle 3 according to the present invention permits a heavy clamping.

(4) Forming the abutments 31 by the flanges 3b as shown in FIGS. 1, 9, 10, 19 and 29 is advantageous as follows. First, the abutments 31 can e made extremely strong by utilizing the effect of angulation or bending. Secondly, when the inlet-opening walls 40 of the channel rail 4 have the replications as shown in FIG. 3, there are formed in many cases as regularly spaced on the lower ends 41 of the inlet-opening walls 40 anti-slip recesses perpendicular to the length of the channel rail. In such case, the four narrow abutments 31 go into the anti-slip recesses and the buckle 3 is raised under the action of the spring 14 so that the anti-slipping is attained. Therefore, in case a conduit is clamped horizontally to channel rails laid on a vertical wall of a building, the provisional clamping and full clamping can be simply and politely done with the conduit clamp according to the present invention.

Figure 26:
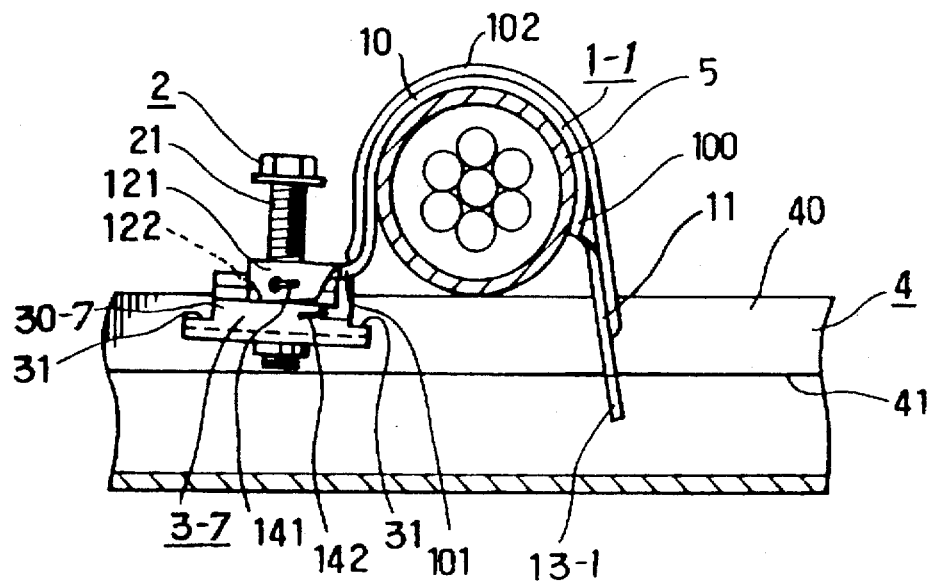
FIG. 26 is an axial-sectional view of the second embodiment, set on a channel rail.

The use and basic function of the second embodiment in the first made of the invention are the same as those of the first embodiment. In the second embodiment, a conduit clamp assembled as shown in FIG. 25 is applied to a channel rail 4 as shown in FIG. 26. Next, the screw member 2 is pushed. The buckle 3 is rotated under the action of the spring 14 while being lowered, and provisionally fixed to the channel rail 4 as shown in FIG. 27. by tightening the screw member 2 in this condition, the abutments 31 are put in strong contact with the lower ends 41 of the inlet-opening walls 40, namely, the full clamping is thus attained.

There are provided at the beginning end of the retainer section 10 of the main body 1-1 curved portions 100 directed inwardly of the line of inclination of the foot section 11. Thus, the curved portions 100 are put in close contact with the outer surface of the conduit 5 even in a condition of provisional clamping. When the full clamping is done as in the above, the seat section o the man body 1-1 is pulled downward, but the curved portions 100 are already in close contact with the outer surface of the conduit 5 and there is no play between the conduit 5 and the retainer section 10, so that the foot section 11 will not take a vertical position with the angle of inclination reduced. Therefore, no overload will apply to the seat section 12, so the seat section 12 will not be deformed as bent downward from the horizontal position. Namely, the buckle 3 will not be loosened at all, the conduit 5 is fixed very rigidly and can be kept permanently clamped.

Figure 28:
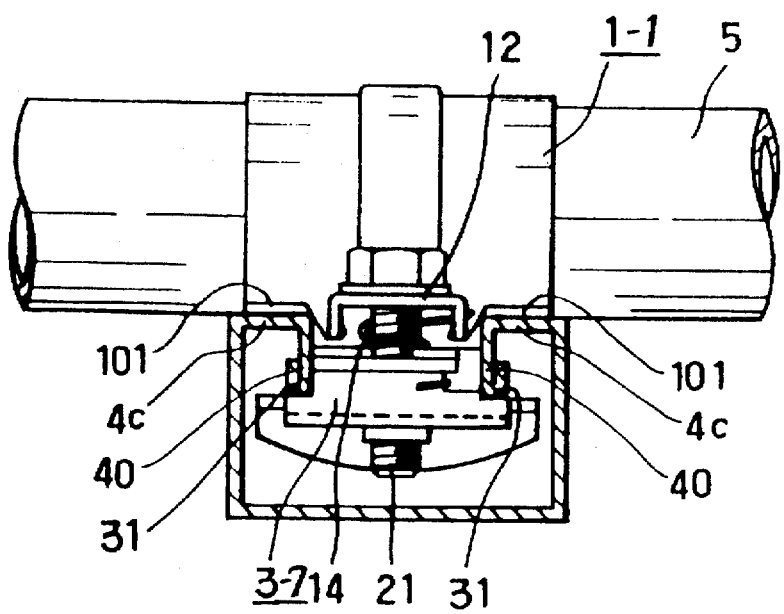
FIG. 28 is an axial-sectional view showing the state after the conduit is completely clamped.

In case the flanges 101 are provided on either side of the seat section 12, there is a clearance c between the flanges 101 and the flanges 4c of the channel rail 4 when yet in the state of provisional clamp. By tightening the screw in this condition for the full clamping, the main body 1-1 will be pulled downward until the flanges 101 have a contact with the top faces of the flanges 4c of the channel rail 4, as shown in FIG. 28. When the flanges 101 are in contact with the flanges 4c of the channel rail 4, the main body 1-1 will not be pulled down any longer even by further tightening the screw 2 to impart a tightening torque. Therefore, without using a screw of any special structure, it is possible to instantaneously know when the clamping is completed and also the completion of clamping can be known easily at a glance from outside. Even with the screw 2 tightened, the force of tightening is shut off by the flanges 4c so that no tension will be transmitted to the foot section 11. Thus, the foot section 11 is prevented from changing in angulation.

Second Mode

The conduit clamp according to the second mode of the present invention functions as will be described below.

The channel rails 4 are disposed at a predetermined interval between them with the inlet opening 42 directed upward or downward, as in the conduit clamp according to the first mode of the invention.

For clamping the conduit 5 with the conduit clamp according to this second mode, the foot section 11 is put into the channel rail 4 through the inlet opening 42 and the engagement portion 13 is engaged on the lower ends 41 of the inlet-opening walls 40. Then, the retainer section 10 is applied to the conduit 5 laid perpendicular to the channel rail 4, as shown in FIGS. 41 and 42. The buckle 3' is lifted by the elastic member 14' and held by the seat section 12 of the main body 1', and the rotation lead section 24 is engaged at the lower end thereof in the guide hole 120a in the seat section 12. Thus, the buckle 3' is longitudinally held exactly in parallel to the length of the channel rail 4. The buckle 3' is so short that it does not reach the inside the retainer section 10 as shown in FIG. 42. Therefore, when the retainer section 10 is applied to the conduit 5, the buckle 3' will not be any interference. The retainer section 10 can be applied to the conduit 5 by a single operation.

Figure 44:
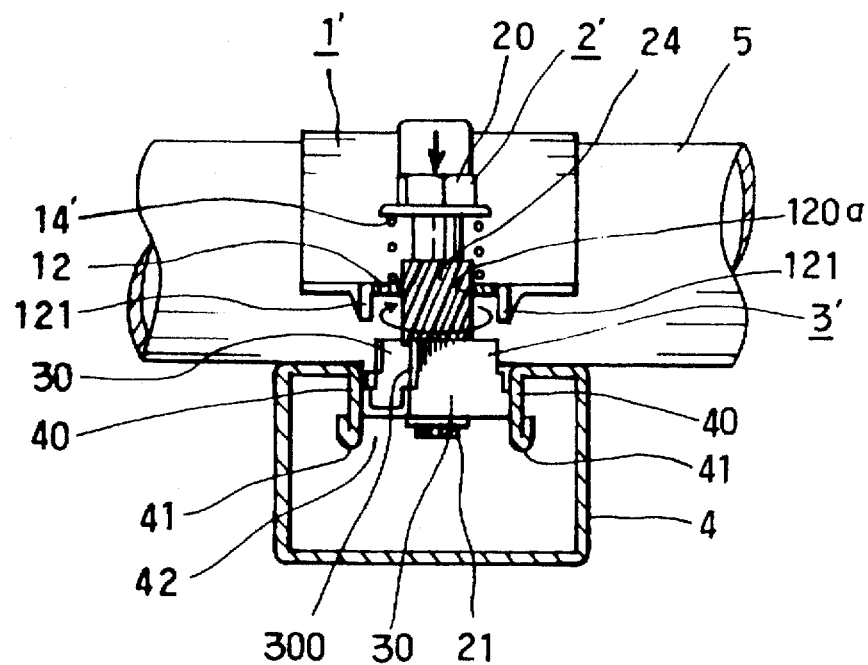
FIG. 44 is a front view showing the screw member being pushed in the conduit clamp according to the second mode.

For provisional fixation, the screw member 2' is pushed axially. This pushing will press down the screw member 2' against the action of the elastic member 14' and thus the projections 30 of the buckle 3' leave from the lateral bent walls 121 of the seat section 12. When the screw member 2' falls, the rotation lead section 24 is activated and the screw member 2' rotates clockwise due to the relation with the guide hole 120a in the seat section 12. Thus the buckle 3' rotates clockwise along the screw member 3' within the inlet opening 42 as shown in FIG. 44.

In the buckle 3, the distance $L_4$ between the opposite stop faces 301 is smaller than the distance $W_1$ between the inner faces of the inlet-opening walls 40 but the distance $L_2$ between the top faces 300 is equal to that distance $W_1$.

Also the height of the rotation lead section 24 is a dimension necessary for rotation through 90°. So, as the screw member 2' rotates while further falling from the position shown in FIG. 44, the stop faces 300 positioned in symmetry gradually come near the inlet-opening walls 40. Simultaneously when the rotation lead section 24 leaves the guide hole 120a and the screw member 2' stops rotating, the stop faces 300 abut the inlet opening walls 40 with clicking. Thus, the buckle 3' is stopped from rotating and the abutments 31 will be perpendicular to the lower ends 41 of the inlet-opening walls 40.

Figure 45:
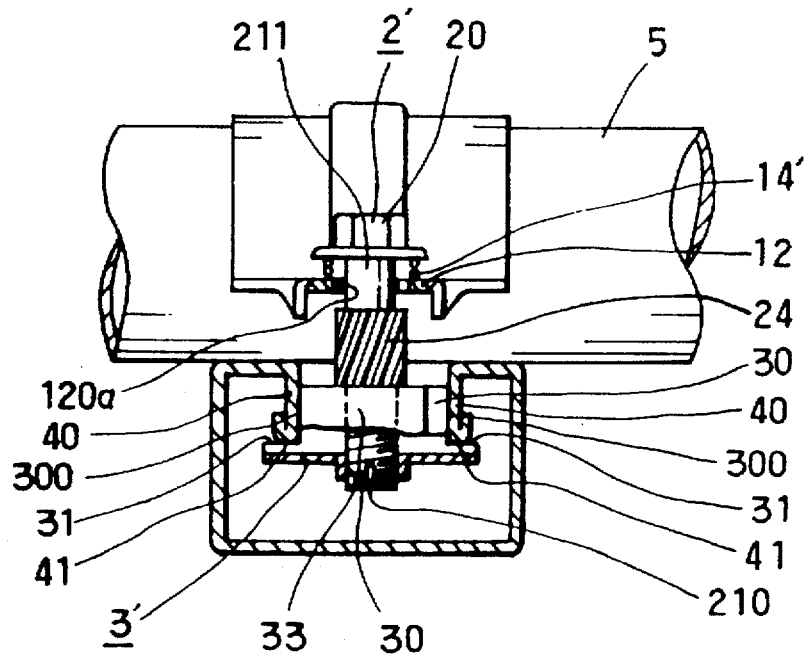
FIG. 45 is a front view showing the provisional fixation with the screw member related from the pushed state.

When the screw member 2' is released from the axially pushed state, it will be lifted under the action of the elastic member 14' as shown in FIG. 45, and thus the abutments 31 are in close contact with the lower ends 41 of the inlet-opening walls 40. This is the provisional fixation.

At this time, the sub stop face 304 lower the projection 30 abuts the inlet-opening wall 40 on the side of the opposite stop face. The sub stop face 304 is aligned with the stop face 300 of the projection at the opposite side. Thus, if the screw member 2' is touched erroneously by hand, the abutments 31 will neither rotate clockwise nor counterclockwise and will be set precisely parallel to the lower ends 41 of the inlet-opening walls 40. Therefore, the position of the conduit 5 can be freely adjusted by holding and moving it longitudinally of the channel rail 4. Since the abutments 31 are moved along the inlet-opening walls 40 while keeping the direction at this time, the adjustment can be done extremely easily and safely.

For full clamping after the conduit 5 is set in place, the screw member 2' is tightened with a predetermined torque from the state shown in FIG. 45. As the threadless neck portion 211 is positioned in the guide hole 120a in the seat section 12 and the diameter of the threadless neck portion 211 is smaller than that of the guide hole 120a, the threaded body 21, when turned, will enter the screw hole 33 in the buckle 3' so that the buckle 3' will rise and the abutments 31 are strongly clamped to the lower ends 41 of the inlet-opening walls 40. The main body 1' is pulled down, the conduit 5 gets in close contact with the retainer section 10 and securely fixed to the channel rail 4. The elastic member 14' will work as spring washer thereafter, so the conduit 5 will not loosened even if applied with a vibration or the like.

The use and function o the channel rails 4-1, 4-2 shown in FIGS. 46 and 47 are similar to those having been described above. In the embodiment shown in FIG. 62, it is not necessary to inset the foot section 11 into the channel rail 4. By pushing the screw members 2' from the illustrated position, the provisional fixation can be attained.

The conduit clamp according to the second mode of the invention shows the same features as those of the conduit clamp according to the first mode provided that the action of the spring 14 is utilized to reduce the necessary amount of screw turning.

Third Mode

The use and function of the conduit clamp according to the third mode of the invention will be discussed below.

As shown in FIG. 63, the foot section 11 of the main body 1" is inserted into the channel rail 4 and rests on the engagement portion 13, the conduit 5 is held by the retainer section 10, and the buckle 3" is set in the inlet opening of the channel rail 4. The buckle 3" is lifted by the elastic member 14" and the right and left fasteners 3A are held open with the stop faces 300" are between the lateral bent walls 121 of the seat section 12. As shown in FIG. 65, since the buckle 3" has a width W smaller than the projecting length of the seat section 12, it can be easily applied onto the conduit 5. In this condition, the inclined webs 3a" of the right and left fasteners 3A are in contact with the inlet-opening walls 40.

The provisional fixation is completed by pushing the screw member 2" axially as in the conduit clamps according to the first and second modes of the invention. Namely, by pushing down the screw member 2" against the action of the elastic member 14" from the position shown in FIG. 63, the thrust applied to the nut member 3B causes the right and left fasteners 3A to go down and leave the lateral bent walls 121 of the seat section 12.

Simultaneously, the webs 3a" are forced by the inlet-opening walls 40 so that the fasteners 3A tilt about the shafts 6 inwardly against the action of the elastic members 7. As shown in FIG. 70, the fasteners 3A will thus fall while closing with the webs 3a" being nearly in contact with the inlet-opening walls 40.

Figure 71:
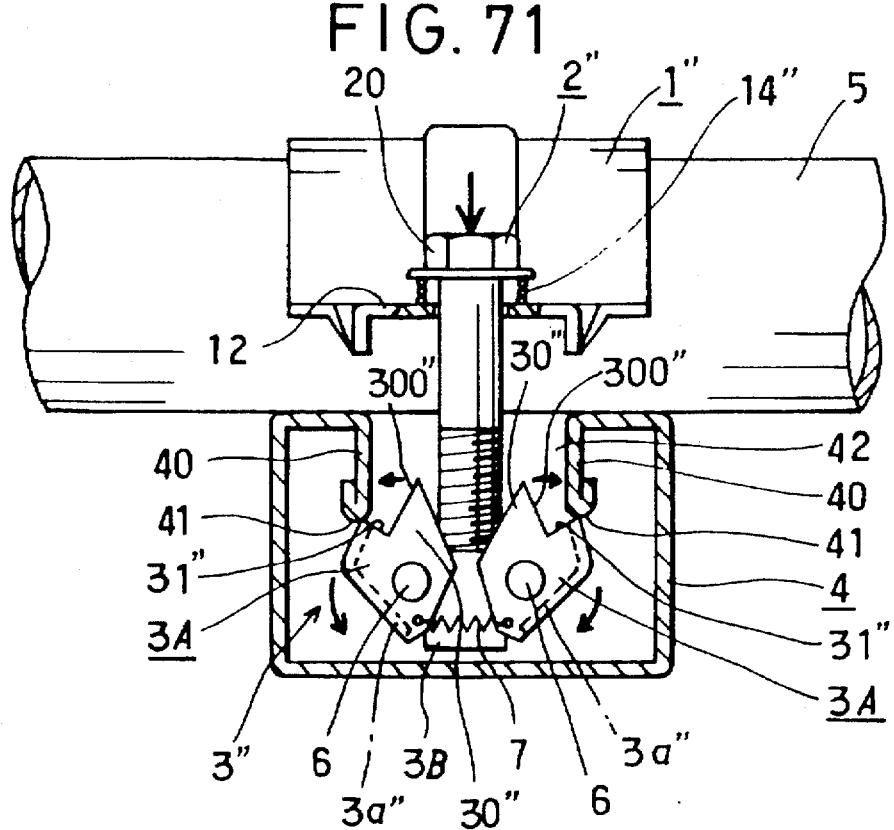
FIG. 71 is a front view showing the statement of the conduit clamp, in which the screw member is pushed to full extent from the state in FIG. 70.

The screw member 2" is continuously pushed and the head 20 of the screw member 2" is pushed down to near the seat section 12, when the inclined portions of the webs 3a" of the fasteners 3A pass by the lower ends 41 of the inlet-opening walls 40, they will be released from the closing action of the inlet-opening walls 40. Then, the fasteners 3A are rotated about the shafts 6 outwardly under the action of the elastic members 7 as shown in FIG. 71 and the abutments 31" pass by the lower ends 41 of the inlet-opening walls 40. There are provided adjacent to the fasteners 3A projections 30" higher than the latter and of which the radius of rotation is larger than that of the abutments 31". Thus, the stop faces 300" at the ends of the projections 30" rapidly approach the inlet-opening walls 40 as shown in FIG. 71. Simultaneously when the abutments 31" take horizontal position, the stop faces 300" abut the inlet-opening walls 40.

Figure 72:
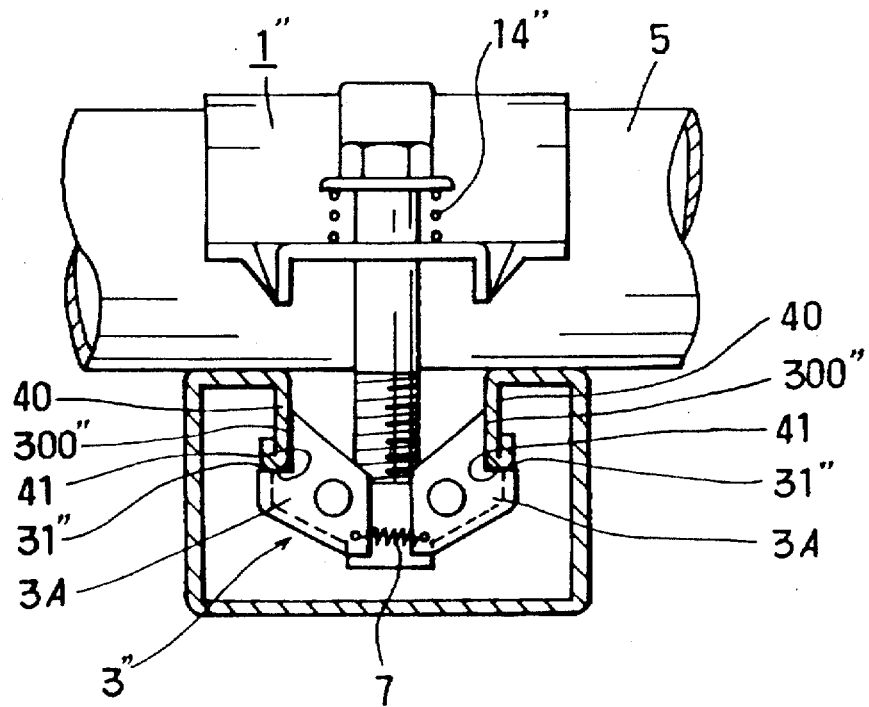
FIG. 72 is a front view of the provisional fixation in which the screw member is released from the pushed state.
Figure 73:
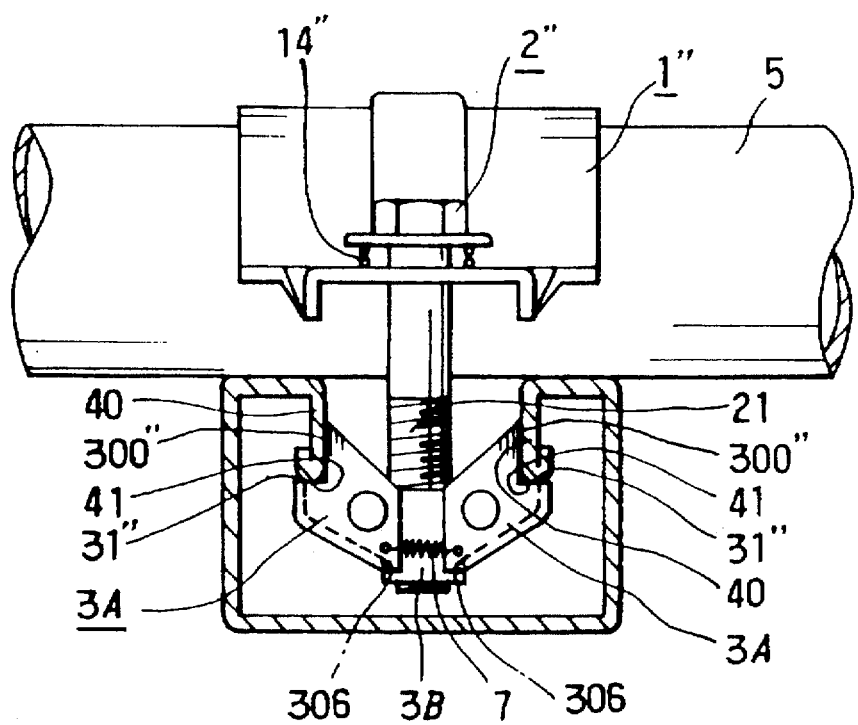
FIG. 73 is a front view of the complete fixation.

When the screw member 2" is released from the pushed state, it will be lifted by the elastic member 14" as shown in FIG. 72. At this time, the fasteners 3A are kept in contact with the inlet-opening walls 40 and so work as guide. Thus, the buckle 3" rises vertically and the abutments 31" get in close contact with the lower ends 41 of the inlet-opening walls 40. This is the provisional fixation. The fasteners 3A have a predetermined width W as shown in FIG. 65 and their stop faces 300" are spaced from each other with a predetermined interval and parallel to each other. Thus, the abutments 31" are kept precisely perpendicular to the lower ends 41 of the inlet-opening walls 40. Therefore, the position o the conduit 5 can be adjusted very easily.

By turning the screw member 2" after the position adjustment, the fasteners 3A are raised vertically as the threaded body 21 moves on so that the abutments 31" are strongly clamped to the lower ends 41 of the inlet-opening walls 40. At this time, the stop faces 300" and the inlet-opening walls abut each other than the lower ends 306 of the webs 3a" abut the side face of the nut member 3B, so the fasteners 3A will not open more than the angle shown in FIG. 33.

In case the inlet-opening walls 40-1 of the channel rail 4-1 are inclined, the fasteners 3A are turned outwardly when the screw member 2" is pushed down to full extent, as shown in FIG. 74. When the screw member 2" is released from the pushed state, the provisional fixation as shown in FIG. 75 will result.

The conduit clamp according to this third mode shows the similar features to those in the second mode.

In the conduit clamps according to the first to third modes of the invention, in case the elastic member 14" shows a strong resilience or in case the conduit 5 is made of, for example, a relatively soft plastic or a bundle of cables, the conduit can be completely fixed by pushing the screw member 2" axially, which is also included in the present invention.

What is claimed is:

1. A device for clamping a conduit having a curvature to a channel rail, said channel rail comprising a web having respective sides, a pair of flanges, each flange extending from a respective side of said web and having an upper end, a pair of top walls extending inwardly from said respective upper ends of said flanges, said pair of top walls having respective bottom faces and terminating so as to form an inlet opening therebetween having a first width ($W_1$), said device comprising a main body having a retainer section and a seat section, said seat section having an aperture; a screw member positioned in said aperture and having a head and a threaded body; a buckle mounted on said screw member, said main body comprising holding means for releasably holding the buckle in a predetermined direction and below said seat section, and said buckle comprising, said longitudinal end parts forming base and longitudinal end parts as channel rail engaging means for engaging said pair of top walls of said channel rail and at least provisionally fixing said conduit to said channel rail, said engaging means comprising a pair of abutments extending upwardly from said base; and rotating means for rotating said buckle when said buckle is released from said holding means so that said abutments are positioned under a respective bottom face of said pair of top walls of the channel rail, said rotating means further for drawing said buckle in the direction of said seat section so that said abutments are kept positioned under the respective bottom face of said pair of top walls.

2. A device as set forth in claim 1, wherein said seat section is contiguous with said retainer section, said seat section having lateral bent walls which form said holding means for holding said buckle; and wherein said rotating means comprises an elastic member having a first end and a second end, said first end being coupled to said seat section and said second end being coupled to said buckle, the elastic member being wound up when said buckle is turned through a predetermined angle and fitted between said lateral bent walls.

3. A device as set forth in claim 2, wherein said elastic member is a coil spring having a coil portion through which said threaded body of said screw member is extends, said first end of said elastic member coupled to said seat section being contiguous from said coil portion and said second end coupled to said buckle being coupled to a portion of said buckle other than said abutments.

4. A device as set forth in claim 2, wherein said elastic member is a tension spring having a coil portion spirally enclosing said threaded body of said screw member, said first end of said elastic member coupled to said seat section being contiguous from said coil portion and said second end coupled to said buckle being coupled to a portion of said buckle other than said abutments.

5. A device as set forth in claim 3 or 4, wherein the spring is coupled by welding, bonding or hooking.

6. A device as set forth in claim 2, wherein at least a portion of said buckle is fitted in between said lateral bent walls of said seat section.

7. A device as set forth in claim 2, wherein said seat section has opposite sides, and wherein the retainer section is provided on either of said opposite sides.

8. A device as set forth in any one of claims 1 or 2, wherein said main body has a foot section contiguous from said retainer section and said foot section has an engagement portion for engaging the channel rail.

9. A device as set forth in claim 1, wherein said seat section is contiguous from said retainer section, and said aperture of said seat section is a guide hole, and wherein said threaded body has a middle; and wherein said rotating means comprises an elastic member interposed between said seat section and said head of said screw member for lifting said buckle, and said rotating means further comprises said screw member having a rotation lead section provided in said middle of said threaded body.

10. A device as set forth in claim 9, wherein said rotation lead section has a plurality of teeth.

11. A device as set forth in claim 9, wherein said rotation lead section is a multiple-thread screw.

12. A device as set forth in claim 9, wherein said rotation lead section is a torsion bar having a polygonal section.

13. A device as set forth in claim 9, wherein said elastic member is a coil spring.

14. A device as set forth in claim 9, wherein said main body has a foot section contiguous from said retainer section, said foot section having a foot section base, wherein said foot section has formed at said foot section base thereof an engagement portion for engaging the channel rail.

15. A device as set forth in claim 1, wherein said main body holds a plurality of conduits.

16. A device as set forth in claim 15, wherein said retainer section has a curved portion on either side thereof and a straight portion connecting the curved portions, and wherein there is formed on said straight portion at least a set of projections having concave circular faces.

17. A device as set forth in claim 1, wherein said top walls defining said inlet opening of said channel rail are selected from the group consisting of walls extending in a vertical direction with respect to said web, walls extending in an oblique direction with respect to said web, and walls horizontal with respect to said web.

18. A device for clamping a conduit to a channel rail, comprising in combination, said device and wherein said conduit is positioned substantially perpendicularly to said channel rail, said channel rail comprising a web having respective sides, a pair of flanges, each flange extending from a respective one of said sides of said web, said flanges being separated from one another by a first distance ($W_2$) and having respective upper ends, and top walls extending inwardly from said respective upper ends, said top walls terminating so as to form an inlet opening therebetween having a second distance ($W_1$); said device comprising:

a main body and a buckle attached to said main body by a screw member and a spring disposed about said screw member, said buckle being rotatable with respect to said main body;

said buckle having a width (W) smaller than said second distance ($W_1$) and a length (L) larger than said second distance ($W_1$) but smaller than said first distance ($W_2$);

said buckle having a middle and a screw hole in said middle thereof, said buckle comprising a base having lateral sides extending from said lateral sides and forming longitudinal end portions; a pair of abutments at each end of said base; and a pair of projections extending from said lateral sides of said base, said pair of projections being higher than said abutments so as to form symmetrical stop faces therebetween;

said main body comprising a foot section having a portion engaging said walls of said channel rail, a retainer section contiguous from said foot section for holding said conduit, and a seat section extending from said retainer section, said seat section having lateral bent walls which cooperate with said pair of projections for releasably holding said buckle so as to be longitudinally parallel to the inlet opening of the channel rail, said seat section having a through-hole through which said screw member extends and is screwed into said screw hole in said buckle;

and said spring having a first end and a second end and being disposed between said seat section and said buckle, said spring member being coupled at said first end thereof to said seat section and at said second end thereof to said buckle, whereupon said spring, when being twisted, lifts said buckle and provides rotation to said buckle.

* * * * *